(12) United States Patent
Szabo et al.

(10) Patent No.: US 12,433,580 B1
(45) Date of Patent: Oct. 7, 2025

(54) ADJUSTABLE ANGLE CERVICAL SPINE DISTRACTOR

(71) Applicant: IvyTech Design LLC, Dover, DE (US)

(72) Inventors: Nicholas Szabo, Philadelphia, PA (US); Trevor Chan, Philadelphia, PA (US); Joshua Robert Vogel, Pembroke Pines, FL (US)

(73) Assignee: IvyTech Design LLC, Dover, DE (US)

( * ) Notice: Subject to any disclaimer, the term of this patent is extended or adjusted under 35 U.S.C. 154(b) by 0 days.

(21) Appl. No.: 18/740,669

(22) Filed: Jun. 12, 2024

(51) Int. Cl.
*A61B 17/02* (2006.01)

(52) U.S. Cl.
CPC .. *A61B 17/0206* (2013.01); *A61B 2017/0256* (2013.01)

(58) Field of Classification Search
CPC .... A61B 17/02; A61B 17/0206; A61B 17/025
See application file for complete search history.

(56) References Cited

U.S. PATENT DOCUMENTS

| | | | | |
|---|---|---|---|---|
| 5,052,373 A | * | 10/1991 | Michelson | A61B 17/0206 600/234 |
| 9,999,414 B2 | * | 6/2018 | Ruppert | A61B 17/0206 |
| 10,426,454 B2 | * | 10/2019 | Ponmudi | A61B 17/7077 |
| 2015/0320458 A1 | * | 11/2015 | Rezach | A61B 17/7085 606/279 |

* cited by examiner

*Primary Examiner* — Si Ming Ku
(74) *Attorney, Agent, or Firm* — Hoffberg & Associates; Steven M. Hoffberg

(57) ABSTRACT

A cervical distractor is provided having an elongated rigid member having a plane and an axis in the plane; a plurality of arms supported by the elongated rigid member, at least one of the arms having an adjustable position along the axis of the elongated rigid member, and being lockable in position; and a pin-holder on each arm, the pin holder being continuously deflectable over a range about a pivot by a mechanism which is locked or frictionally-engaged in position, the mechanism being separated along the arm from the elongated rigid member by a hinge.

20 Claims, 46 Drawing Sheets

Prior Art (DePuy Synthes)

Prior Art (TSI)

ADJUSTABLE ANGLE CERVICAL SPINE DISTRACTOR

FIELD OF THE INVENTION

The present invention relates to the field of orthopedic surgical instruments for aligning bone, and more particularly to an improved Caspar distractor with articulated feet.

INCORPORATION BY REFERENCE AND INTERPRETATION OF LANGUAGE

The disclosures of each reference disclosed herein, whether U.S. or foreign patent literature, or non-patent literature, are hereby incorporated by reference in their entirety in this application, and shall be treated as if the entirety thereof forms a part of this application.

Citation or identification of any reference herein, in any section of this application, shall not be construed as an admission that such reference is necessarily available as prior art to the present application.

All cited or identified references are provided for their disclosure of technologies to enable practice of the present invention, to provide basis for claim language, and to make clear applicant's possession of the invention with respect to the various aggregates, combinations, and subcombinations of the respective disclosures or portions thereof (within a particular reference or across multiple references). The citation of references is intended to be part of the disclosure of the invention, and not merely supplementary background information. The incorporation by reference does not extend to teachings which are inconsistent with the invention as expressly described herein (which may be treated as counter examples), and is evidence of a proper interpretation by persons of ordinary skill in the art of the terms, phrase and concepts discussed herein, without being limiting as the sole interpretation available.

The present specification is not to be interpreted by recourse to lay dictionaries in preference to field-specific dictionaries or usage. Where a conflict of interpretation exists, the hierarchy of resolution shall be the express specification, references cited for propositions, incorporated references, the inventors' prior publications relating to the field, academic literature in the field (i.e., published or intended to be published in a scholarly journal for the purpose of reporting new advances or reviewing existing art, and not for advocating sale of particular products or services), commercial literature in the field, field-specific dictionaries, lay literature in the field, general purpose dictionaries, and common understanding.

BACKGROUND OF THE INVENTION

Anterior cervical discectomy and fusion (ACDF) is a common surgical procedure performed to address various cervical spine pathologies, including degenerative disc disease, herniated discs, and spinal stenosis. While ACDF is generally considered a safe and effective intervention, like any surgical procedure, it is associated with potential complications. Understanding these complications is crucial for both patients and healthcare providers to make informed decisions and optimize postoperative care. This procedure aims to alleviate symptoms, restore stability, and facilitate neural decompression. The success of ACDF largely depends on achieving optimal spinal alignment and fusion to alleviate symptoms and restore stability. Despite its efficacy, ACDF is not without potential complications, and optimizing surgical techniques is an ongoing endeavor to enhance patient outcomes.

Spinal fusion implants and related surgical instruments for implanting a fusion device are known and disclosed in, for example, U.S. Pat. Nos. 11,911,078; 11,413,028; 11,185,319; 10,973,505; 10,507,046; 8,636,656; 8,100,828; 5,741,253; 5,658,337; 5,618,260; 5,609,636; 5,505,732; 5,489,308; 5,489,307; 5,484,437; 5,458,638; 5,055,104; 5,026,373; 5,015,247; 4,961,740; 201000113885; 20170231614; 20220192647; 20220202405, the disclosures of which are incorporated herein by reference.

The spinal canal is like a tunnel which runs up and down the human spine. This canal sits directly behind the bony blocks which make up the spine (vertebrae) and contains the nerves (spinal cord and nerve roots) running from the brain to all areas of the body. When something causes a narrowing of this canal then the nerves can become irritated or squeezed. This can lead to a variety of symptoms ranging from tingling, numbness, and weakness to severe pain and paralysis.

A herniated disc (often called a slipped disc) is one of several common conditions which can narrow the spinal canal, and occurs when a fragment of the disc nucleus is pushed out of the outer disc margin, into the spinal canal through a tear or "rupture." The spinal canal has limited space which is inadequate for the spinal nerve and the displaced herniated disc fragment. In the herniated disc's new position, it presses on spinal nerves, producing pain down the accompanying leg or arm. This may produce sharp, severe pain down the entire leg and into the foot or into the arm. The compression and subsequent inflammation are directly responsible for the pain one feels down the leg, termed "sciatica." The direct compression of the nerve may produce weakness in the leg or foot or arm in a specific pattern, depending upon which spinal nerve is compressed.

One solution for such a condition is the surgical removal of the herniated disc(s). If the herniated disc(s) are in the neck of a human, the surgical procedure is known as anterior cervical fusion, and requires retraction of the pharynx and the carotid sheath and its contents. The herniated disc(s) is(are) removed, and bone graft(s) seated in place of the herniated disc(s).

Once the herniated disc(s) is(are) removed, the vertebral body must be spread apart in order to seat the bone graft(s). A design issue of the retractors is that the vertebral body must be distracted (i.e., spread apart longitudinally along the line of the spine) in a maneuver with specialized instruments in order to seat the bone graft(s).

U.S. Pat. No. 5,728,046, issued Mar. 17, 1998, to Heinz M. Mayer, discloses in a surgical retractor having a frame on which at least two retractor elements are mounted, if desired, so as to be displaceable, to enable individual adjustment of the forces exerted by the retractor elements on the surrounding tissue, it is proposed that the frame have at least one support foot which carries attachment means for fixing on a bone.

A Caspar Distractor is an apparatus for that has two arms that are connected by a rod or bar with a mechanism that enables the arms to be brought toward or away from each other. At the end of each arm, an assembly for connecting to a bone is provided. In some cases, the assemblies are pivotable with respect to the arms, and allow some rotational motion between parts of the assembly so as to accommodate different positions of the bone. Once the assemblies are appropriately positioned, connected and locked to the bone, the mechanism can be operated to move the arms together in compression or apart in distraction.

The Caspar distractor is a versatile surgical instrument primarily designed for use in spinal surgeries, particularly in the cervical spine. Its primary application is in anterior cervical discectomy and fusion (ACDF) procedures. However, it's important to note that while the Caspar distractor is primarily associated with cervical spine surgeries, its applications may vary based on the specific surgical approach and the surgeon's technique. The instrument provides controlled distraction and stabilization, making it a valuable tool in a range of cervical spine procedures. Surgeons may choose to use the Caspar distractor based on the nature of the pathology, the surgical objectives, and individual patient factors.

The Caspar distractor is a widely used instrument in anterior cervical discectomy and fusion (ACDF) surgeries. It is used to gently distract and stabilize the cervical vertebrae, providing access to the intervertebral disc for removal and preparation of the disc space for fusion. Limited adaptability of the traditional Caspar distractor may result in challenges accessing the intervertebral disc space, especially in patients with varying spinal anatomies. While it is an essential tool for achieving vertebral distraction during the procedure, it does have certain limitations that may impact its effectiveness and versatility. Here are some of the limitations associated with the Caspar distractor.

The known Caspar distractor is a commonly used instrument in the ACDF procedure, facilitating distraction of the vertebral bodies to create space for disc removal and subsequent graft insertion. The current standard Caspar distractor provides effective vertebral distraction but lacks the ability to address diverse anatomical variations in the cervical spine during procedures such as ACDF.

The Caspar retractor (distractor) system, comprises the following components:

Blades: The retractor blades are thin, curved, and designed to gently separate soft tissues (such as muscles and ligaments) during surgery. These blades are available in different sizes and shapes to accommodate various anatomical structures.

Arms: The arms attach to the blades and provide stability. Surgeons can adjust the angle and depth of retraction by manipulating the arms.

Handle: The handle allows the surgeon to control the retractor system. It features a locking mechanism to secure the blades in the desired position.

Screw Mechanism: Some Caspar retractors include a screw mechanism that allows gradual tissue retraction. Surgeons can adjust the tension by turning the screw, providing precise control over tissue displacement.

Blade Extensions: In complex spinal surgeries, blade extensions can be added to increase the retraction area. These extensions maintain tissue separation while allowing access to deeper structures.

The Caspar retractor system is constructed as follows:

Blades: The blades are typically made of surgical-grade stainless steel or titanium. They undergo precision machining to achieve the desired curvature and edge sharpness.

Arms: The arms are also made of durable materials such as stainless steel, titanium or lightweight alloys. They are designed to be ergonomic and easy to manipulate during surgery.

Handle: The handle is typically molded from medical-grade plastic or metal. It incorporates the locking mechanism and ensures a comfortable grip for the surgeon.

Screw Mechanism: If the retractor includes a screw mechanism, it consists of a threaded rod and a knob. The rod is made of stainless steel or other materials, and the knob allows fine adjustments.

Blade Extensions: Blade extensions are additional components made to match the retractor system. They attach securely to the existing blades.

The Caspar retractor system is used as follows:

Preparation: The surgeon selects the appropriate blade size and attaches it to the arms.

The handle is assembled, and the screw mechanism (if present) is adjusted.

Incision: A surgical incision is made, and the retractor blades are inserted into the surgical site.

Tissue Retraction: The surgeon gently manipulates the arms to separate soft tissues, creating a clear path to the spine.

Locking: Once the desired tissue retraction is achieved, the handle's locking mechanism secures the blades in place.

Visualization and Surgery: With the Caspar retractor in position, the surgeon can visualize the spine and perform necessary procedures.

Surgical devices and techniques have been developed for removing diseased disc material and fusing the joint between opposing vertebral bodies. Arthrodesis of the intervertebral joint can reduce the pain associated with movement of a joint having diseased disc material. Some fusion techniques involve removal of the diseased disc, drilling a bore for receiving a fusion implant into the bore and inserting the implant between the opposing vertebral bodies.

The Caspar distractor has limited adaptability to anatomical variations. The traditional Caspar distractor has a static design, providing a fixed distraction angle. The static nature of the Caspar distractor may not adequately adapt to individual anatomical variations in the cervical spine. This lack of adjustability limits the surgeon's ability to tailor the distraction angle to the patient's specific anatomy, potentially leading to challenges in achieving optimal vertebral alignment. This may result in suboptimal distraction and hinder precision during surgery.

Complications Associated with ACDF Surgery include:

Subsidence, characterized by the sinking or settling of implants into adjacent vertebral bodies, poses a notable challenge in ACDF surgeries. Traditional Caspar distractors lack the adjustability needed to prevent damage to vertebral endplates and to ensure restoration of disc height and alignment, which would lower the risk of subsidence.

Incomplete fusion or non-union of the vertebral bodies, known as pseudarthrosis, is a significant concern in ACDF. This complication can lead to persistent pain, instability, and the need for revision surgery. Achieving optimal alignment and maintaining it throughout the fusion process is crucial for fostering a conducive environment for successful bone graft incorporation.

Inadequate decompression or improper vertebral alignment during ACDF surgery may pose a risk of neurological injury, including damage to the spinal cord or nerves. Precise control over the distraction angle is essential to avoid unnecessary pressure on neural structures and ensure a safe and effective decompression.

Adjacent segment degeneration is accelerated degeneration of spinal segments adjacent to the fused area. Over time, adjacent segments may experience increased stress and degeneration, potentially requiring further intervention.

The Caspar distractor may have limitations in addressing multi-level procedures. When dealing with pathologies involving multiple levels, the static design may make it challenging to optimize distraction across different segments of the cervical spine simultaneously.

Improper use or positioning of the Caspar distractor creates a risk of neurovascular compression. Compression of critical structures such as nerves and blood vessels can lead to complications, including neurological injury or compromised blood flow, emphasizing the need for precise and careful placement.

Achieving multi-planar corrections with the Caspar distractor can be complex. The instrument may be less effective in cases where deformities extend beyond a single plane, requiring additional maneuvers or complementary tools to achieve the desired correction.

The traditional Caspar distractor lacks a real-time adjustable mechanism. Real-time adjustability is beneficial in tailoring the surgical approach to the dynamic anatomical changes encountered during the procedure, contributing to enhanced precision.

The fixed distraction angle may result in less accurate alignment, especially in cases with unique or atypical anatomy. Inaccurate alignment could compromise the success of the fusion and may contribute to complications such as pseudarthrosis.

Efforts to address these limitations may involve the development of next-generation Caspar distractors with adjustable features, real-time adaptability, and improved ergonomics to enhance their utility in the evolving landscape of cervical spine surgery.

To treat the condition or injury of the patient, the surgeon obtains access to the surgical site in a manner well known in the art, e.g. through incision and retraction of tissues. Once access to the surgical site has been obtained, e.g. via an opening such as a midline incision above the affected area, with tissue being resected laterally to the transverse process, or by other surgical procedure. The surgeon may connect one or more implants to adjacent or nearby vertebrae that require compression or distraction in order to relieve or improve their condition. For example, pilot holes in vertebrae, e.g. in pedicles, may be made, and screws may be inserted into or otherwise connected to two or more vertebrae. In one embodiment, a support member (for example, a spinal rod, with or without appropriate lateral or other connectors) may be connected to the implants, and tightened to one of the implants.

Once such implants are placed as desired by the surgeon, the surgeon can move instrument 30 into position adjacent the implants. The surgeon may first adjust the distance between arms 32 and 34 to approximately the distance between the inserted bone screws, by turning threaded rod 36 and/or by using release mechanism 61. With arms 32 and 34 adjusted with respect to each other so that their respective assemblies 38 are adjacent the inserted implants, each implant is inserted through a respective collet 84 of adjacent assembly 38. Each implant may be inserted into a respective collet 84 to any of a number of depths. For example, one can be inserted into a collet 84 so that a top portion extends above top surface 126 of collet 84, while another may be inserted into another collet 84 so that the top extends half-way or slightly more through the hole of that collet 84. This ability for variable height adjustment makes it easier for the surgeon to connect instrument 30 to a pair of screws, the tops of which may not be substantially even in height. Further, extension 82 can be rotated with respect to connecting body 80 as noted above, and thus the surgeon may rotate extension 82 so that collet 84 is substantially collinear with a bone screw.

Once the screws are within their respective collets 84 as the surgeon desires, nut 86 is tightened on threaded portion 130 of collet 84. Tightening nut 86 against an upper surface of extension 82 draws collet 84 along the hole, and forces the convex surfaces against the inner surface of the hole. Thus, tightening nut 86 forces compression of the lower portion and slots of collet 84, squeezing the lower portion against the implant to lock collet 84 and the implant together.

Once the bone screws are connected to their respective assemblies 38, compression or distraction of the bones to which the bone screws are attached can occur. The surgeon may turn rod 36 in one direction to bring arm 34 toward arm 32, to achieve compression of the bones. Conversely, the surgeon may turn rod 36 in the other direction to move arm 34 away from arm 32, resulting in distraction of the bones. Once distraction or compression is performed to the surgeon's satisfaction, a support member may be tightened to one or both of the implants to maintain the distracted or compressed state of the vertebrae. Instrument 30 may be removed by loosening nuts 86 on assemblies 38 and sliding collets 84 off their respective implants.

U.S. Pat. No. 11,911,078 discloses a distractor and method of use for spinal fusion procedures. The device has a retractor body which includes an engagement post. A rear body portion includes a lower-facing inside tapered surface that allows the medial blade 18 to pivot within a plane that is transverse to the longitudinal axis of a medial rack member. This pivoting enables intraoperative repositioning of the retractor body relative to the surgical target site without the need to detach the retractor body from the articulating arm. The net effect is to alter the approach angle of the operative corridor relative to the surgical target site.

U.S. Pat. No. 11,413,028 discloses a screw-based retractor having an elongate rack having a rack axis, a plurality of arms slidably supported for translational movement on the rack, and a plurality of blades, one each supported by a respective arm at a distal portion thereof. At least one arm comprises a plurality of links each of which is configured to allow the blade supported by such arm to be moved in plural incrementally discrete positions with each such discrete position being selectively lockable. The blade may have a fixed or variable length.

Traditional polyaxial pedicle screws comprise an elongate shaft threaded at one end and a head, typically having a spherical surface, at the other end. A yoke having a U-shaped slot for receiving a fixation rod is typically pre-assembled to the screw head in a manner to allow articulating movement of the yoke relative to the threaded shaft. In a modular pedicle screw construction, the yoke with pivot is configured to be attached to the screw head subsequent to the threaded installation of the threaded shaft into a pedicle. The retractor has various degrees of freedom of articulation of the screws with respect to the rack.

U.S. Pat. No. 10,973,505 discloses a retractor for use in surgical operations which comprises a pair of blade assemblies. In operation, the blade assemblies are initially in a closed position to assume a low profile, inserted into a relatively small incision, and stretched apart from each other, thereby stretching the skin about the incision to form an aperture longer than the incision. The retractor is adapted to rotate a first blade about a first axis and a second blade about a second axis. The retractor is adapted to move the pair of blade assemblies apart along a third axis. The retractor is adapted to pivot the first blade about a fourth axis and the second blade about a fifth axis. A method of performing an operation, e.g. a spinal operation, on a patient using the disclosed retractor is provided. A pivot mechanism on the first and/or second blades can be manipulated to pivot the blades (e.g., to a pivoted position), pulling the incised tissue apart in one or more directions that are not parallel to the incision. Optionally, an adjuster on the first and/or second arms can be manipulated to slide or otherwise translate the arms (e.g., to a slid position), pulling the incised tissue apart in directions that are not parallel to the incision. An adjuster on the third blade can be manipulated to slide or otherwise translate the third blade (e.g., to a slid position), pulling the incised tissue apart in directions that are not parallel to the incision.

SUMMARY OF THE INVENTION

The present technology provides a dynamic mechanism improvement to the Caspar distractor, that enables the independent angulation of vertebral bodies through each of the Caspar pins (generally two) held in place by the device. These improvements may positively impact patient outcomes and reduce the challenges associated with traditional distractors.

The same mechanism may be provided on other surgical instruments, and for other procedures, and therefore the technology is not limited to improvements of any single known device. In particular, the technology introduces a pivot hinge in the arm of the instrument that supports a pin or bone screw, for example, which may be set at an arbitrary angle and maintained in position under various forces during the procedure.

The instrument is intended as an interoperative device, and would typically not be implanted or used as an external fixture during patient recovery. However, known accommodations could be made to permit maintenance of the device in place post-operatively, such as by reducing or eliminating potential spaces for bacterial growth, including antibacterial coatings, providing a smooth uninterrupted surface for tissue contact, etc.

Customizing the distraction angle for each vertebral body based on individual patient anatomy is potentially important in achieving precise alignment during ACDF. The enhanced distractor according to the present technology enables real-time adjustments, providing surgeons with unprecedented control over the surgical environment. The incorporation of a mechanism to allow the distractor to adjust the angle of vertebrae during ACDF represents an advancement in surgical precision with the potential to mitigate various risks associated with the procedure. Specifically, the addition of this angular adjustment mechanism results in improved alignment, reduced postoperative complications, and optimized fusion rates.

The independent angulation feature addresses the unique anatomical characteristics of each patient, and in some cases, curvature associated with normal anatomy not accommodated by the fixed rectangular relationships of the standard Caspar distractor.

The technology accommodates variations in vertebral morphology as well as sagittal alignment of the spine. Moreover, the biomechanical advantages of the improved distractor extend to enhanced fusion outcomes. The capacity to optimize vertebral alignment contributes to a more favorable environment for successful bone graft incorporation, reducing the risk of pseudarthrosis and promoting long-term spinal stability. This, in turn, has the potential to mitigate the need for revision surgeries and the associated complications.

In addition, more precise placement of bone grafts decreases the likelihood of subsidence by properly restoring disc height and alignment and minimizing damage to the vertebral endplates. Lastly, the ability to perform real-time changes in vertebral angle mitigates the risk of compressing the spinal cord or placing excessive load on adjacent segments through over-distracting, thus lowering the potential for neurological complications and adjacent segment degeneration, respectively.

The integration of a mechanism allowing independent angulation of each vertebral body as a modification of a standard Caspar distractor represents a significant advance in spine surgery. The surgeon's ability to customize vertebral alignment in real-time not only enhances precision but could also minimize the rate of complications and lead to improved patient outcomes.

The present technology Introduces an adjustable mechanism to a vertebral distractor, allowing the manipulation of vertebral angle by each of the pins, which addresses several limitations associated with the traditional static vertebral distractor designs. This offers the potential to improve surgical precision, adaptability to individual anatomies, and the overall efficacy of anterior cervical discectomy and fusion (ACDF).

The design provides easier removal of herniated disc. It is adjustable for precise alignment. The ability to manipulate the vertebral angle independently for each (Caspar) pin offers precise control over the alignment of the vertebral bodies. This can be particularly advantageous when dealing with a herniated disc, as the surgeon can optimize the distraction angle to provide better access to the pathology.

The design provides tailored distraction. It customizes the distraction angle based on the specific location and nature of the herniation enables the surgeon to more easily visualize and access the affected disc. The fine-tuned alignment can contribute to a more straightforward and controlled removal of the herniated disc tissue.

The design provides easier insertion of intervertebral disc implant. It provides optimized vertebral alignment. The adjustability of vertebral angles with the vertebral distractor facilitates optimal vertebral alignment after disc removal. This can create a more favorable environment for the insertion of an intervertebral disc implant.

The technology provides precise disc height restoration. The adjustable mechanism allows surgeons to precisely manipulate the vertebral angles, facilitating more accurate restoration of disc height during the ACDF procedure. Optimal disc height restoration is important to maintaining proper spinal alignment and reducing the risk of complications, including subsidence.

The technology provides tailored sizing and placement. Surgeons can customize the vertebral alignment to ensure precise sizing and placement of the intervertebral disc implant. This adaptability is important in achieving a snug fit and enhancing the stability of the implant within the disc space.

The technology provides an improved graft packing and fusion environment. Precise manipulation of vertebral angles enhances the surgeon's ability to optimize the graft packing in the disc space. Improved graft packing creates a more stable fusion environment, reducing the likelihood of subsidence by promoting successful fusion between vertebral bodies. In addition, the ability to tailor the vertebral alignment contributes to an improved fusion environment. By optimizing the placement of the intervertebral disc implant, the surgeon can enhance the chances of successful fusion, reducing the risk of complications such as pseudarthrosis.

The technology provides easier positioning of the distractor over the pins. It provides independent adjustment for pin placement. The adjustable mechanism allows independent manipulation of each pin's vertebral angle. This flexibility simplifies the initial positioning of the distractor over the pins during device placement.

The technology permits real-time adaptations. Surgeons can make real-time adjustments to the vertebral angles, ensuring that the distractor is securely and precisely positioned over the pins. This adaptability is particularly valuable in addressing anatomical variations and optimizing the device's placement.

The technology provides enhanced accuracy and efficiency. The ability to fine-tune the vertebral angles improves the accuracy and efficiency of the distractor placement. This may contribute to a smoother and quicker initial setup, streamlining the overall surgical process.

The technology provides for customization of vertebral angle. The adjustable mechanism therefore allows surgeons to customize the vertebral angle for each Caspar pin independently. Independent adjustment reduces the risk of inaccurate alignment. This customization addresses the variability in patient anatomy, enabling surgeons to fine-tune the distraction angle for optimal alignment, reducing the risk of complications associated with a one-size-fits-all approach. Surgeons can fine-tune the vertebral angles to achieve more accurate alignment, enhancing the success of fusion and potentially reducing complications such as pseudarthrosis.

The technology facilitates adaptability to anatomical variations. The independent manipulation of vertebral angles accommodates diverse anatomical variations. Surgeons can adapt the distractor to the specific spinal anatomy of each patient, ensuring optimal distraction and alignment during ACDF procedures.

The technology improves precision in multi-level procedures. The adjustable mechanism facilitates precise distraction across multiple levels. In cases involving multi-level procedures, surgeons can independently adjust the vertebral angles for each Caspar pin, enhancing precision and effectiveness in achieving distraction and alignment.

The technology reduces risk of neurovascular compression. Real-time adjustability enables careful manipulation to minimize the risk of neurovascular compression. Surgeons can make incremental adjustments, ensuring that critical structures, such as nerves and blood vessels, are not excessively compressed, thereby reducing the risk of associated complications.

The technology provides versatile in multi-planar corrections. Surgeons can manipulate the vertebral angles in various planes, addressing deformities that extend beyond a single plane and improving the instrument's versatility in complex cases.

The technology permits real-time adjustability for dynamic corrections. Surgeons can make real-time adjustments during the surgery, ensuring that the distraction angles are optimized based on the evolving intraoperative conditions. Surgeons can adapt the distraction angle in response to real-time feedback, optimizing correction strategies and improving overall precision. This adaptability minimizes the risk of postoperative complications, including subsidence, by addressing potential issues during the surgery itself.

Independent manipulation allows for more even load distribution. A lordotic alignment can help distribute load forces more evenly across the intervertebral implant, potentially reducing the risk of subsidence. The ability to independently adjust the vertebral angles with the distractor enables surgeons to achieve a customized lordotic alignment based on the patient's anatomy. The adjustable mechanism may contribute to a more uniform application of forces across the disc space, optimizing load-sharing dynamics and potentially improving fusion outcomes.

The adjustable mechanism allows for real-time adjustments, minimizing the risk of over-distraction during the procedure. Over-distraction can lead to increased stress on the implant and adjacent vertebrae, contributing to subsidence. The ability to fine-tune vertebral angles helps prevent excessive distraction.

The adjustable distractor may contribute to a more anatomically aligned and evenly loaded implant, reducing stress on the intervertebral device. Minimizing stress on the implant can help prevent implant subsidence and improve the long-term stability of the fusion construct.

The adjustable mechanism in the Caspar distractor allows precise manipulation of vertebral angles, addressing the limitation by providing surgeons with the flexibility to customize distraction angles. This adaptability improves access to the disc space, enhancing the overall efficiency of ACDF procedures.

The adjustable distractor technology is particularly impactful in ACDF procedures. Surgeons can tailor vertebral angles to optimize access to the intervertebral disc, facilitating disc removal, graft placement, and fusion. Customization enhances the ease of surgery and may contribute to improved patient outcomes. The adjustable mechanism allows surgeons to precisely restore disc height and alignment, minimizing the risk of implant subsidence. Improved control over vertebral angles enhances the fusion process, promoting a more stable construct.

The adjustable distractor technology can be used in surgeries aimed at correcting cervical spine deformities, such as kyphosis or lordosis. It aids in distraction and stabilization during corrective procedures. Traditional Caspar distractors may have limitations in correcting complex cervical deformities due to a lack of flexibility in distraction angles. The adjustable distractor technology has an ability to independently manipulate vertebral angles offers enhanced control in correcting cervical deformities. Surgeons can tailor distraction angles for multi-planar corrections, improving the precision of the corrective procedure.

The adjustable Caspar distractor is instrumental in surgeries aimed at correcting cervical deformities, such as kyphosis or lordosis. Surgeons can tailor vertebral angles to achieve optimal alignment, contributing to the success of corrective procedures.

In cervical corpectomy procedures, where a vertebral body or portion of it is removed, the Caspar distractor aids in distraction and stabilization during the removal and subsequent fusion of the affected vertebral segment. Limited control over distraction angles with traditional distractors may complicate corpectomy procedures, especially when dealing with multiple vertebral levels. The adjustable distractor technology has an ability to independently manipulate vertebral angles offers enhanced control during corpectomy. Surgeons can tailor distraction angles for each level, optimizing the surgical approach and improving the precision of vertebral body removal. Enhanced control over vertebral angles aids in achieving precise alignment during cervical corpectomy, which could reduce the risk of postoperative malalignment and instability. Surgeons can customize distraction, aiding in the safe and efficient removal of vertebral segments and subsequent fusion.

In cervical disc replacement procedures, the adjustable distractor technology may be used during the preparation of the disc space for the insertion of an artificial disc. It aids in distraction and stabilization during the placement of the implant. Limited adaptability of traditional distractors may hinder precise preparation of the disc space for artificial disc insertion. The adjustable distractor technology has an ability to customize vertebral angles enhances the preparation of the disc space for cervical arthroplasty. Surgeons can achieve optimal alignment for successful artificial disc placement, potentially improving the longevity of the implant. In cervical disc replacement surgeries, the adjustable distractor technology allows for precise manipulation of vertebral angles, optimizing the preparation of the disc space for the insertion of an artificial disc. This adaptability aids in achieving optimal implant positioning.

In cases of cervical spine fractures, the adjustable distractor technology may be utilized to distract the affected vertebrae during the placement of fixation devices, such as plates and screws, for fracture repair. Inability to fine-tune distraction angles with traditional distractors may pose challenges in achieving optimal stabilization during cervical fracture fixation. The adjustable Caspar distractor addresses this limitation by allowing surgeons to customize distraction angles for precise fracture stabilization. This could allow better visualization to ensure complete removal of fractured bone fragments. In addition, this adaptability enhances the overall stability of the fixation construct by allowing angulation of the vertebrae to provide optimal sagittal alignment. In cervical spine fracture repair, the adjustable Caspar distractor enhances the ease of surgery and could improve outcomes by allowing precise manipulation of vertebral angles during the placement of fixation devices.

The introduction of an adjustable mechanism to the adjustable distractor technology extends its utility across a spectrum of spinal procedures. This innovation empowers surgeons with greater control, adaptability, and precision, fostering advancements in the field of spinal surgery and ultimately improving patient outcomes.

While the traditional Caspar distractor provides effective vertebral distraction, its static design limits the ability to address individualized anatomical variations and optimize the angle of the vertebrae during fusion. The advent of a dynamic mechanism that allows for adjustable angles not found in the Caspar distractor presents significant clinical advantages in the realm of ACDF, including the following:

Reduced Neural Compression: Precise control over vertebral alignment can help in avoiding unintended neural compression. The adjustable Caspar distractor enables real-time adjustments, allowing surgeons to navigate around neural structures with greater precision and reducing the risk of postoperative neurological complications.

Enhanced Fusion Environment: Optimal vertebral alignment contributes to a more favorable environment for bone graft incorporation. By fine-tuning the distraction angle, the adjustable Caspar distractor may promote improved contact between graft material and host bone, potentially reducing the risk of pseudarthrosis and enhancing overall fusion rates.

Precision in Alignment: The capability to adjust the angle of the Caspar distractor enables surgeons to achieve precise alignment of the vertebrae. This is particularly crucial in cases where patients exhibit unique anatomical variations or deformities. The ability to customize the distraction angle enhances surgical precision, ensuring optimal placement of interbody grafts and promoting improved outcomes by providing a biomechanically favorable environment for fusion.

Patient-Specific Adaptability: Human anatomy varies widely, and each patient may present with distinct spinal characteristics. An adjustable Caspar distractor accommodates these individual differences, allowing surgeons to tailor the distraction angle according to the patient's specific anatomical needs. This adaptability enhances the surgeon's ability to address complex cases and ensures a more patient-specific approach to spinal surgery.

Improved Fusion Rates: The adjustable Caspar distractor has the potential to positively impact fusion rates. By optimizing vertebral alignment based on individual patient anatomy, the distractor promotes a more favorable environment for bone graft incorporation. This can contribute to enhanced fusion rates, reducing the risk of pseudarthrosis and improving the long-term stability of the cervical spine.

In summary, introducing an adjustable mechanism not found in the known Caspar distractor, enables the independent manipulation of vertebral angle by each of the two Caspar pins, has the potential to address several limitations associated with the traditional static design. By offering surgeons greater control over vertebral alignment and the ability to tailor the procedure to the unique anatomical characteristics of each patient, this innovation may contribute to improved fusion outcomes, minimized neural compression, and reduced post-surgical complications ultimately enhancing the safety and efficacy of ACDF surgeries.

The introduction of an adjustable mechanism to the Caspar distractor in ACDF surgery provides enhanced flexibility and precision. This innovation can make the removal of herniated discs more accessible, simplify the insertion of intervertebral disc implants, and improve the initial positioning of the Caspar distractor over pins, ultimately contributing to improved surgical outcomes and patient experiences.

Introducing an adjustable mechanism to the Caspar distractor, enabling the manipulation of vertebral angle independently for each of the two Caspar pins, could provide a significant breakthrough in addressing the limitations associated with current instruments used in spinal deformity correction in the cervical spine. Pathologic changes in the sagittal alignment of the spine, manifesting as excessive lordosis or kyphosis, can result in significant pain, functional impairment, and decreased quality of life. Current methods for correcting these deformities often involve complex spinal instrumentation and fusion techniques. Traditional approaches to correct lordosis or kyphosis may require extensive surgical interventions, involving the use of pedicle screws, rods, and bone grafts. These procedures, while effective, come with inherent risks, prolonged recovery times, and potential complications associated with extensive spinal fusion.

This innovation offers a more dynamic and adaptable approach to deformity correction, potentially overcoming several existing challenges.

The potential benefits of the adjustable distractor technology for spinal deformity procedures include:

Customizable Sagittal Alignment: The incorporation of an adjustable mechanism in the Caspar distractor allows for real-time manipulation of vertebral angles. This adaptability could be instrumental in customizing the sagittal alignment of the spine, addressing specific lordotic or kyphotic deformities on a case-by-case basis.

Dynamic Correction: The dynamic nature of the adjustable Caspar distractor allows for incremental adjustments during the surgical procedure. Surgeons can fine-tune the vertebral angles to achieve the desired correction gradually, minimizing the risk of overcorrection or undercorrection and optimizing outcomes.

Adaptable to Different Levels of the Spine: The versatility of an adjustable Caspar distractor extends its potential use to various levels of the spine, not limited to the cervical region. This adaptability opens avenues for addressing pathologic sagittal alignment issues in other spinal segments, providing a comprehensive solution for patients with multi-level deformities.

Reduced Complications: Utilizing the adjustable Caspar distractor in spinal deformity correction may potentially reduce complications associated with extensive fusion procedures, such as adjacent segment degeneration and hardware-related issues. This could result in improved long-term outcomes and a decreased need for revision surgeries.

The adjustable distractor technology addresses these limitations as follows:

Customizable Correction in Multiple Planes. The adjustable mechanism allows surgeons to manipulate vertebral angles independently for each Caspar pin. Surgeons can customize the correction in multiple planes, addressing complex deformities that extend beyond a single plane and improving the versatility of the instrument.

Adaptability to Individual Anatomies. Independent adjustment of vertebral angles accommodates individual anatomical variations. The adjustable Caspar distractor can be tailored to the specific spinal anatomy of each patient, enhancing adaptability and precision in deformity correction procedures.

Real-time Adjustability for Dynamic Corrections. The real-time adjustability of vertebral angles allows for dynamic corrections during surgery. Impact: Surgeons can respond to real-time feedback and make immediate adjustments, optimizing the correction strategy and potentially reducing the risk of overcorrection or undercorrection.

Reduced Risk of Neurovascular Compression: Real-time adjustability minimizes the risk of neurovascular compression during correction. Impact: Surgeons can carefully manipulate the vertebral angles to avoid excessive compression on critical structures, mitigating the risk of complications such as neurological injury or compromised blood flow.

Improved Precision in Multi-level Corrections. The adjustable Caspar distractor facilitates precise corrections across multiple levels. Surgeons can independently adjust vertebral angles for each pin, optimizing distraction and alignment in multi-level deformity correction procedures.

Enhanced Visualization During Adjustments. Real-time adjustability minimizes disruptions to visibility during the procedure. Surgeons can make adjustments without obstructing the surgical field, ensuring continuous visualization of critical structures and facilitating a more streamlined and efficient surgical workflow.

Versatility in Load Distribution. Independent manipulation allows for more even load distribution. The adjustable mechanism may contribute to a more uniform application of forces across the disc space, optimizing load-sharing dynamics and potentially improving fusion outcomes.

Patient-Specific Deformity Correction. The adjustable Caspar distractor enables patient-specific deformity correction. Surgeons can tailor the correction strategy to the unique characteristics of each patient's deformity, potentially improving overall outcomes and reducing the risk of complications.

In conclusion, introducing an adjustable mechanism to a distractor such as the traditional Caspar distractor, allowing independent manipulation of vertebral angles for each Caspar pin, can overcome several limitations associated with current instruments used in cervical spine deformity correction. This offers a more dynamic, adaptable, and patient-specific approach, potentially improving the precision, safety, and outcomes of cervical spine deformity correction procedures. As the field of spine surgery continues to evolve, the adjustable distractor technology presents a promising avenue for advancing the precision and efficacy of spinal deformity correction procedures.

The technology also offers a two-level ACDF device, with three adjustable arms. Each arm may have an independently adjustable articulation.

Current devices used in cervical spine surgery have various limitations, including:

Limited Adjustability. Many existing devices lack the ability to adjust the vertebral angle during surgery. This limitation can hinder the precision required in cervical spine procedures. The introduction of an adjustable mechanism allows for manipulation of vertebral angle by each of the pins. This added flexibility enables surgeons to fine-tune the vertebral alignment, enhancing precision in surgical procedures.

Sequential Adjustment. Some devices may allow adjustments but often in a sequential manner, focusing on one vertebra at a time. This can increase the overall duration of the surgery. The additional (third) arm in the adjustable distractor technology allows the surgeon to control three pins simultaneously. This feature enables the adjustment of three vertebrae at once, potentially reducing the overall surgical time. The ability to address multiple vertebrae concurrently enhances efficiency during cervical spine surgery.

Limited Control Options. Existing devices may not provide surgeons with sufficient control over the number of vertebrae they can manipulate simultaneously. The adjustable distractor technology provides an additional (third or more) arm, giving surgeons the capability to control three (or more) pins concurrently. This expanded control allows for a more comprehensive adjustment of multiple vertebrae, providing surgeons with greater flexibility and precision in managing the cervical spine.

Inefficiency in Multi-level Procedures. Traditional devices may be less efficient in multi-level cervical spine surgeries due to the need for sequential adjustments. By allowing the simultaneous adjustment of three vertebrae, the adjustable distractor technology enhances efficiency in multi-level procedures. Surgeons can address multiple levels of the cervical spine more quickly and with greater control, potentially reducing the overall complexity and duration of surgery.

Ease of Use and Ergonomics. Some devices may lack user-friendly features or ergonomic design, impacting the ease of use for surgeons. The introduction of an adjustable mechanism and an additional (third or more) arm is not only functional but also considers the surgeon's ease of use. The design improvements aim to enhance the overall ergonomics of the adjustable distractor technology, providing a more user-friendly experience for surgeons during cervical spine surgeries.

In summary, the adjustable distractor technology addresses the limitations of current cervical spine surgery devices by introducing an adjustable mechanism for vertebral angle manipulation and an additional arm for simultaneous control of three pins. These enhancements contribute to increased precision, efficiency, and ease of use in cervical spine surgical procedures.

The adjustable distractor technology with an adjustable mechanism and one or more additional arms, allowing simultaneous control of three pins, could find application in various spine procedures. The enhanced features of this device have the potential to address current limitations in these procedures.

For example, the device may be used in multi-level anterior cervical discectomy and fusion (ACDF). Limited control over vertebral angles in traditional Caspar distractors may impact precise restoration of disc height and alignment. Performing multi-level ACDF procedures with traditional distractors may be time-consuming and could lead to uneven loading across levels. Simultaneous control of three or more Caspar-type pins expedites multi-level procedures, reducing surgical time. This feature also allows for uniform distraction forces, minimizing the risk of uneven loading, subsidence, or stress shielding across adjacent levels. The adjustable mechanism and additional arm(s) allow control of three or more Caspar-type pins, facilitating precise adjustment of vertebral angles. This enhances the restoration of disc height and alignment, potentially improving fusion outcomes and reducing the risk of complications, including Subsidence (the adjustable mechanism facilitates precise restoration of disc height and alignment, potentially reducing the risk of implant subsidence) and uneven loading (simultaneous control of three pins promotes uniform distraction forces, minimizing the risk of uneven loading across multiple levels).

The device may be used in cervical corpectomy. Limited control in traditional distractors may pose challenges in achieving optimal vertebral alignment during cervical corpectomy. The adjustable mechanism and additional arm provide enhanced control over vertebral angles, aiding in achieving precise alignment during cervical corpectomy. This contributes to improved stability and reduces the risk of complications related to alignment issues. This addressed malalignment (enhanced control over vertebral angles helps achieve precise alignment during cervical corpectomy, reducing the risk of postoperative malalignment).

The technology may also be used in correction of cervical deformities. Traditional distractors may lack the adaptability needed for correcting complex cervical deformities. Simultaneous control of three Caspar-type pins and adjustable vertebral angles enable surgeons to address multi-planar corrections in cervical deformity cases. This enhances the precision of the corrective procedure, reducing the risk of incomplete correction and associated complications. This addresses incomplete correction. Simultaneous control of three Caspar-type pins and adjustable vertebral angles allow for multi-planar corrections, reducing the risk of incomplete deformity correction.

The introduction of an adjustable mechanism and an additional arm to control three Caspar-type pins at once in the adjustable distractor technology for a two-level anterior cervical discectomy and fusion (ACDF) has several potential advantages that could contribute to a reduction in the risk of complications.

The multi-arm technology provides enhanced stability and alignment. The addition of an adjustable mechanism allows for precise manipulation of vertebral angles during the ACDF procedure. This, combined with the capability to control three Caspar-type pins simultaneously, enhances stability and alignment during the fusion process. Improved stability and alignment contribute to a more favorable environment for successful fusion, reducing the risk of complications such as pseudarthrosis or implant migration.

The multi-arm technology provides uniform loading across levels. The ability to control three Caspar-type pins simultaneously enables the surgeon to distribute distraction forces more evenly across multiple levels. This feature reduces the risk of uneven loading on adjacent vertebrae and implants, minimizing the likelihood of complications such as subsidence or stress shielding at individual levels. The technology provides customized distraction for each level.

The adjustable mechanism allows for individualized manipulation of vertebral angles at each level where discs are being removed. Customized distraction facilitates personalized alignment and lordotic restoration, optimizing the fusion environment for each intervertebral space.

The adjustable mechanism provides real-time intraoperative adjustments. The adjustable mechanism allows for real-time adjustments, ensuring that the distraction angles and forces are optimized throughout the surgery. Real-time adaptability minimizes the risk of complications by addressing any intraoperative challenges or variations in anatomy, contributing to better outcomes.

The adjustable technology provides an improved graft packing and fusion environment. The surgeon's ability to control three Caspar pins simultaneously facilitates efficient graft packing across multiple levels. Improved graft packing creates a more stable fusion environment, enhancing the likelihood of successful fusion and reducing the risk of complications.

The adjustable technology minimizes surgical time. Simultaneous control of three Caspar-type pins can potentially reduce the overall surgical time for a two-level ACDF procedure. Minimizing surgical time is associated with a lower risk of complications, including infection and other intraoperative challenges.

The adjustable technology prevents of over-distraction. The adjustable mechanism, when combined with the ability to control three Caspar pins at once, helps prevent over-distraction during the procedure. Over-distraction can contribute to complications such as implant subsidence or damage to surrounding structures. The design aims to mitigate these risks by providing finer control over distraction forces.

The adjustable technology provides improved ergonomics for surgeons. The additional arm and simultaneous control of three Caspar-type pins may improve the ergonomics for the surgeon during the procedure. Enhanced ergonomics can contribute to precision and reduce the risk of intraoperative errors, ultimately minimizing complications.

The multi-level ACDF provides enhanced control. In multi-level ACDF procedures, where the risk of subsidence may be higher, the adjustable Caspar distractor allows for individualized manipulation of vertebral angles at each level. Tailoring distraction angles at each level improves the surgeon's control over the procedure, reducing the risk of uneven loading and subsidence in the long term.

It is therefore an object to provide a cervical distractor, comprising an elongated rigid member defining a plane and an axis in the plane; a plurality of arms supported by the elongated rigid member, at least one of the arms having an adjustable position along the axis of the elongated rigid member, and being lockable in position; and a pin-holder on each arm, the pin holder being continuously deflectable over a range about a pivot by a mechanism which is locked or frictionally-engaged in position, the mechanism being separated along the arm from the elongated rigid member by at least one hinge.

The elongated rigid member may comprise a rack gear, and the at least one arm may be adjusted along the rack gear by rotation of a pinion gear.

The at least one hinge may comprise two hinges.

The pinion gear may be manually rotatable with a knob.

A rotation of the pinion gear may be lockable with a manually-operable lever.

The cervical distractor may comprise two, three or more arms.

At least one arm may be fixed in position on the elongated rigid member.

The pin-holder may be configured to align a Caspar-type pin.

The at least one hinge may have a hinge axis parallel to the axis of the elongated rigid member.

The mechanism may comprise a helically-threaded rod and a follower, which is frictionally maintained in position. The mechanism may further comprise a pivot having an axis orthogonal to a hinge axis of the at least one hinge. A rotation of the helically threaded rod may displace the follower, e.g., about a second pivot, to exert a torque about the pivot on the pin-holder. The follower may drive a plate to incline. A first end of the pin-holder may have a shaft that sits in a slot in the plate, and a second end of the pin-holder may be mounted on the arm by the pivot, such that the torque causes a movement of the shaft in the slot and a rotation of the pivotally mounted second end of the pin-holder with respect to the arm about the pivot. The pin-holder has a symmetric range of movement with respect to the arm.

It is also an object to provide a method of operating a cervical distractor, comprising providing an elongated rigid member defining a plane and an axis in the plane, having a plurality of arms supported by the elongated rigid member, at least one of the arms having an adjustable position along the axis of the elongated rigid member, and being lockable in position, and a pin-holder on each arm, the pin holder being continuously deflectable over a range about a pivot by a mechanism which is locked or frictionally-engaged in position, the mechanism being separated along the arm from the elongated rigid member by a hinge; adjusting an angle of the hinge and mechanism of each arm; inserting a pin in each pin-holder into separate vertebrae; and adjusting a space between the separate vertebrae by adjusting the position along the axis of the at least one arm along the elongated rigid member.

It is another object to provide an arm mount for a cervical distractor, comprising: a control configured to control a position with respect to an elongated rigid member having a plane and an axis in the plane; a lock, configured to selectively lock and release the control; a pin-holder which is deflectable over a range about a pivot by a mechanism which is locked or frictionally-engaged in position; and a hinge disposed between the pin-holder and the control, configured to incline the pin-holder along an axis different from the pivot with respect to the elongated rigid member.

The elongated rigid member may comprise a rack gear, and the at least one arm is adjusted along the rack gear by rotation of a pinion gear.

The pinion gear may be manually rotatable with a knob.

Rotation of the pinion gear may be lockable with a manually-operable lever.

The pin-holder may be configured to align a Caspar-type pin.

The hinge may have a hinge axis parallel to the axis of the elongated rigid member.

The mechanism may comprise a helically-threaded rod and a follower, which is frictionally maintained in position.

The mechanism may comprise a pivot having an axis orthogonal to a hinge axis of the hinge.

A rotation of the helically threaded rod may displace the follower to exert a torque about the pivot on the pin-holder.

The follower may drive or cause a plate to incline, a first end of the pin-holder has a shaft that sits in a slot in the plate, and a second end of the pin-holder is mounted on the arm by the pivot, such that the torque causes a movement of the shaft in the slot and a rotation of the pivotally mounted second end of the pin-holder with respect to the arm about the pivot.

The follower may drive or cause a plate to incline about a second pivot, a first end of the pin-holder has a shaft that sits in a slot in the plate, and a second end of the pin-holder is mounted on the arm by the pivot, such that the torque causes a movement of the shaft in the slot and a rotation of the pivotally mounted second end of the pin-holder with respect to the arm about the pivot.

It is another object to provide an arm mount for a cervical distractor, comprising: a control configured to control a position with respect to an elongated rigid member such as a toother rack, having an elongated axis; a pin-holder which has an adjustable inclination with respect to the axis over a range; and at least one hinge configured to incline the pin-holder along an axis different from an axis of the adjustable inclination. A position of the arm mount may be adjusted along the rack gear by manual rotation of a pinion gear, and a rotation of the pinion gear may be lockable such as with a lever. An angle of the inclination and an angle of the hinge may also be lockable. The pin-holder may be configured to align a Caspar-type pin for insertion into bone at an adjustable angle.

At least one hinge may have a hinge axis parallel to the axis of the elongated rigid member, and preferably each hinge has a hinge axis parallel to the axis of the elongated rigid member.

The mechanism may comprise a helically-threaded rod and a follower, which may be frictionally maintained in position, wherein a displacement of the follower causes a deflection of the pin-holder about a pivot having an axis orthogonal to a hinge axis of the hinge. Alternately, a form fitting or frictionally engaged lock may be provided to prevent movement of the follower or helically threaded rod after the desired position is obtained. A rotation of the helically threaded rod may displace the follower to exert a torque about the pivot on the pin-holder.

The follower may be configured to incline to drive a plate to incline, a first end of the pin-holder having a shaft that sits in a slot in the plate, and a second end of the pin-holder being mounted on the arm by the pivot, such that the torque causes a movement of the shaft in the slot and a rotation of the pivotally mounted second end of the pin-holder with respect to the arm about the pivot.

The follower may be configured to rotate a plate to incline about a second pivot, a first end of the pin-holder has a shaft that sits in a slot in the plate, and a second end of the pin-holder is mounted on the arm by the pivot, such that the torque causes a movement of the shaft in the slot and a rotation of the pivotally mounted second end of the pin-holder with respect to the arm about the pivot.

The pin-holder may have a symmetric range of movement with respect to the arm.

BRIEF DESCRIPTION OF THE DRAWINGS

These and other features, aspects and advantages of the described embodiments are described with reference to drawings of certain preferred embodiments, which are intended to illustrate, but not to limit. It is to be understood that the attached drawings are for the purpose of illustrating concepts of the described embodiments and may not be to scale.

DETAILED DESCRIPTION OF THE PREFERRED EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure. The systems and methods for performing transforaminal lumbar interbody fusion disclosed herein boast a variety of inventive features and components that warrant patent protection, both individually and in combination.

Figure 1:
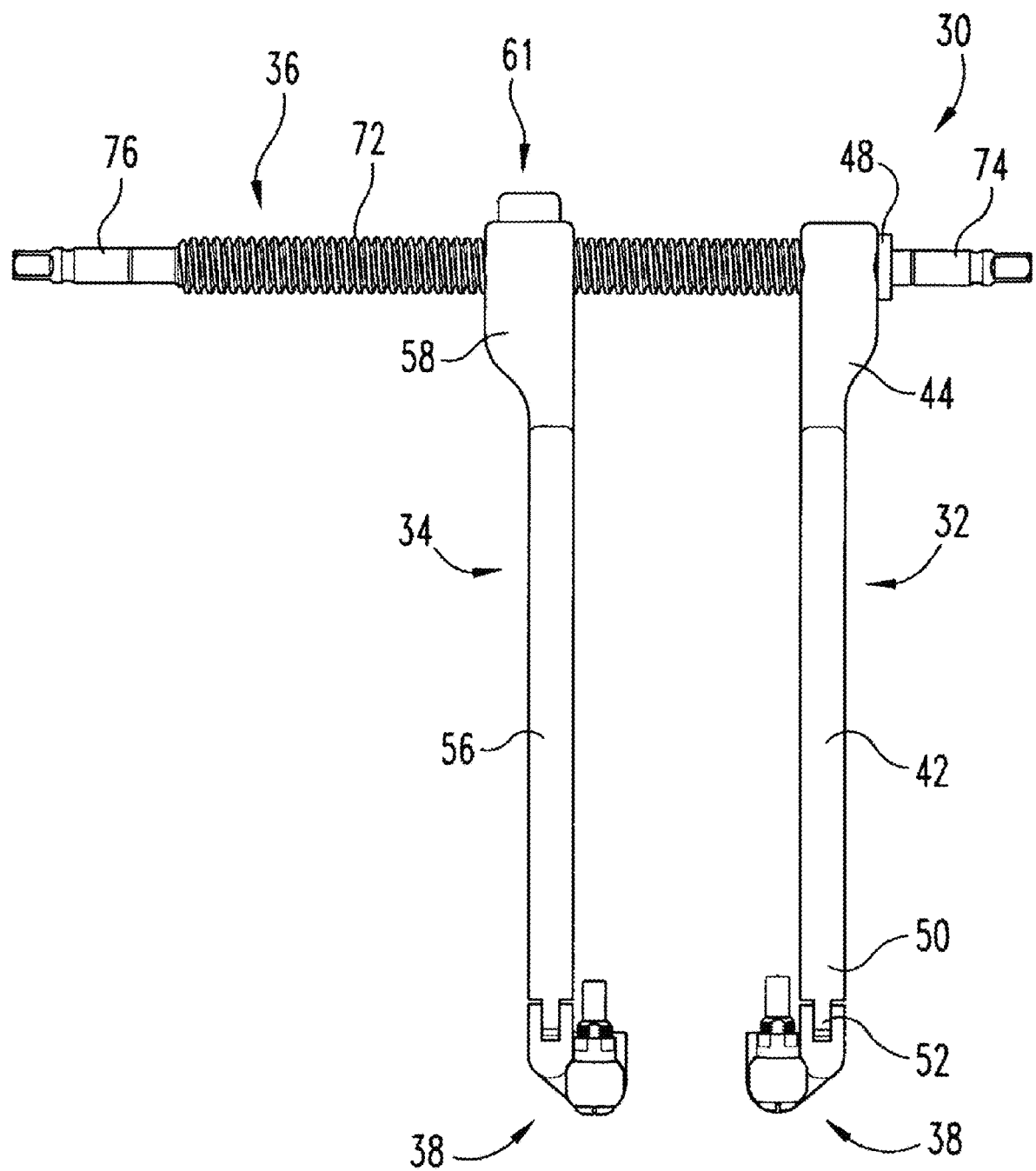
FIGS. 1 and 2 show a prior art vertebral distractor from U.S. Pat. No. 7,578,822.
Figure 2:
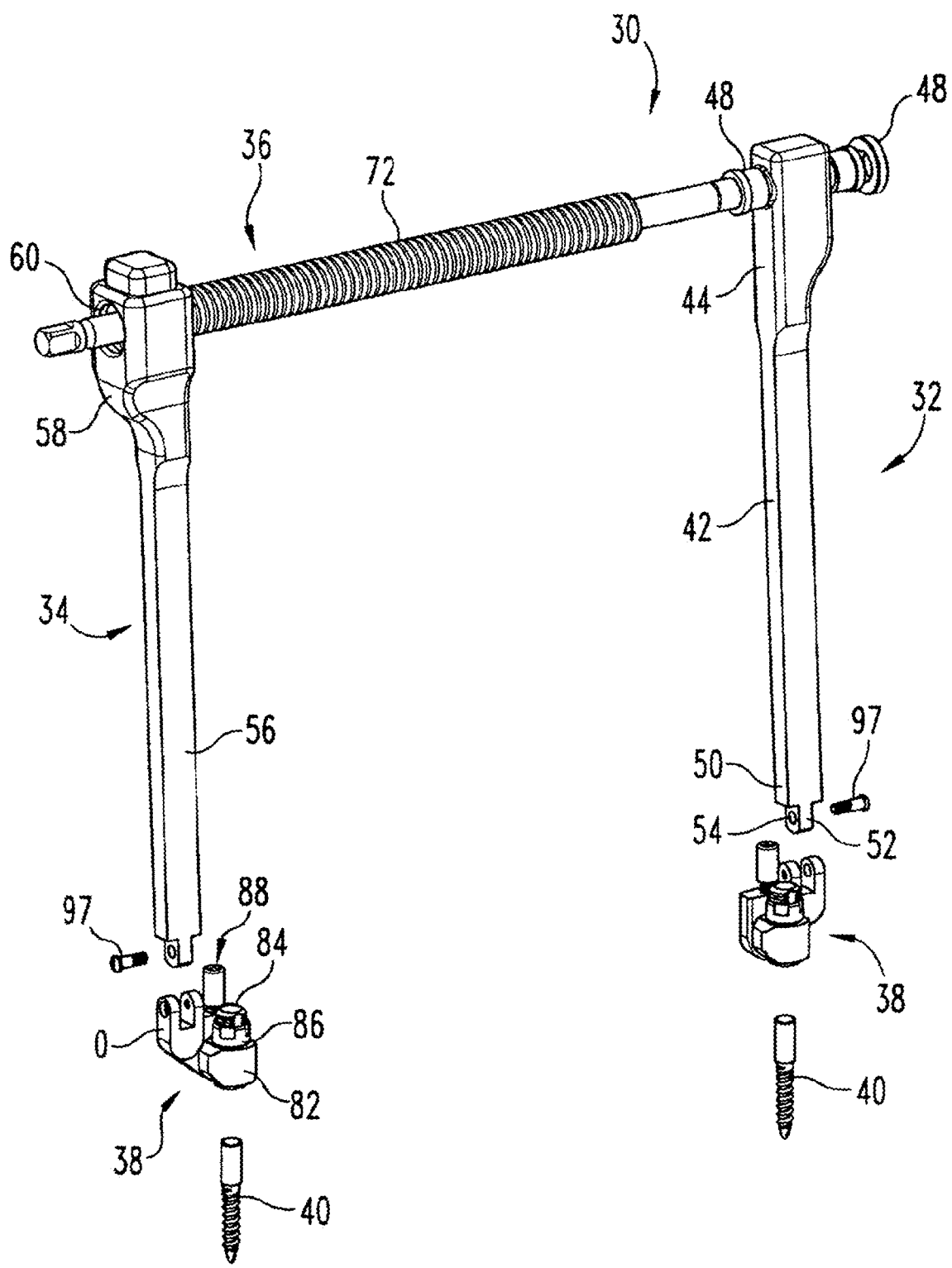

A known instrument is disclosed in U.S. Pat. No. 7,578,822. FIGS. 1 and 2 show an embodiment that instrument 30, which includes a first elongated arm 32, a second elongated arm 34, and a threaded rod 36 connected to arms 32 and 34. Arm 32 is fixed with respect to rod 36, and arm 34 is movable with respect to rod 36. Alternatively, arm 34 could be fixed with respect to rod 36, and arm 32 could be movable with respect to rod 36. At an end of arm 32 opposite from rod 36, there is an assembly 38 for connecting to an orthopedic implant 40. Such implants may include bone hooks or screws (e.g., a Schanz-type screw with a relatively smooth, cylindrical upper portion). A similar assembly 38 is positioned at the end of arm 34 opposite rod 36. Arm 32 has a medial portion 42 that in the depicted embodiment has a substantially square or rectangular cross-section. Medial portion 42 may also be substantially cylindrical or of other appropriate shape in cross-section. At a first end 44 of arm 32, a hole 46 is provided to accommodate rod 36. Hole 46 is substantially smooth in the illustrated embodiment. Bushings or washers 48 are provided that fit around rod 36 and may extend at least partially into hole 46 to allow rod 36 to rotate with respect to arm 32, while limiting or inhibiting substantial movement of arm 32 along rod 36. Such bushings, if provided, may be tightly fitted, welded or otherwise attached to rod 36. Arm 32 may move between bushings 48 if the distance between bushings 48 is greater than the width of end 44. End 44 has a somewhat larger cross-section than medial portion 42. A second end 50 of arm 32 includes a tongue 52 with a hole 54 for accommodating an axle. Arm 34 is substantially similar to arm 32. A medial portion 56 is provided that is substantially the same as or identical to medial portion 42 of arm 32. A first end portion 58 has a hole 59 and an aperture 60 through its top, and may be of somewhat larger cross-section than medial portion 56. A release mechanism 61 is provided at end 58. The release mechanism 61 includes a button 62 and a spring 63. Button 62 includes an opening 64 with a threaded bottom 65, which is compatible with threads on rod 36, and a side slot 66. Spring 63 fits within end 58, and button 62 sits atop spring 63 so that rod 36 can extend through hole 59 and opening 64, and so that the top of button 62 is above the top of end 58. A pin 67 fits through end 58 and into slot 66 to keep spring 63 from ejecting button 62 from end 58. Pressing button 62 allows a threaded portion of rod 36 to be pulled through hole 59 without turning rod 36. Releasing button 62 when a threaded portion of rod 36 is in opening 64 results in the threaded engagement of bottom 65 of button 62 with rod 36. As with the illustrated embodiment of arm 32, arm 34 has a second end 68, with a tongue 69 having a hole 70 for an axle. Rod 36 includes a threaded portion 72 and unthreaded end portions 74 and 76. Part or all of ends 74 and/or 76 may have substantially square cross-sections, and a knob (not shown) may be integral with or fitted onto either end (e.g. end 74). Turning rod 36 in one direction moves arm 34 away from arm 32, and turning rod 36 in the other direction moves arm 34 toward arm 32.

One assembly 38 connects to each of arms 32 and 34, which each connects to a respective implant that have each been implanted in bone tissue, for example a vertebra. Assembly 38 includes a connecting body 80 that connects to arm 32, an extension 82 that connects to the connecting body 80, a collet 84 that substantially surrounds a portion of an implant and fits at least partially within extension 82, a nut 86 that connects to an upper portion of collet 84, and a locking assembly 88. Connecting body 80 is a relatively flat piece having a pair of prongs 92 defining a slot 94. Each of prongs 92 includes a hole 96, one of which may be threaded. Slot 94 is sized and configured to be able to mate with tongue 50 of arm 32. For example, tongue 50 may fit into slot 94 so that hole 54 through tongue 50 substantially aligns with holes 96 through prongs 92. An axle 97, which may be a partially threaded screw when one of holes 96 is threaded, is passed through holes 96 and hole 54, linking arm 32 or 34 and connecting body 80 so that they can rotate with respect to each other. Connecting body 80 also includes a side portion 98 through which an oval hole extends.

Figure 3:
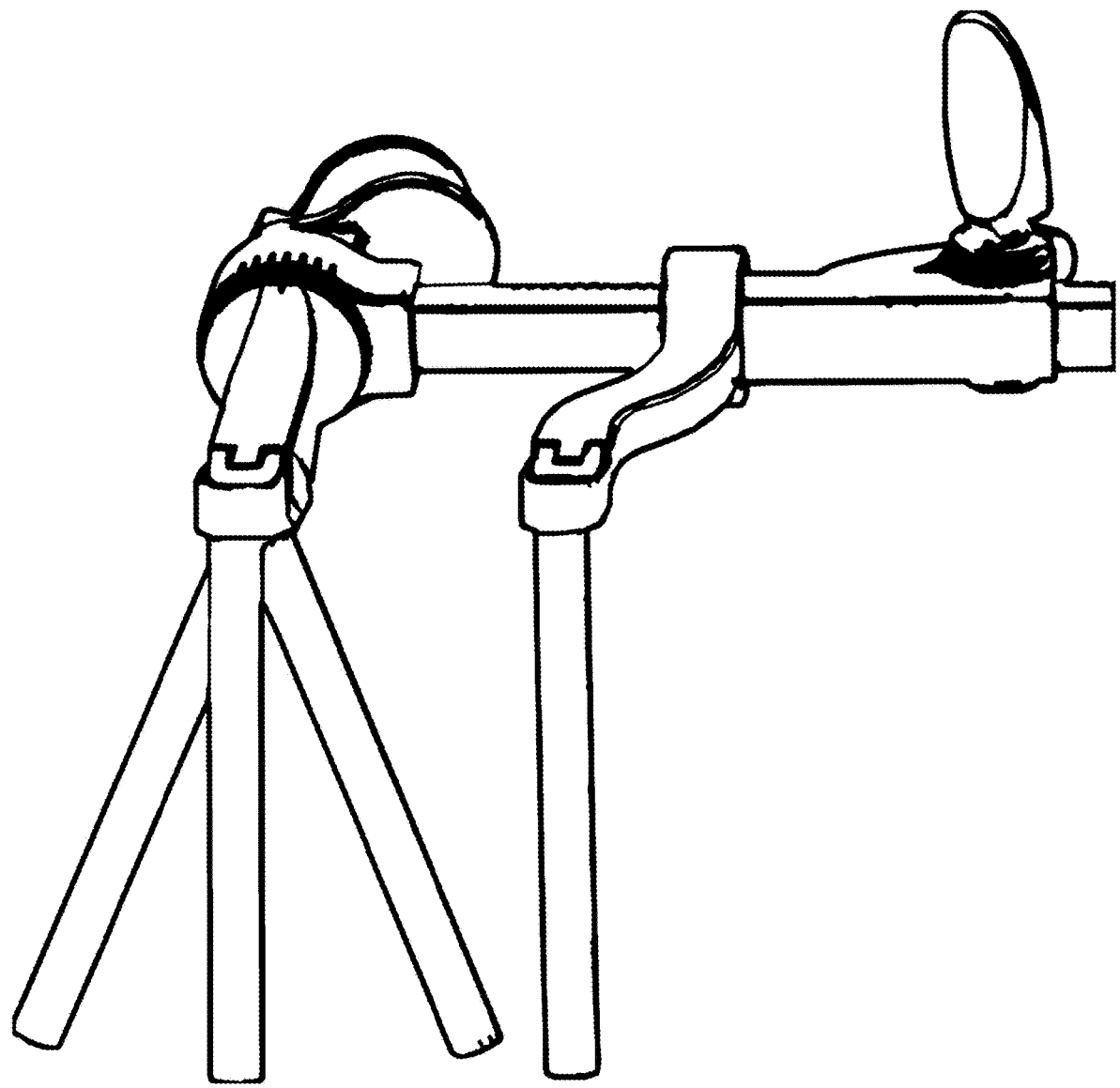
FIG. 3 shows a prior art articulated vertebral distractor from DePuy Synthes.

FIG. 3 shows a prior art DePuy Synthes cervical distractor, having two degrees of articulation for one arm, and one degree for another arm.

The DePuy Synthes product manual states, "To allow ease of placement of the cervical distractor over the screws for cervical distractor regardless of their orientation, ensure that the angle-setting tab (1, below) of the cervical distractor is initially unlocked. Once positioned on the screws, push the angle-setting tab (1) (left) to the locked position (2, below) to ensure parallel distraction of the two screws." The DePuy Synthes device uses an adjustable angulation mechanism to allow for ease of placement of the device over the Caspar pins. The angle setting tab is designed solely as a locking mechanism and not as a mechanism to change the angulation of the Caspar pins. Therefore, the angulation mechanism for the DePuy Synthes device is not meant to drive angulation of the vertebral bodies during an ACDF procedure. Rather, it is only meant to maintain the preset angle in which the Caspar pins have been screwed into the vertebral bodies, prior to application of the device onto the Caspar pins.

In contrast to the DePuy Synthes device, the device according to the present technology, in a preferred embodiment, is designed to drive angulation of the Caspar pins during the ACDF procedure upon placement of the device, allowing surgeons to not only maintain a preset angle of the Caspar pins but also make real-time adjustments to the angle of fixation based on the clinical scenario. This greater degree of versatility of the angulation mechanism could lead to better surgical results and fewer postoperative complications by facilitating disc removal, optimizing vertebral alignment for insertion of an intervertebral disc implant, and minimizing the risk of over-distraction during the procedure.

In addition, the DePuy Synthes device relies on distinct functions for each arm, where one can solely be used for maintaining angulation and the other for distraction or compression, as the angulation mechanism takes the place of the rack and pinion mechanism. In contrast, in an embodiment of the technology with multiple movable arms, the present angulation mechanism enables each arm to be able to drive angulation and also achieve distraction or compression. This enhanced functionality of each arm permits greater flexibility during the procedure so that each vertebral body can have its angle adjusted after placement of the device, and each arm can be moved if needed.

Figure 4:
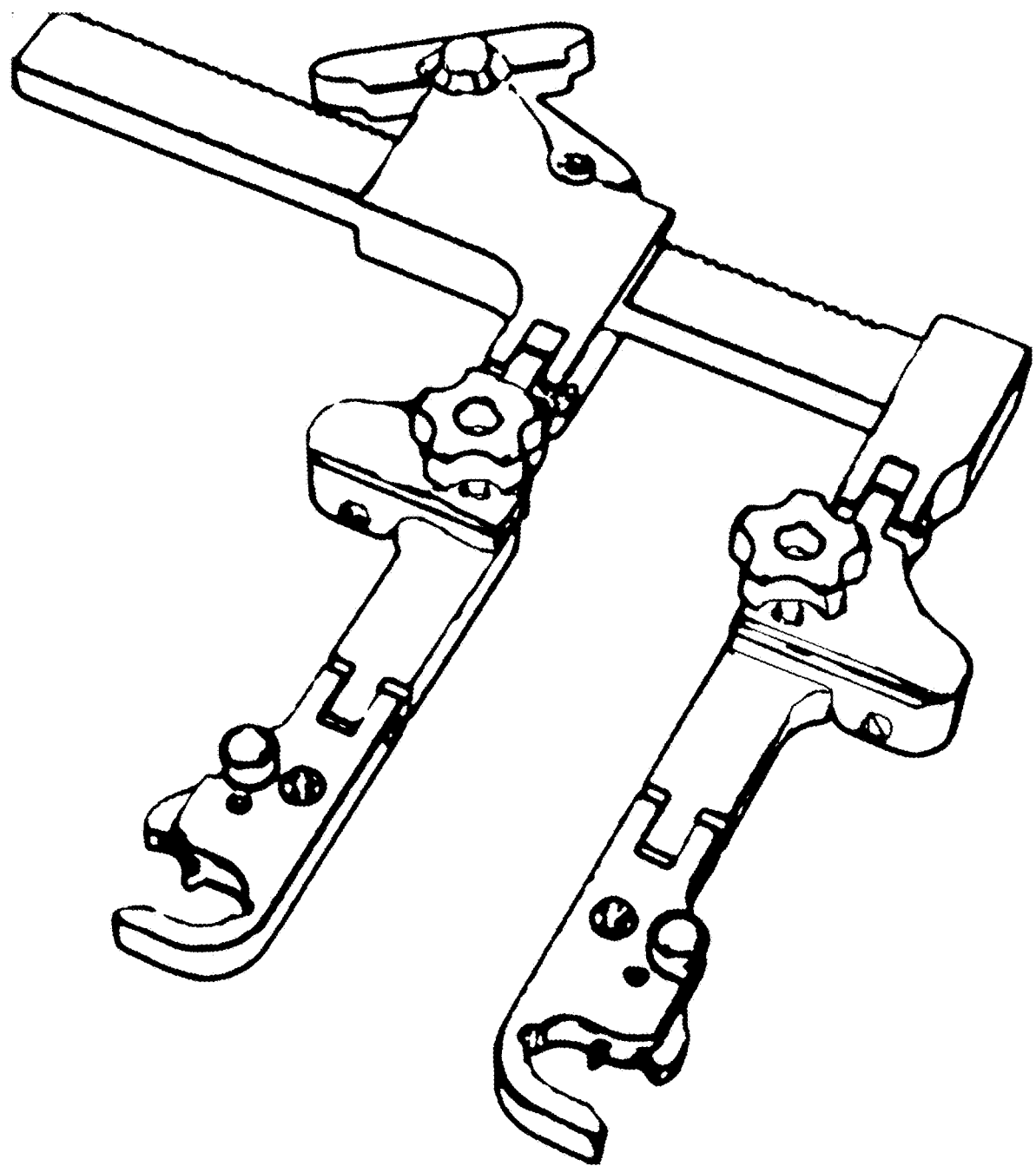
FIG. 4 shows a prior art articulated vertebral distractor from TSI.

FIG. 4 shows a prior art TSI distractor, having one degree of articulation for each arm.

Figure 5A:
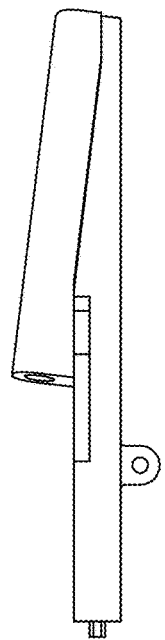
FIGS. 5A, 5B, and 5C show side, top and perspective views, respectively of an adjustment mechanism according to the present technology in a leftward inclination.
Figure 5B:
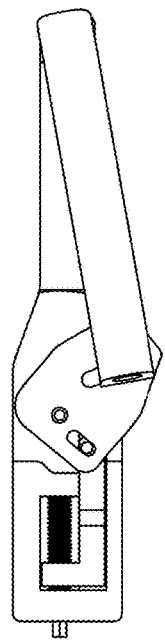
Figure 5C:
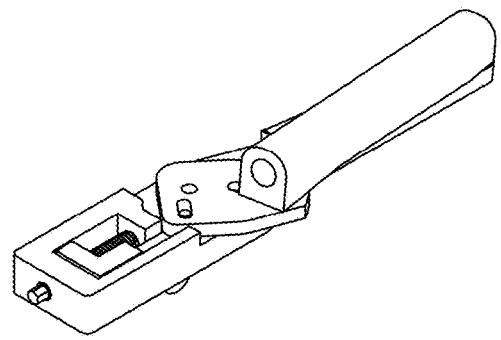
Figure 6A:
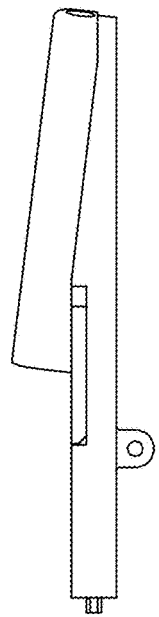
FIGS. 6A, 6B and 6C show side, top and perspective views, respectively of the adjustment mechanism according to the present technology in a rightward inclination.
Figure 6B:
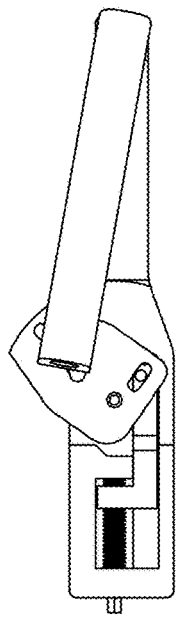
Figure 6C:
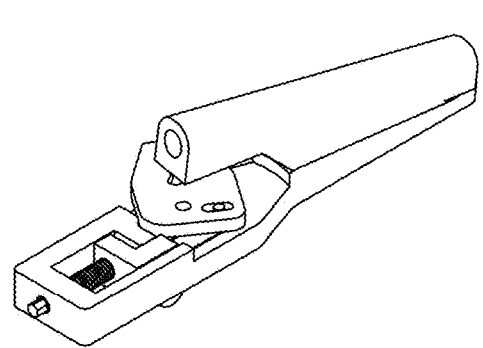
Figure 7A:
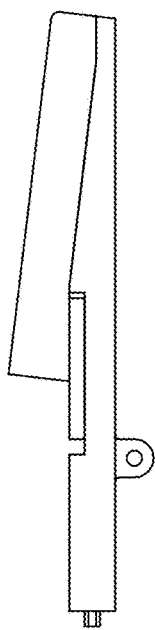
FIGS. 7A, 7B and 7C show side, top and perspective views, respectively of the adjustment mechanism according to the present technology in a neutral inclination.
Figure 7B:
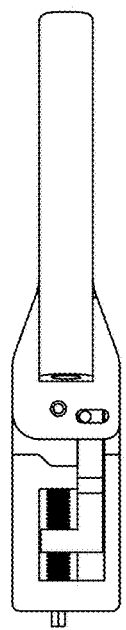
Figure 7C:
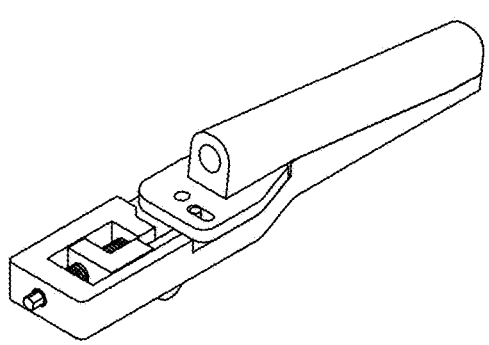

FIGS. 5A, 5B, and 5C show side, top and perspective views, respectively of an adjustment mechanism according to the present technology in a leftward inclination. FIGS. 6A, 6B and 6C show side, top and perspective views, respectively of the adjustment mechanism according to the present technology in a rightward inclination. FIGS. 7A, 7B and 7C show side, top and perspective views, respectively of the adjustment mechanism according to the present technology in a neutral inclination.

Figure 8:
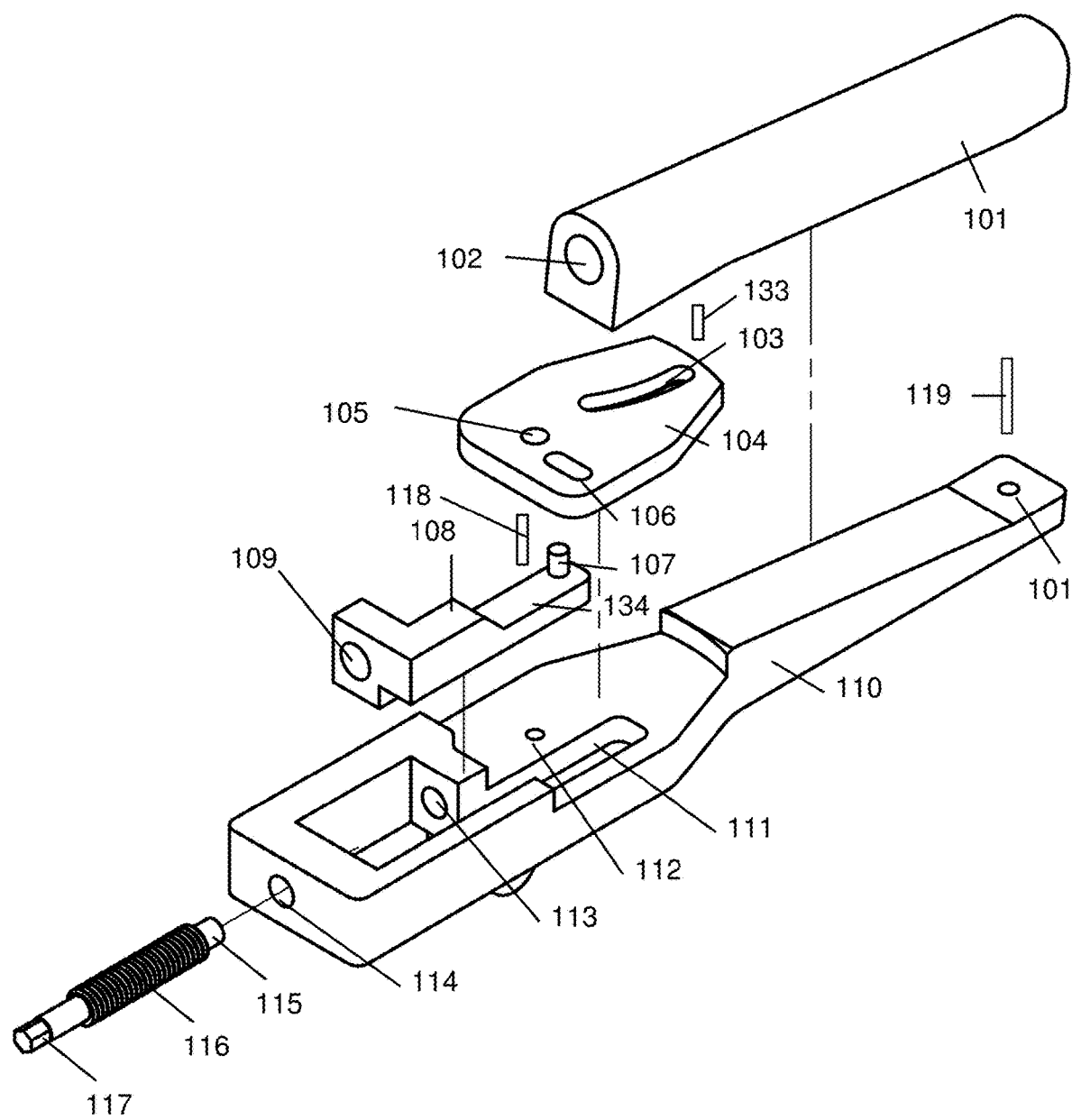
FIG. 8 shows an exploded view of the adjustment mechanism according to the present technology.

FIG. 8 shows an exploded view of the adjustment mechanism according to the present technology. The mechanism provides a helically threaded shaft (screw) with a follower (nut) with extension, that drives a pivotally attached plate that inclines the pin holder with respect to the distractor rack.

FIGS. 9A, 9B, 9C and 9D show top, side, front, and perspective views of a three-armed adjustment mechanism (with a static middle arm) according to the present technology in the neutral inclination and the arms straight. FIGS. 10A, 10B, 10C and 10D show bottom, bottom perspective, side front, and perspective views of a three-armed adjustment mechanism (with a static middle arm) according to the present technology in the neutral inclination and the arms bent. FIGS. 11A, 11B, 11C and 11D show top, side, front, and perspective views of a three-armed adjustment mechanism (with a static middle arm) according to the present technology in an outwardly splayed inclination. FIGS. 12A, 12B, 12C and 12D show top, side, front, and perspective views of a three-armed adjustment mechanism (with a static middle arm) according to the present technology in an inwardly splayed inclination. FIGS. 13A, 13B, 13C and 13D show top, front perspective, side, and perspective views of a three-armed adjustment mechanism (with a static middle arm) according to the present technology in a neutral inclination. FIGS. 14A, 14B, 14C and 14D show top, front, side, and perspective views of a three-armed adjustment mechanism (with a static middle arm) according to the present technology in a neutral inclination, with each arm bent at a different angle.

The embodiment shown in FIGS. 9-14 has two pinion gears each with locking mechanisms, allowing the two spaces between the three arms to be independently controlled by a knurled knob which drives the respective pinion with respect to a rack. The pinon gear is lockable by manually switching a lever to maintain the position of the arm on the rack. The rack has a third fixed arm centrally located. Each arm has a hinge that allows the arm to flex out of the plane of the rack. In addition, each arm has a mechanism as shown in FIG. 8 to independently control the inward or outward splaying of the Caspar-type pin holder by rotation of the helically threaded shaft with a hexagonal head which can be controlled using a female hexagonal socket tool. It should be noted that one of the arms may be removed from the rack, to provide a two-arm device.

FIGS. 15A, 15B, 15C and 15D show top, front perspective, side, and perspective views of a device having three independent adjustment mechanisms according to the present technology in a neutral inclination. FIGS. 16A, 16B, 16C and 16D show top, front perspective, side, and perspective views of a device having three independent adjustment mechanisms according to the present technology in a neutral inclination, with each arm bent at the same angle. FIGS. 17A, 17B, 17C and 17D show top, front perspective, side, and perspective views of a device having three-armed adjustment mechanism according to the present technology in an outwardly splayed inclination, with each arm bent at the same angle. FIGS. 18A, 18B, 18C and 18D show top, front perspective, side, and perspective views of a device having three independent adjustment mechanisms according to the present technology in an inwardly splayed inclination, with each arm bent at the same angle. FIGS. 19A, 19B, 19C and 19D show top, front perspective, side, and perspective views of a device having three independent adjustment mechanisms according to the present technology in a neutral inclination, with each arm bent at right angles. FIGS. 20A, 20B, 20C and 20D show top, front perspective, side, and perspective views of a device having three independent adjustment mechanisms according to the present technology in a neutral inclination, with each arm bent different angles.

The embodiment shown in FIGS. 15-20 has three pinion gears each with locking mechanisms, allowing the two spaces between the three arms to be independently controlled by a knurled knob which drives the respective pinion with respect to a rack. The rack is continuous. Each arm has a hinge that allows the arm to flex out of the plane of the rack. In addition, each arm has a mechanism as shown in FIG. 8 to independently control the inward or outward splaying of the Caspar-type pin holder by rotation of the helically threaded shaft with a hexagonal head which can be controlled using a female hexagonal socket tool. Additional arms may be mounted on the rack, as may be desired, to provide additional levels.

FIGS. 21A, 21B, 21C and 21D show top, front perspective, side, and perspective views of a two-armed adjustment mechanism according to the present technology in a neutral inclination, with each arm straight. FIGS. 22A, 22B, 22C and 22D show top, front perspective, side, and perspective views of a two-armed adjustment mechanism according to the present technology in a neutral inclination, with each arm bent. FIGS. 23A, 23B, 23C and 23D show top, front perspective, side, and perspective views of a two-armed adjustment mechanism according to the present technology in an outwardly splayed inclination, with each arm bent. FIGS. 24A, 24B, 24C and 24D show top, front perspective, side, and perspective views of a two-armed adjustment mechanism according to the present technology in an inwardly splayed inclination, with each arm bent. FIGS. 25A, 25B, 25C and 25D show top, front perspective, side, and perspective views of a two-armed adjustment mechanism according to the present technology in a neutral inclination, with each arm bent at right angles. FIGS. 26A, 26B, 26C and 26D show top, front perspective, side, and perspective views of a two-armed adjustment mechanism according to the present technology in a neutral inclination, with each arm bent at different angles.

The embodiment shown in FIGS. 21-26 has two pinion gears each with locking mechanisms, allowing the space between the two arms to be independently controlled by a knurled knob which drives the respective pinion with respect to a rack. The rack is continuous. Each arm has a hinge that allows the arm to flex out of the plane of the rack. In addition, each arm has a mechanism as shown in FIG. 8 to independently control the inward or outward splaying of the Caspar-type pin holder by rotation of the helically threaded shaft with a hexagonal head which can be controlled using a female hexagonal socket tool. Additional arms may be mounted on the rack, as may be desired, to provide additional levels.

As shown in FIG. 8, a Caspar-type pin holder 101 has a cylindrical bore 102 to hold a Caspar pin (not shown). The Caspar-type pin holder 101 is supported by a fixture 110, by a pin 119, inserted through hole 101 of the fixture 110 and a corresponding hole in the Caspar-type pin holder 101 (not shown). The Caspar-type pin holder 101 is mounted for angular movement about the pin 119. A plate 104 is rotatably mounted on the fixture 110 through pin 118 into hole 105 of the plate 104 and hole 112 of the fixture. The plate 104 has two slots, 106 and 103. Slot 103 guides a pin 133 extending below the Caspar-type pin holder 101. As the plate 104 rotates about pin 118, the pin 133 in slot 103 causes the Caspar-type pin holder 101 to rotate and incline with respect to the fixture.

The fixture 110 has a recess 111, in which a follower 108 moves axially. The follower 108 has an arm 134 which supports a cylindrical extension 107 that rides in slot 106 of the plate 104. The follower has a threaded aperture 109, in which a threaded rod 116 is inserted. The threaded rod 116 has a cylindrical end that is supported by recess 113 in the fixture, and a hexagonal head end 117 that protrudes through hole 114. In operation, the hexagonal head end 117 is rotated with a socket wrench (not shown), which causes the follower 108, arm 108 and cylindrical extension 107 to move axially. The axial movement of the cylindrical extension 107 rotates the plate 104 about pin 105, and thereby controls an inclination of the Caspar-type pin holder 101 with respect to the fixture 110.

Figure 9A:
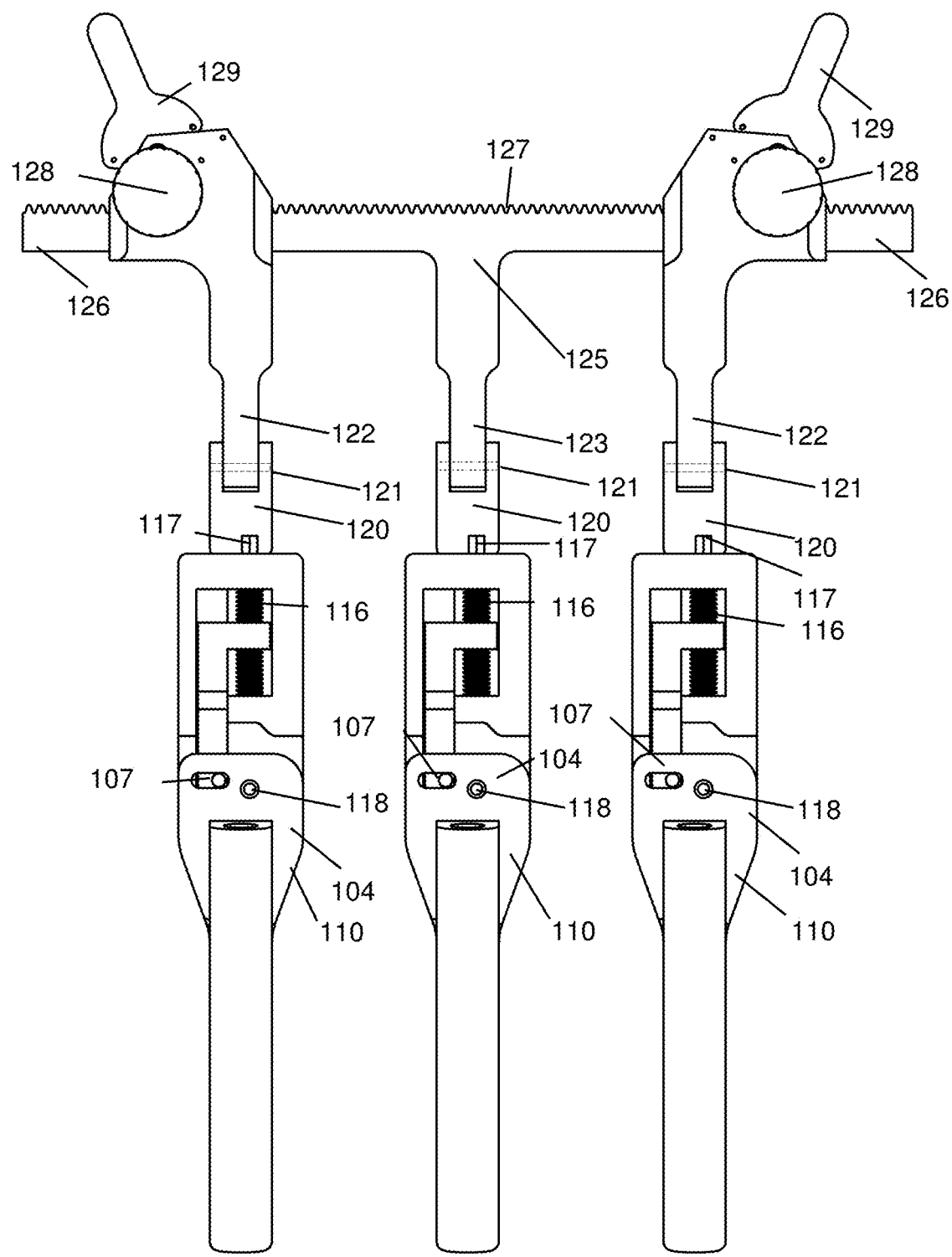
FIGS. 9A, 9B, 9C and 9D show top, side, front, and perspective views of a three-armed adjustment mechanism (with a static middle arm) according to the present technology in the neutral inclination and the arms straight.

As shown in FIG. 9A, the mount 123 is integral with a rack 126 having teeth 127. The mount 123 is optional for an embodiment that has a T-shaped rack 125 as shown in FIGS. 9-14.

Typically, various embodiments include the mount 122, that is mounted for movement along the rack 126, by rotation of a knob 128, which drives a pinion gear 133 which engages the teeth 127 of the rack 126. The pinion gear 133 is lockable with a lock 129, which is manually switchable between a locking position and a free position.

Figure 9B:
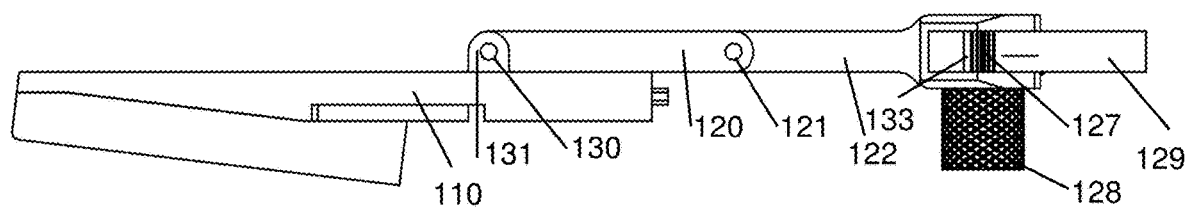
Figure 9C:
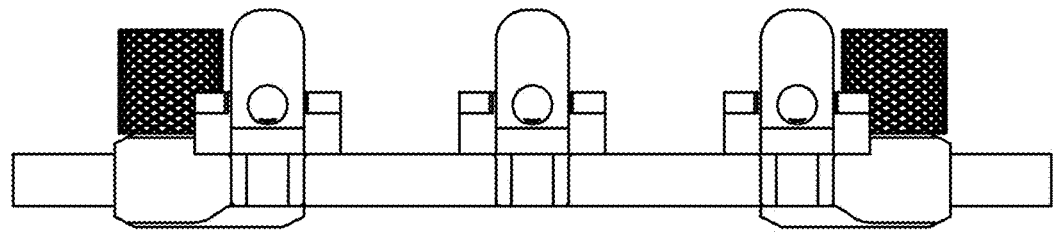
Figure 9D:
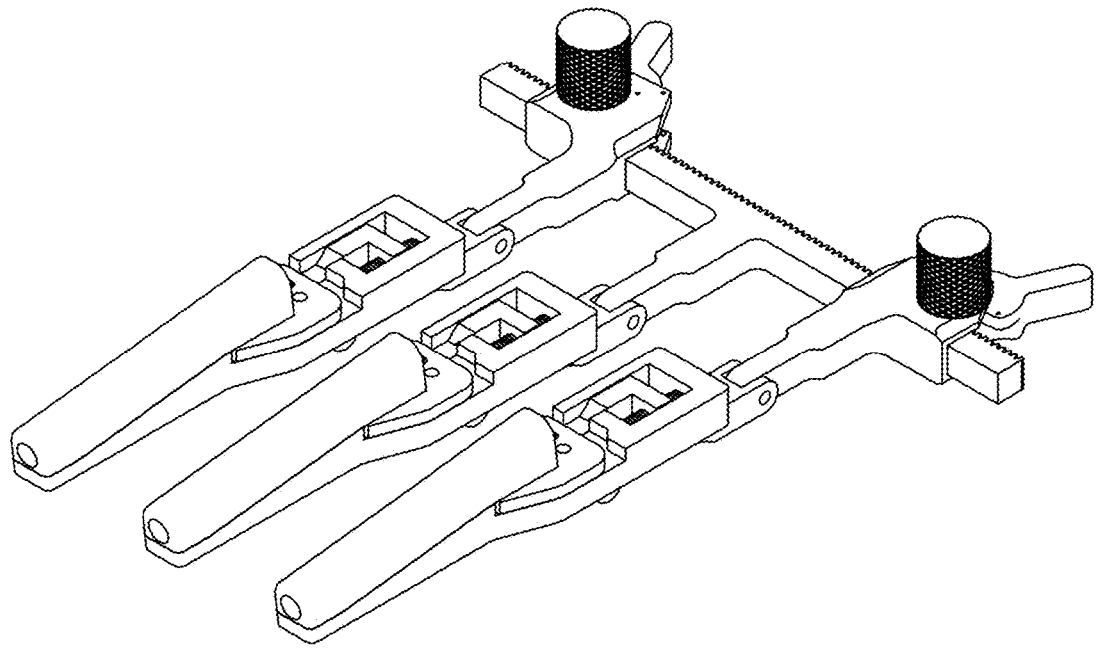
Figure 10A:
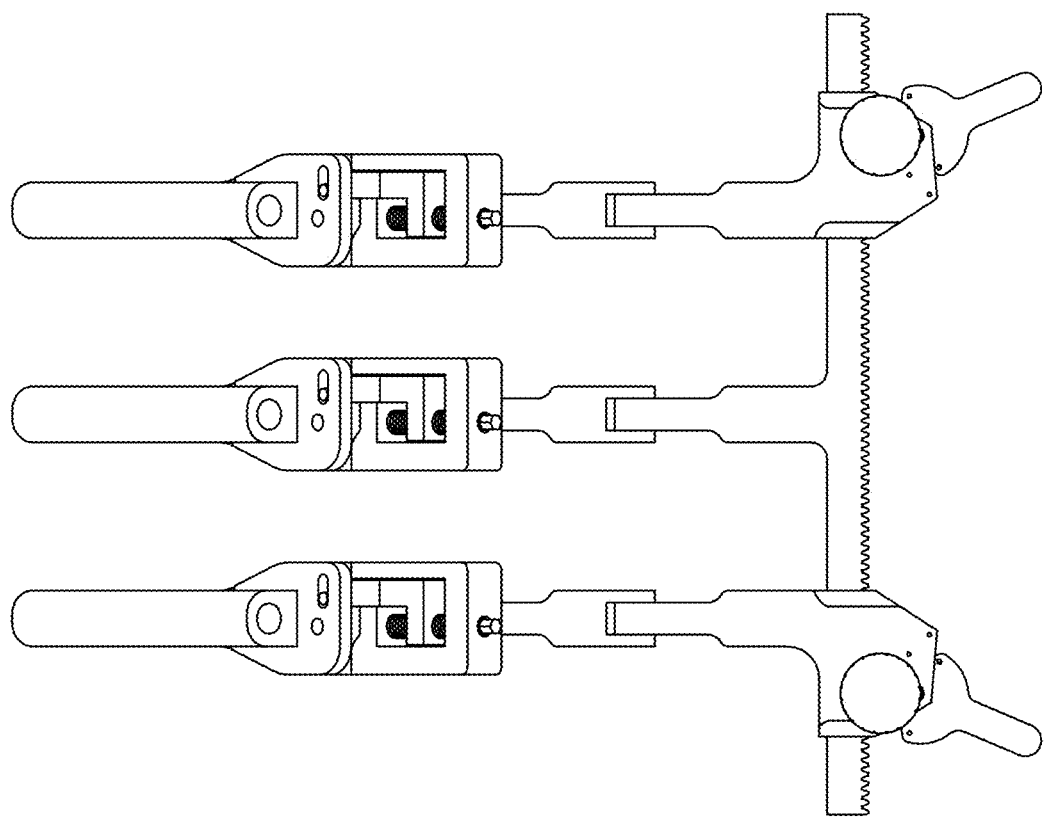
FIGS. 10A, 10B, 10C and 10D show bottom, bottom perspective, side front, and perspective views of a three-armed adjustment mechanism (with a static middle arm) according to the present technology in the neutral inclination and the arms bent.
Figure 10B:
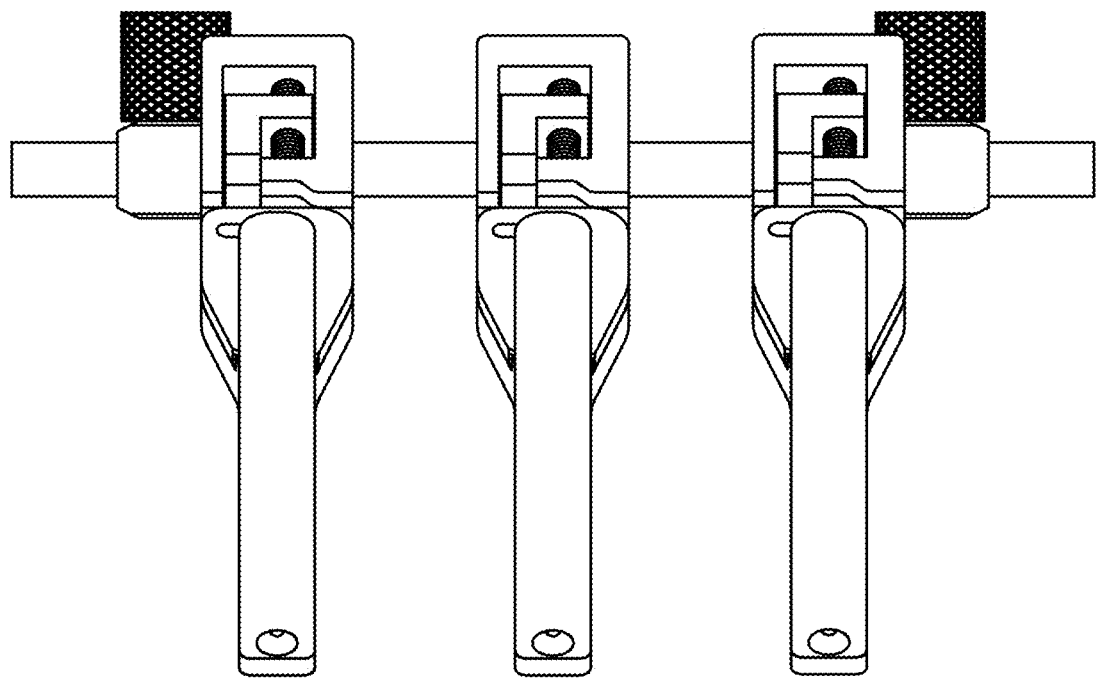
Figure 10C:
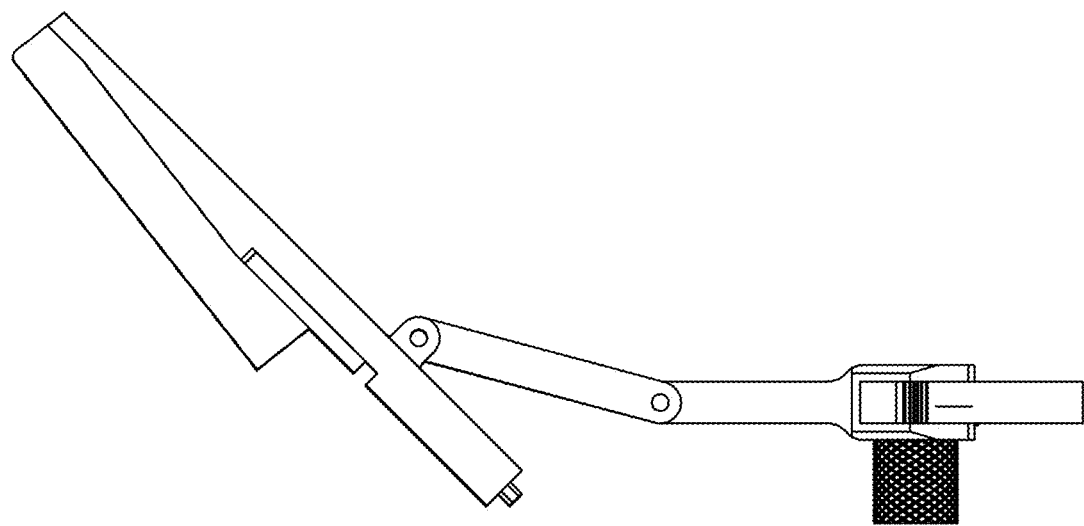
Figure 10D:
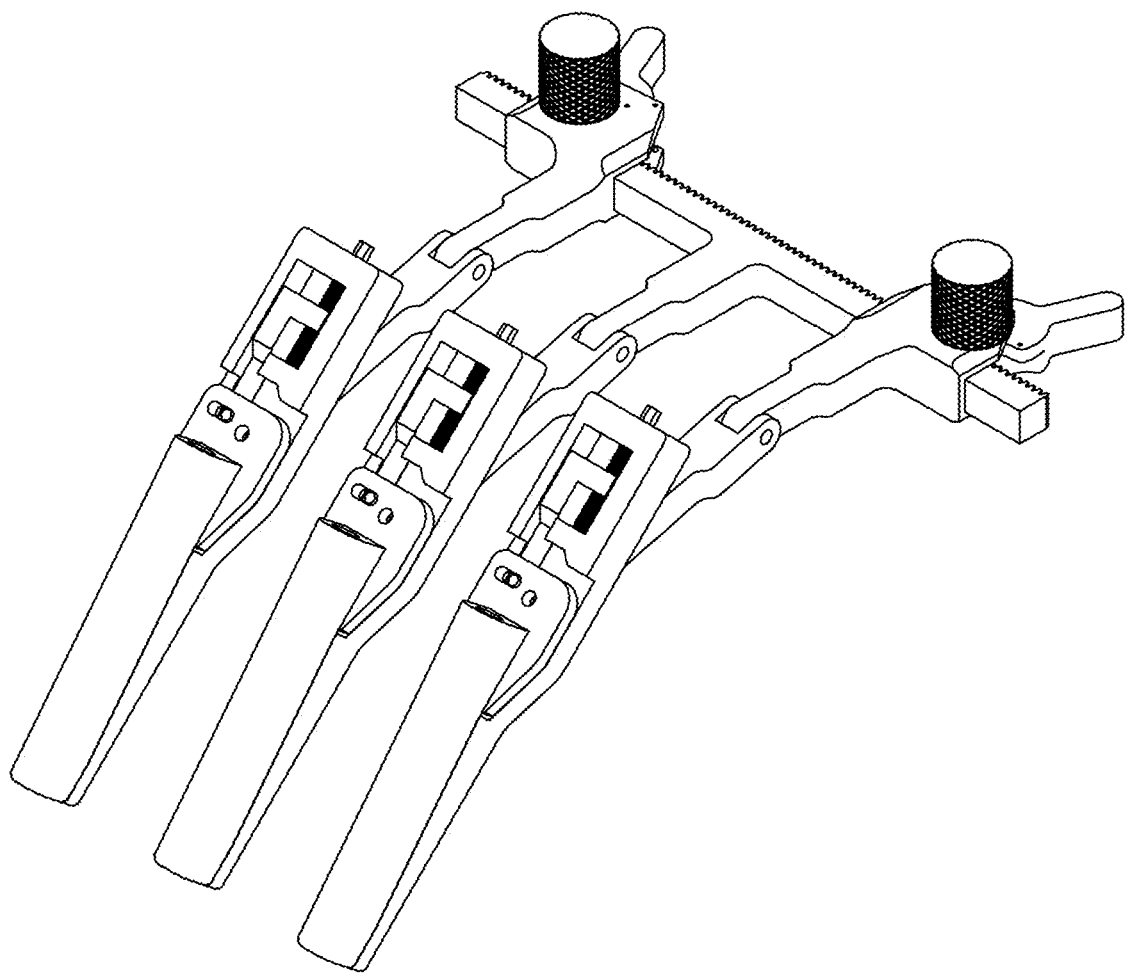
Figure 11A:
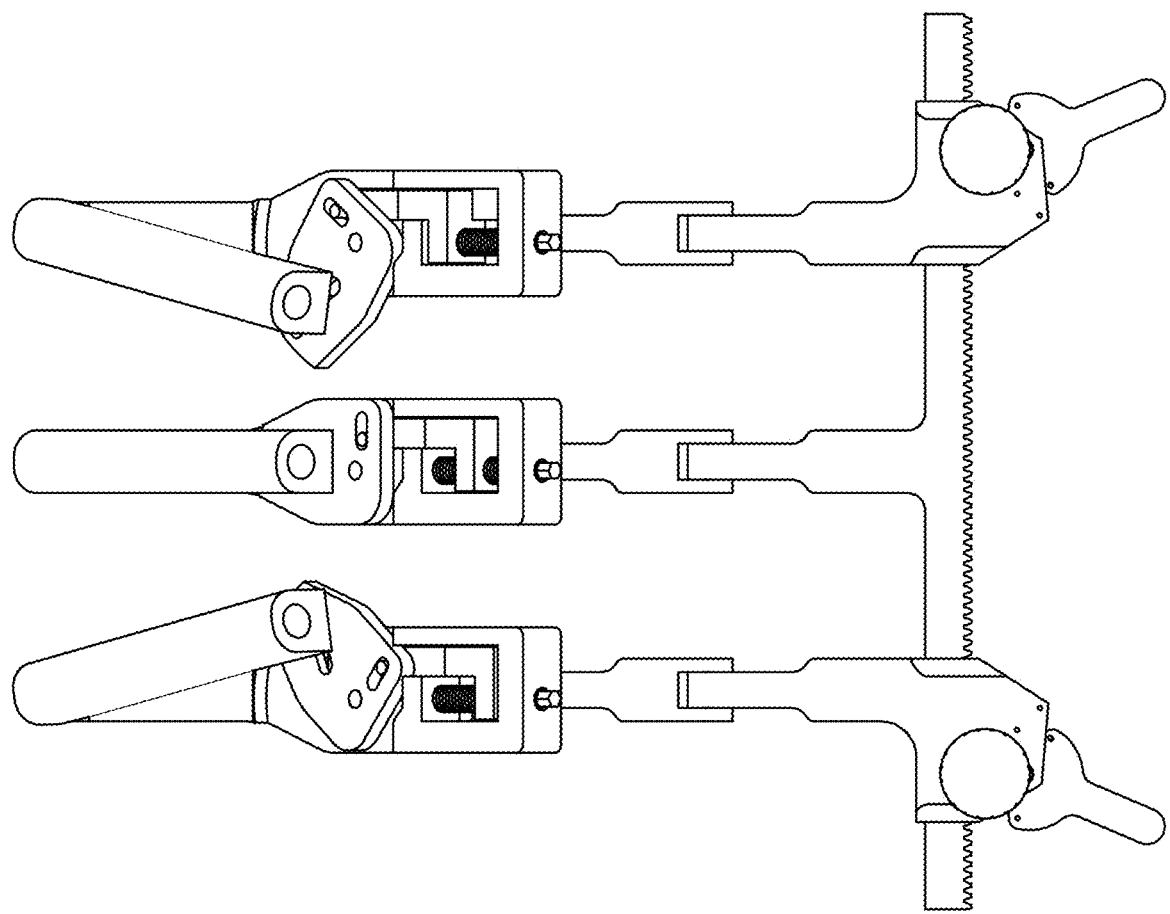
FIGS. 11A, 11B, 11C and 11D show top, side, front, and perspective views of a three-armed adjustment mechanism (with a static middle arm) according to the present technology in an outwardly splayed inclination.
Figure 11B:
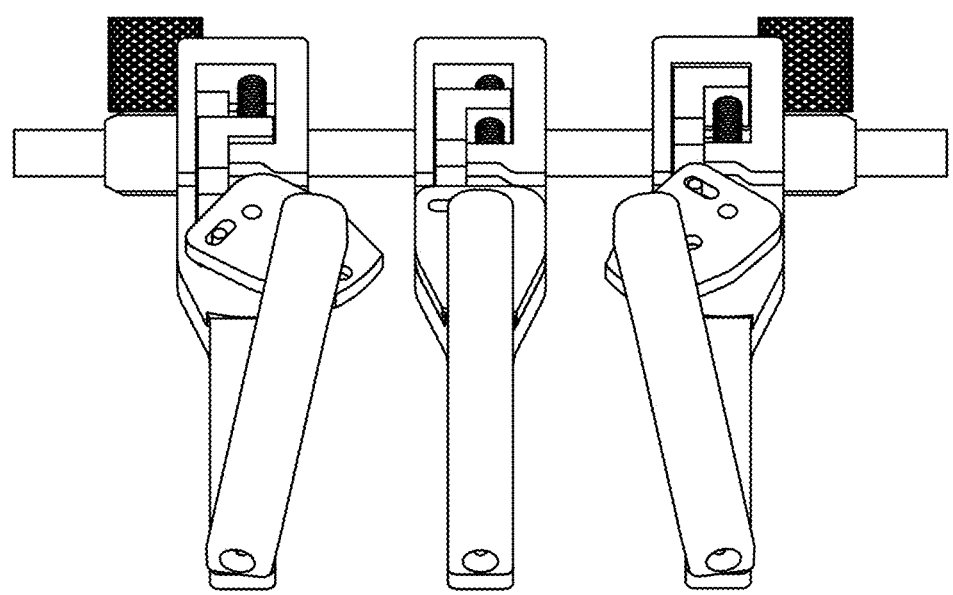
Figure 11C:
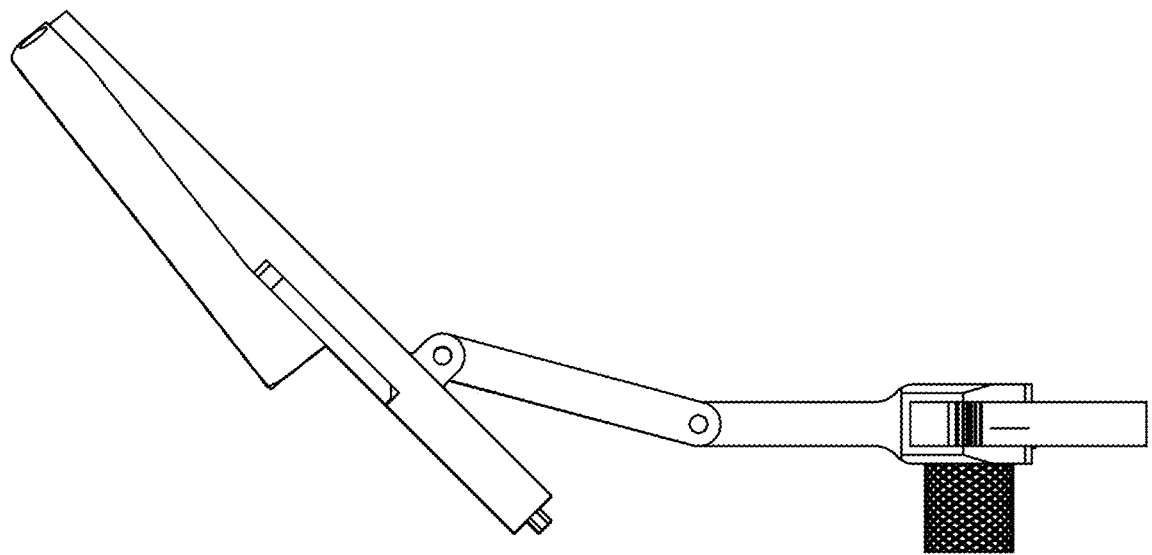
Figure 11D:
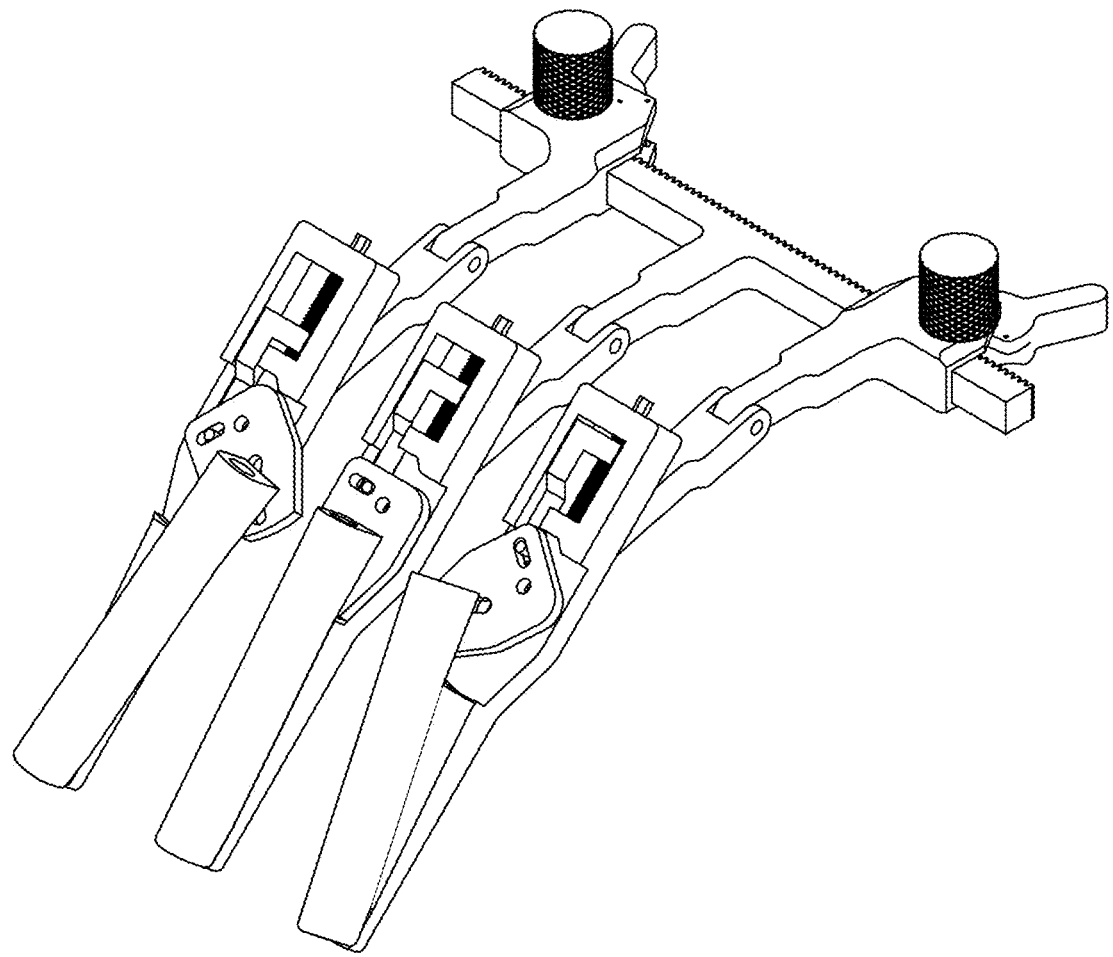
Figure 12A:
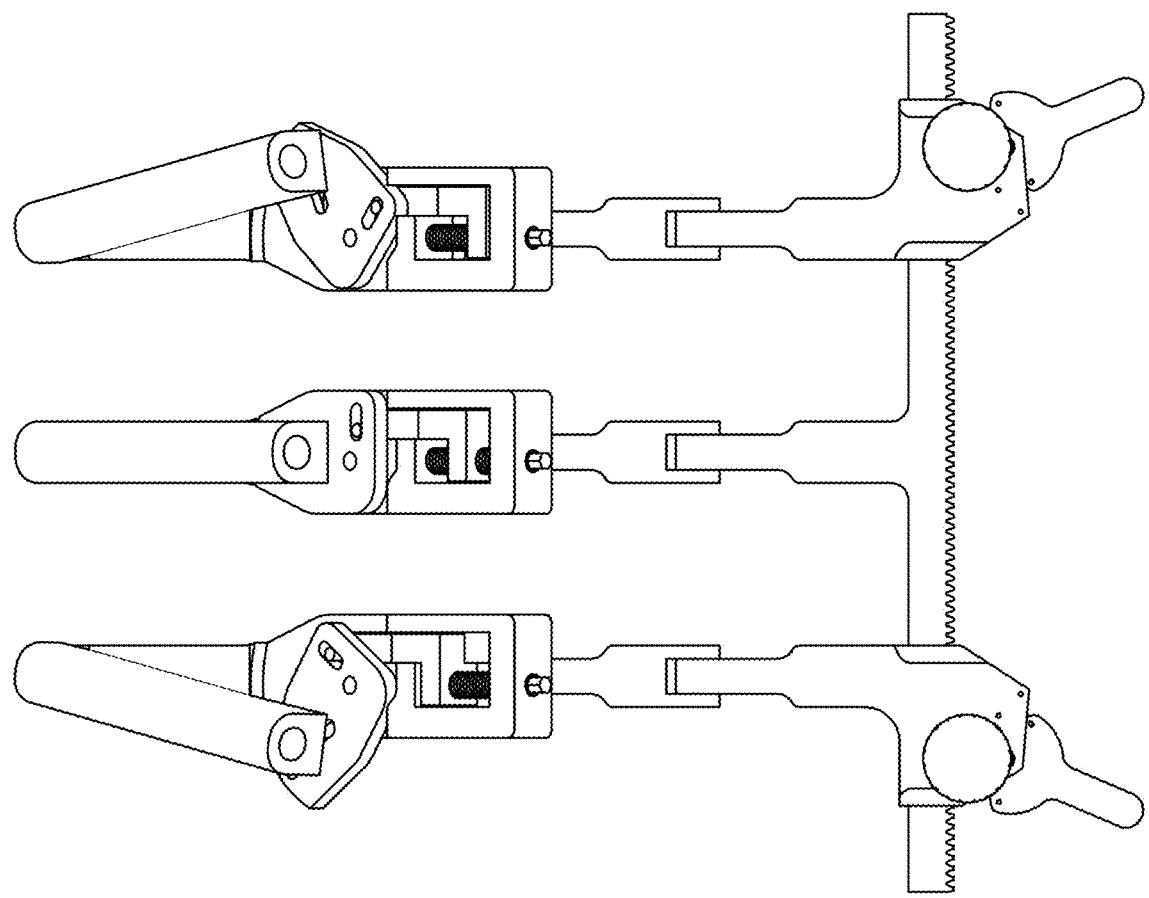
FIGS. 12A, 12B, 12C and 12D show top, side, front, and perspective views of a three-armed adjustment mechanism (with a static middle arm) according to the present technology in an inwardly splayed inclination.
Figure 12B:
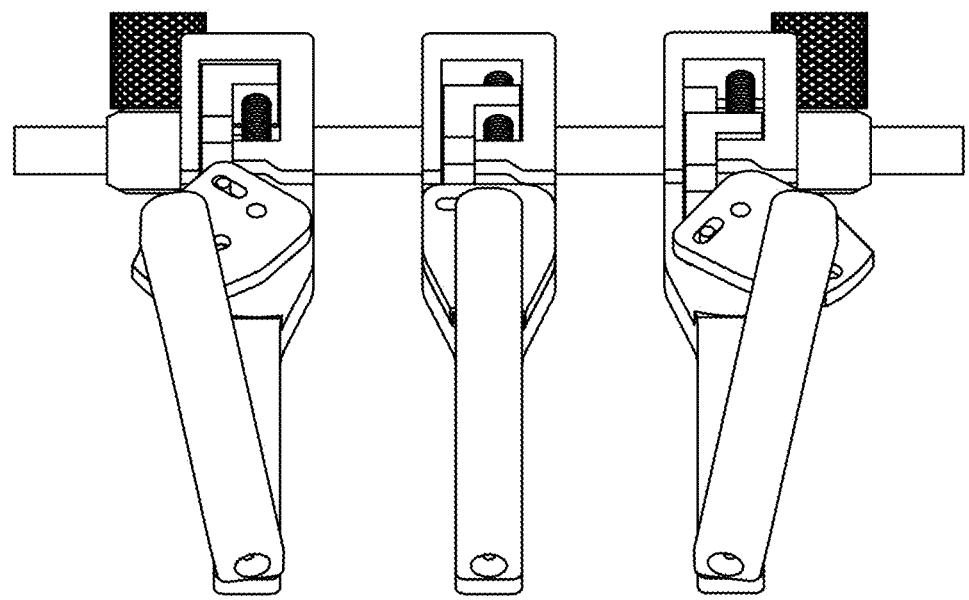
Figure 12C:
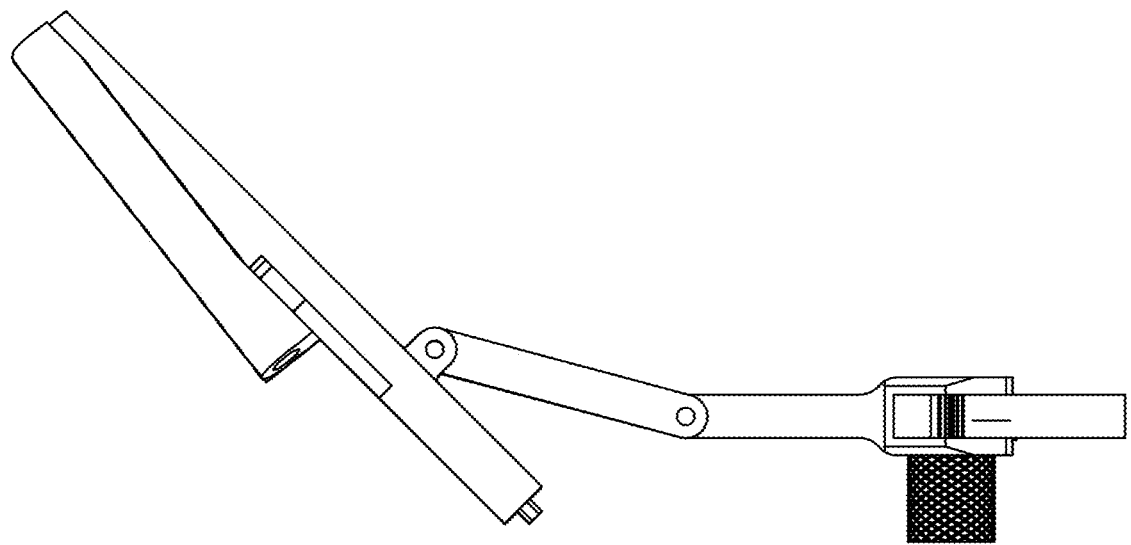
Figure 12D:
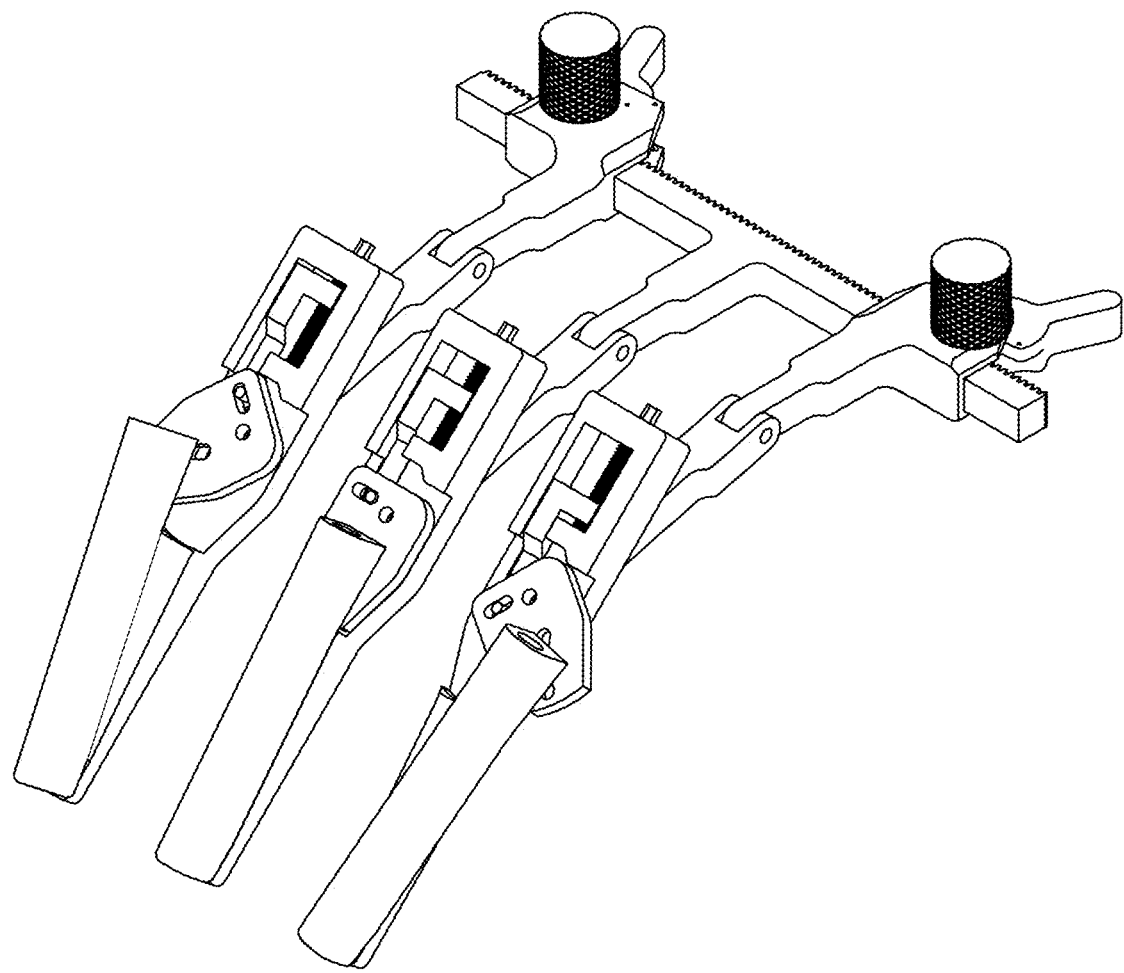
Figure 13A:
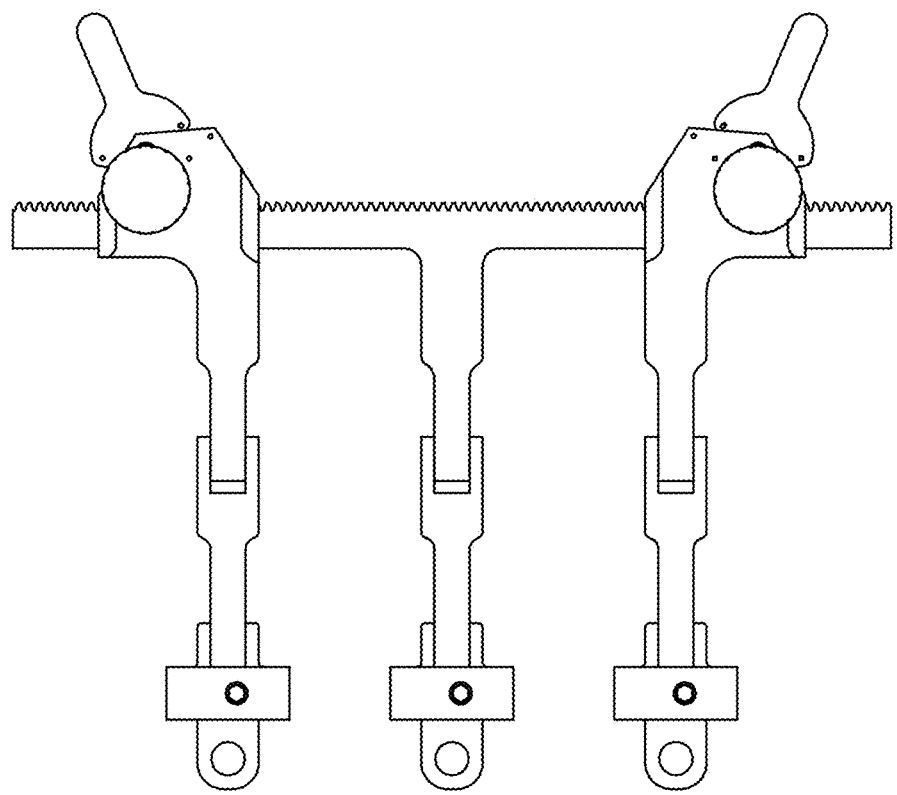
FIGS. 13A, 13B, 13C and 13D show top, front perspective, side, and perspective views of a three-armed adjustment mechanism (with a static middle arm) according to the present technology in a neutral inclination.
Figure 13B:
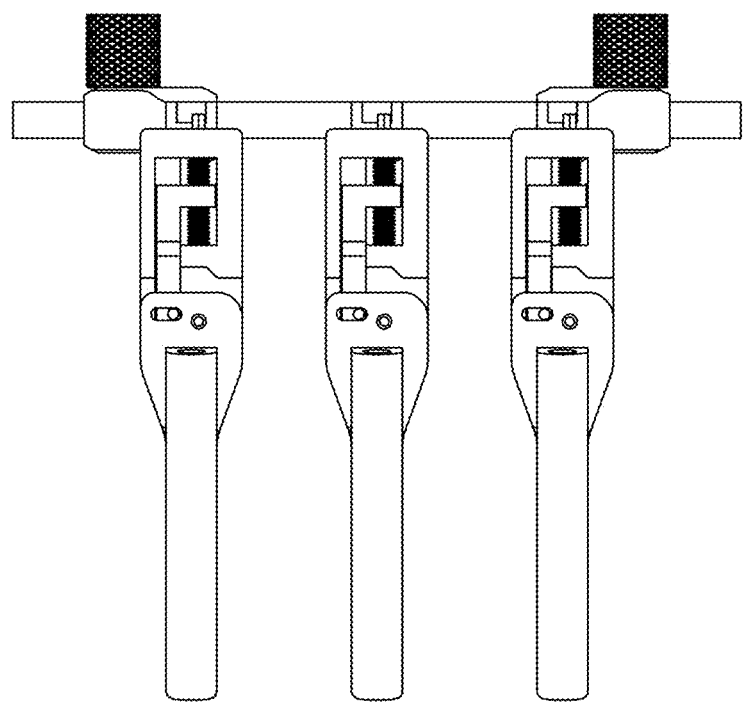
Figure 13C:
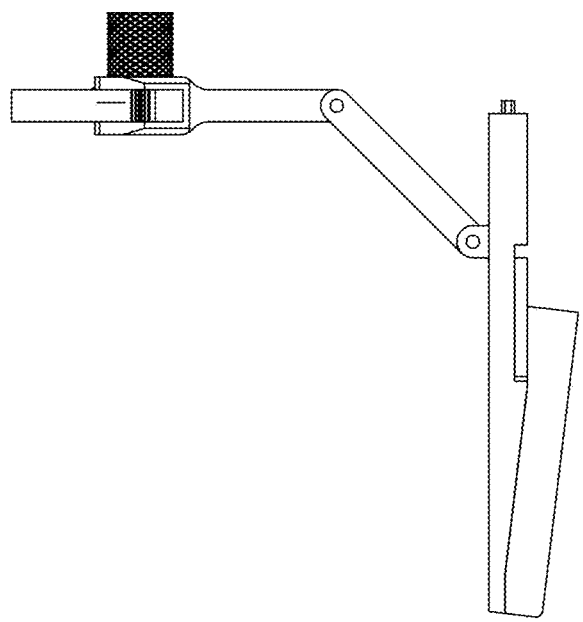
Figure 13D:
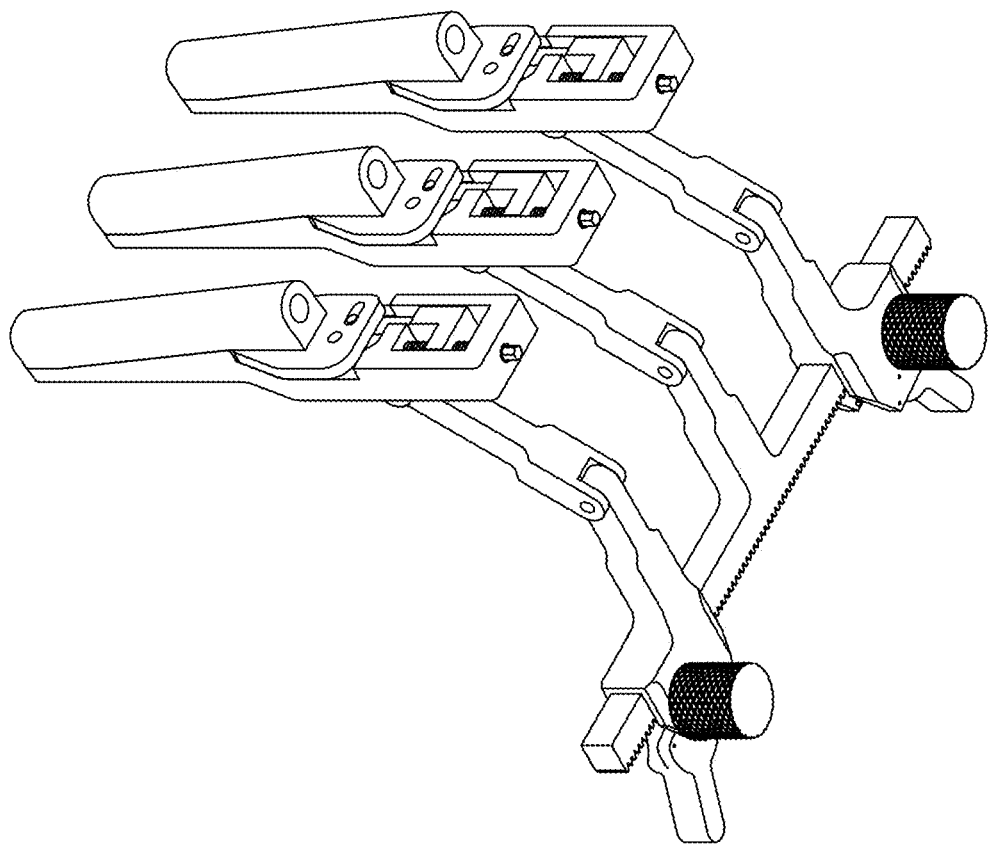
Figure 14A:
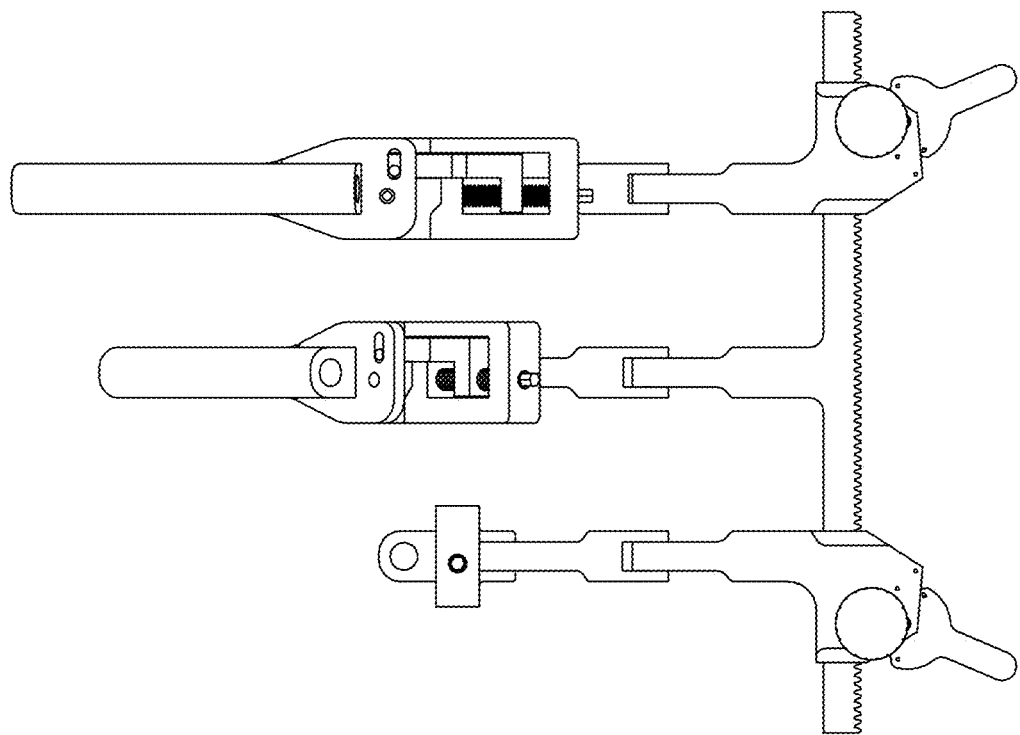
FIGS. 14A, 14B, 14C and 14D show top, front, side, and perspective views of a three-armed adjustment mechanism (with a static middle arm) according to the present technology in a neutral inclination, with each arm bent at a different angle.
Figure 14B:
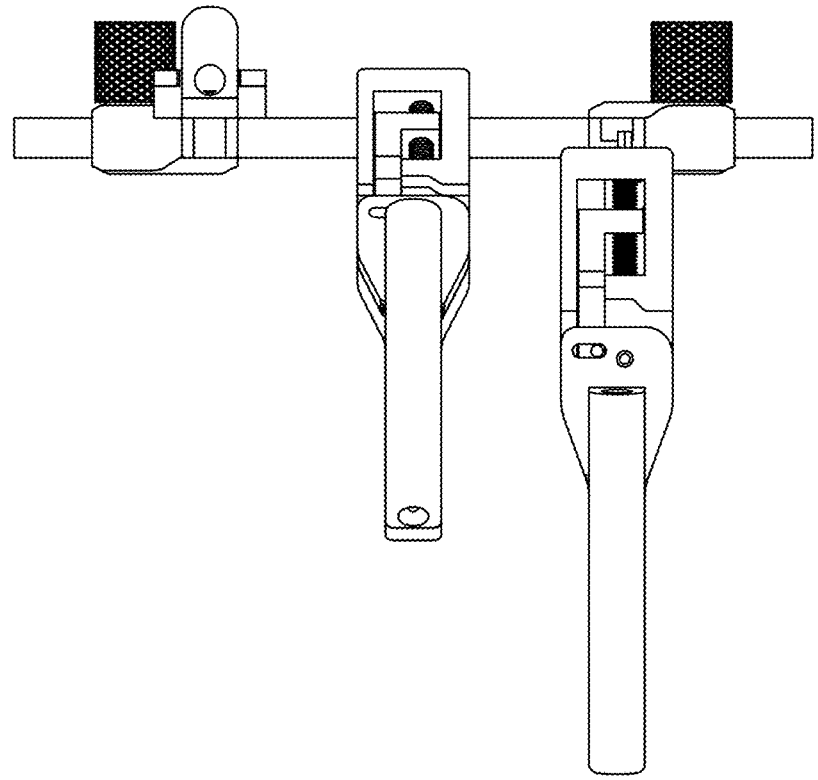
Figure 14C:
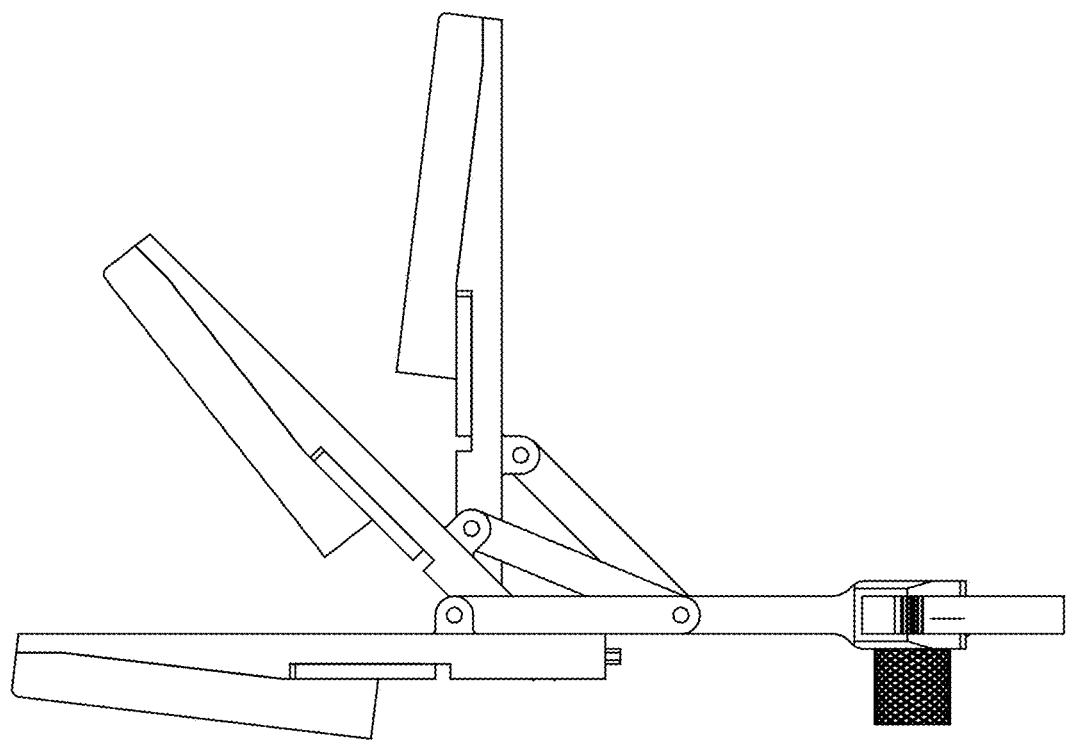
Figure 14D:
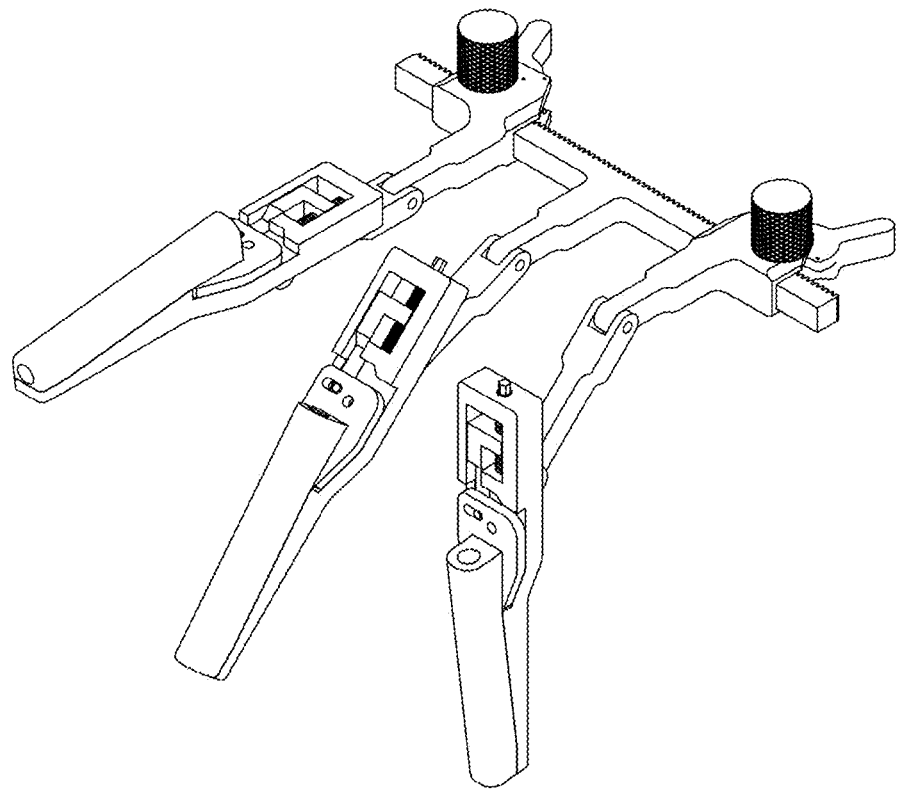
Figure 15A:
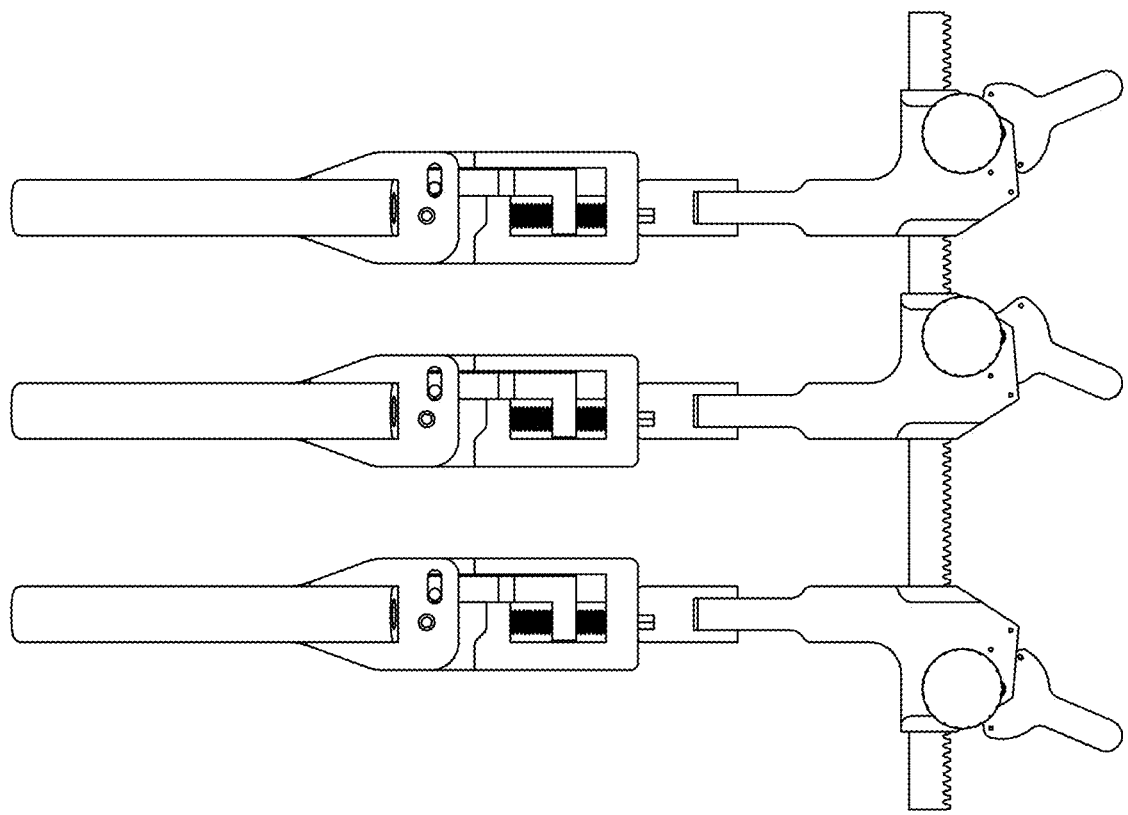
FIGS. 15A, 15B, 15C and 15D show top, front perspective, side, and perspective views of a device having three independent adjustment mechanisms according to the present technology in a neutral inclination.
Figure 15B:
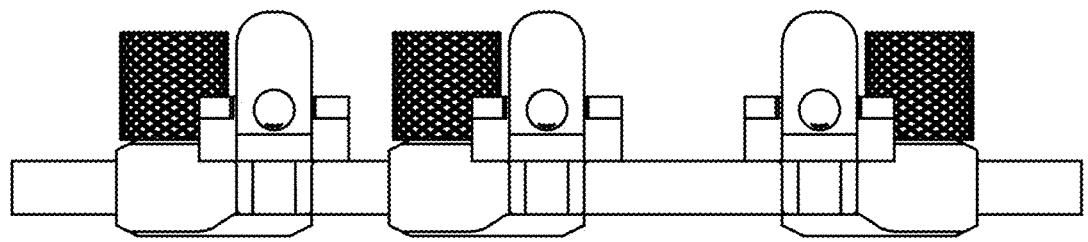
Figure 15C:
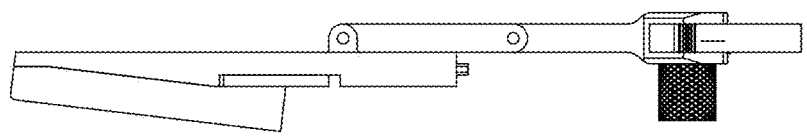
Figure 15D:
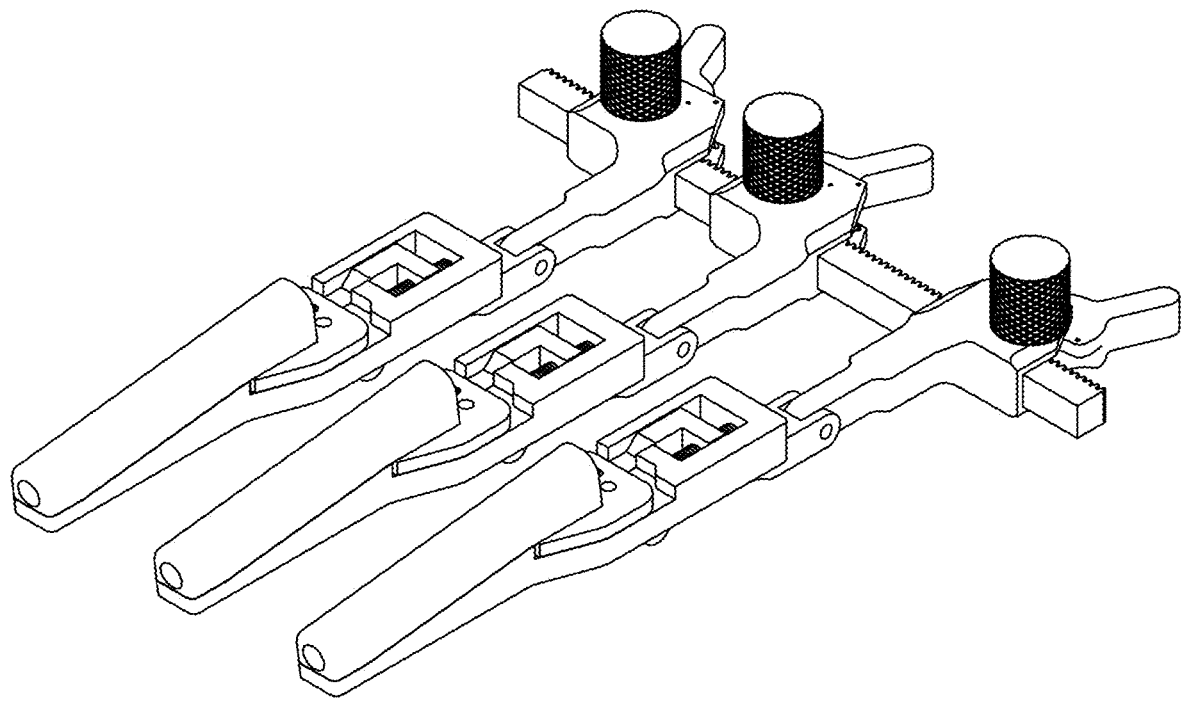
Figure 16A:
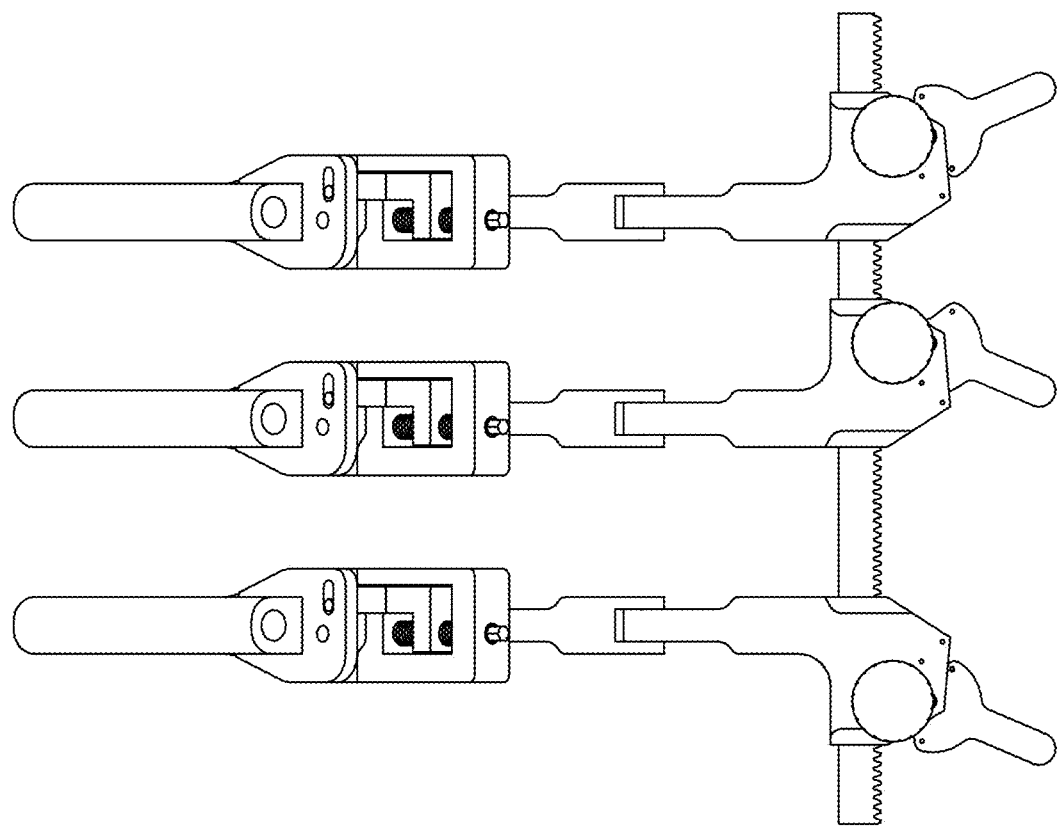
FIGS. 16A, 16B, 16C and 16D show top, front perspective, side, and perspective views of a device having three independent adjustment mechanisms according to the present technology in a neutral inclination, with each arm bent at the same angle.
Figure 16B:
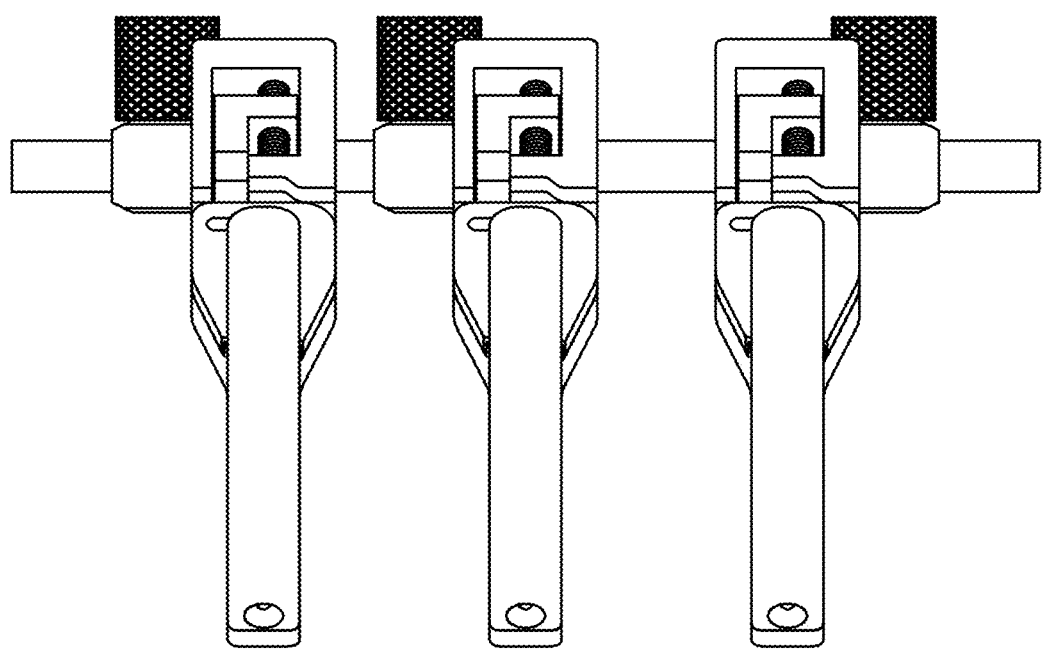
Figure 16C:
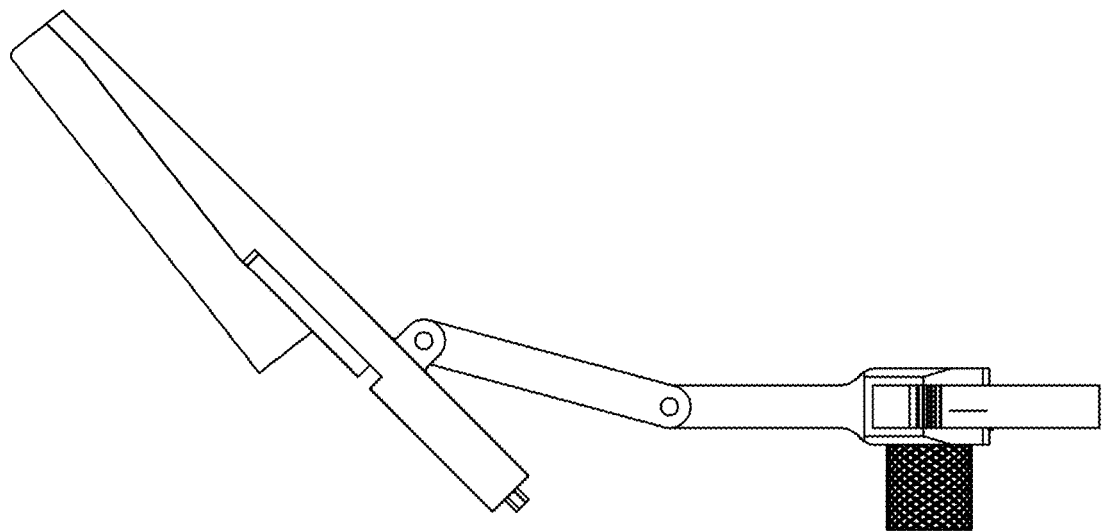
Figure 16D:
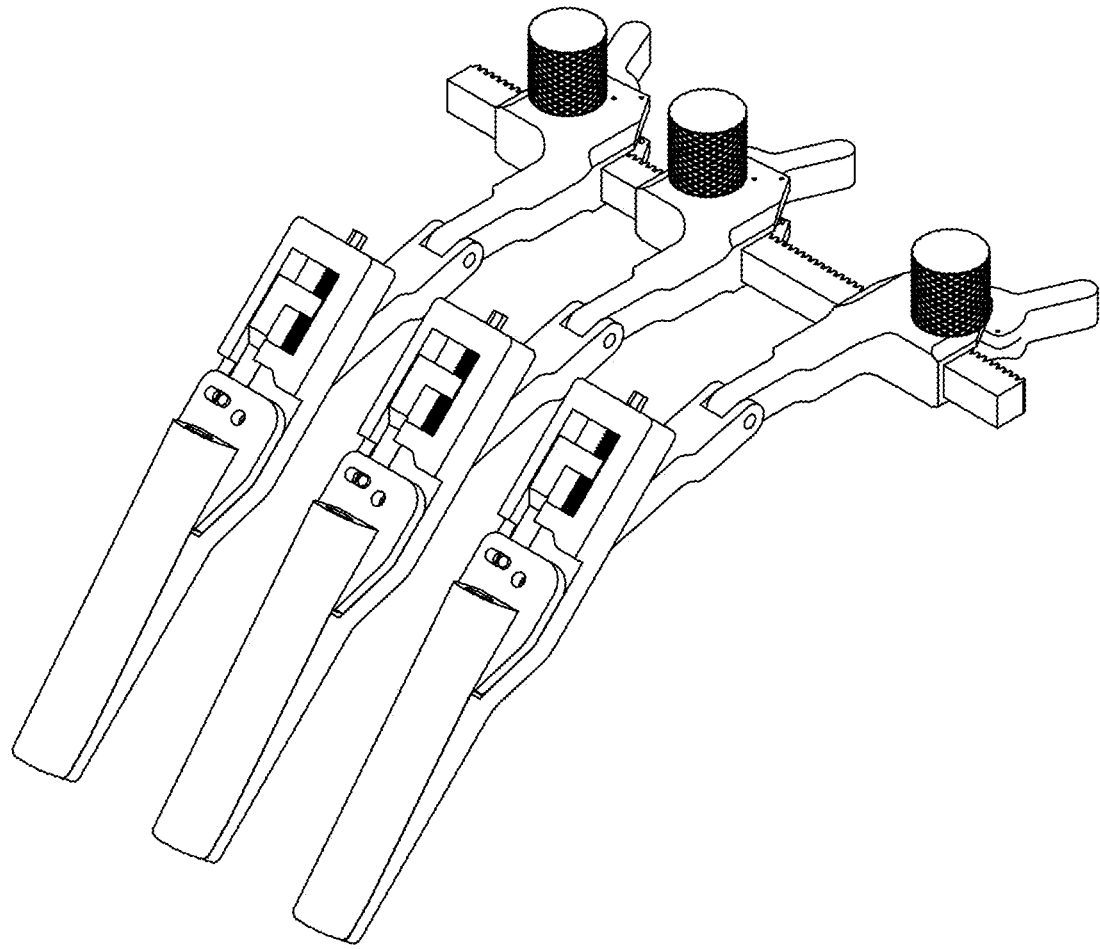
Figure 17A:
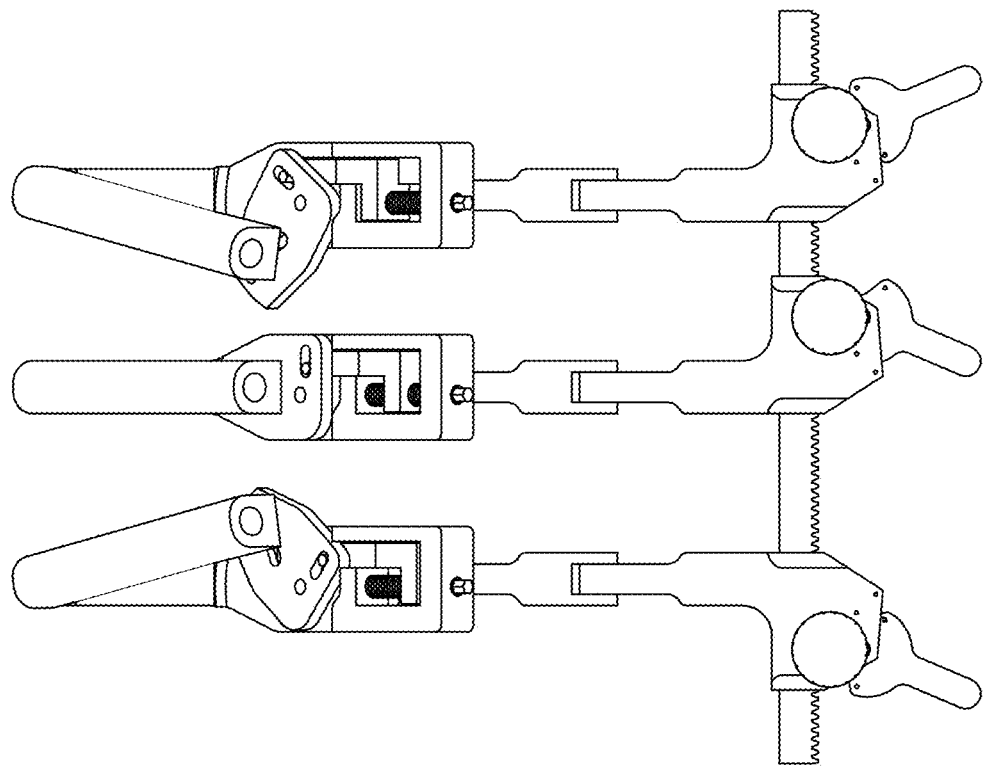
FIGS. 17A, 17B, 17C and 17D show top, front perspective, side, and perspective views of a device having three-armed adjustment mechanism according to the present technology in an outwardly splayed inclination, with each arm bent at the same angle.
Figure 17B:
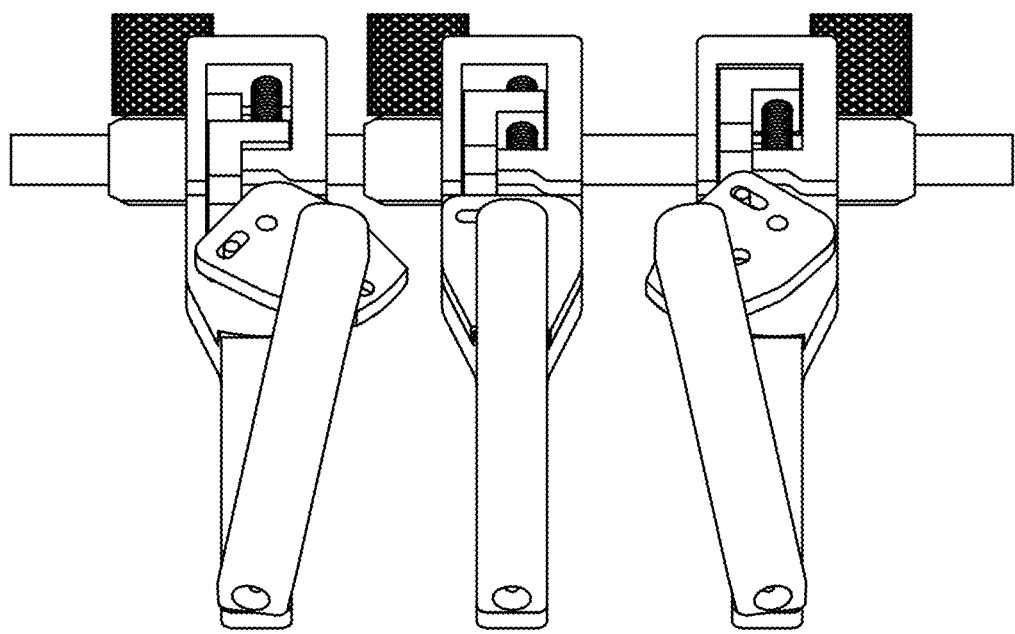
Figure 17C:
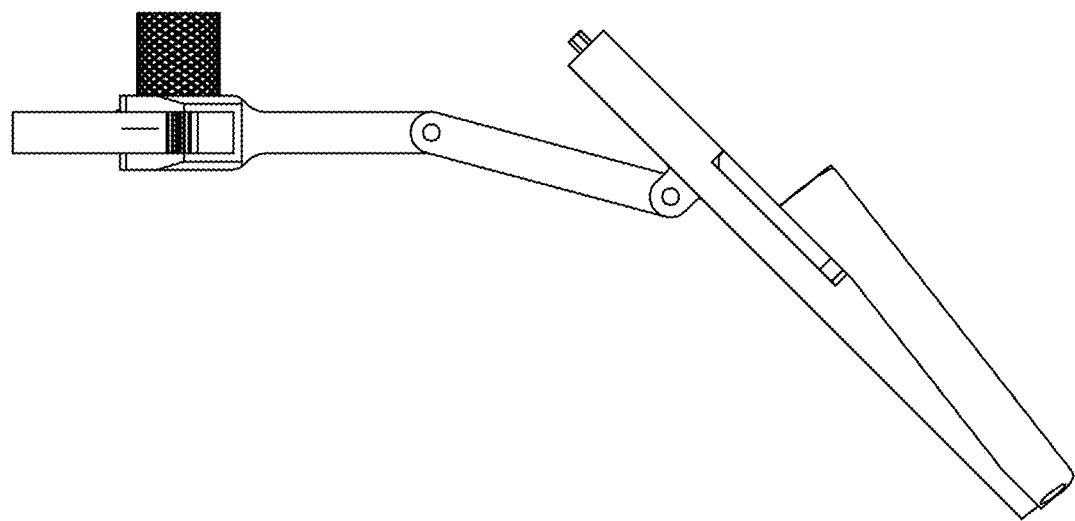
Figure 17D:
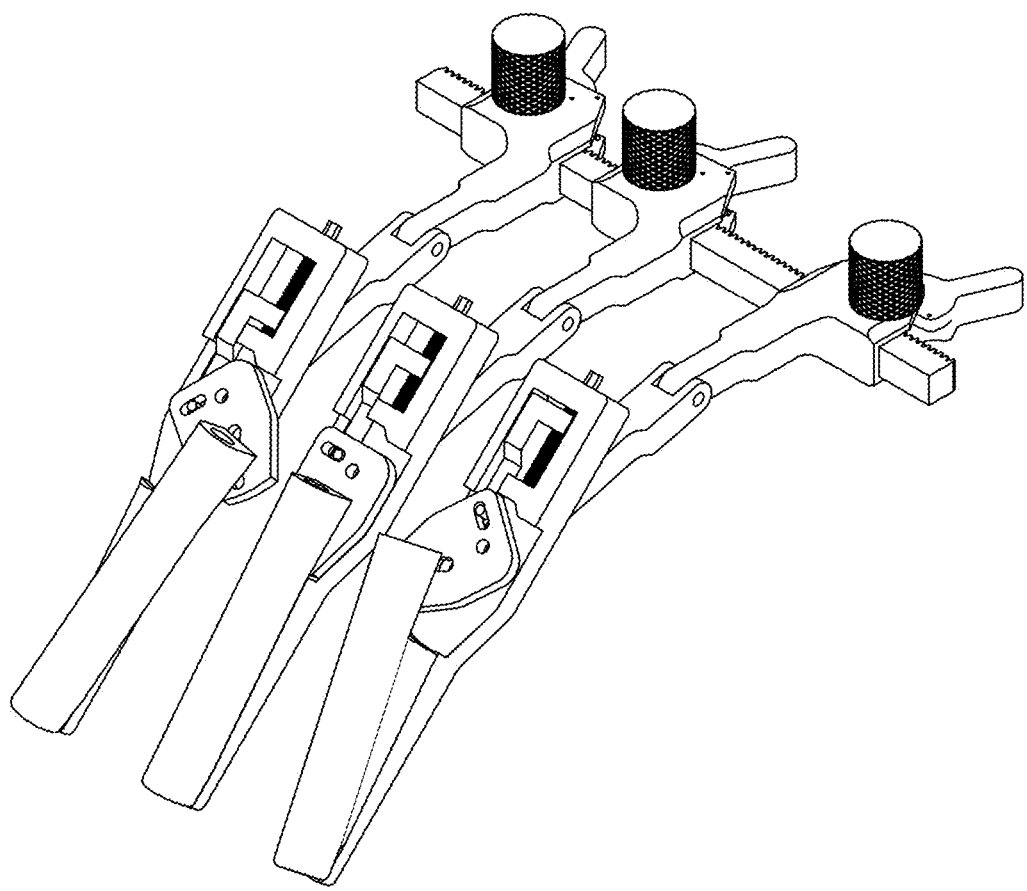
Figure 18A:
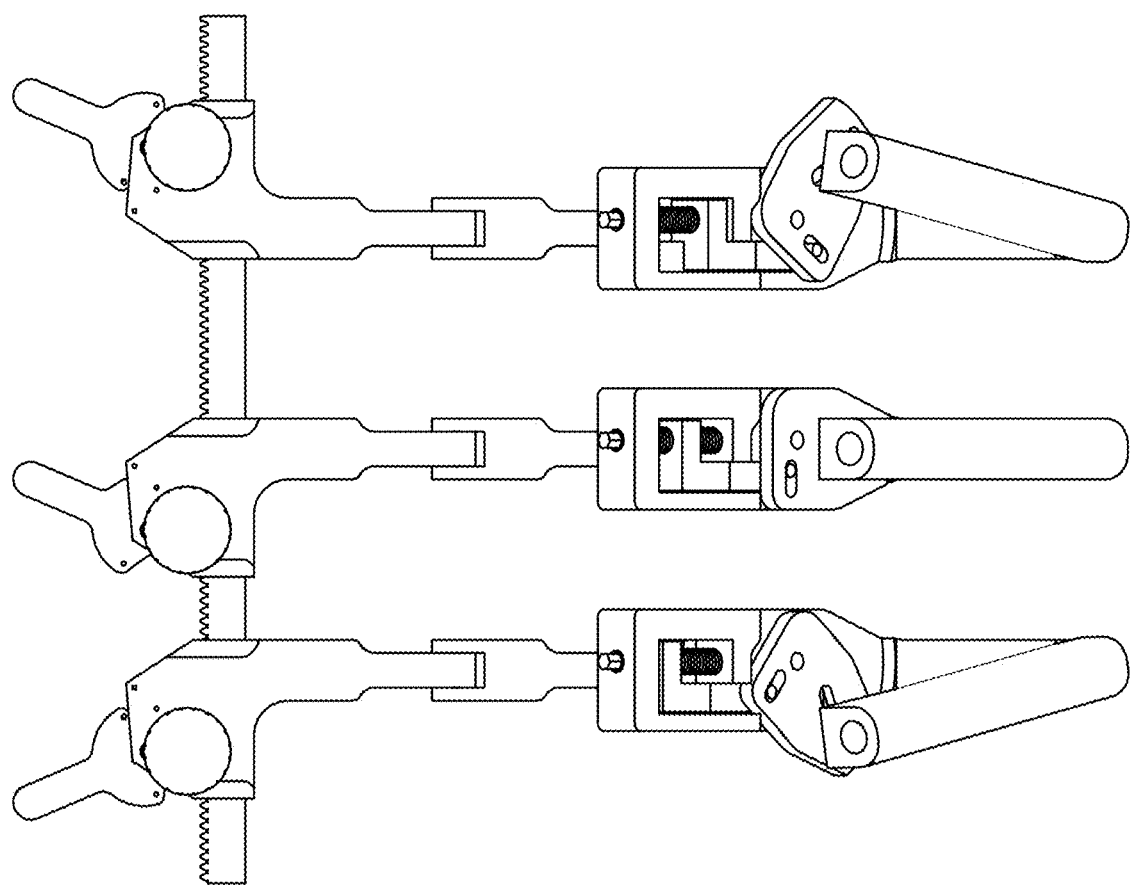
FIGS. 18A, 18B, 18C and 18D show top, front perspective, side, and perspective views of a device having three independent adjustment mechanisms according to the present technology in an inwardly splayed inclination, with each arm bent at the same angle.
Figure 18B:
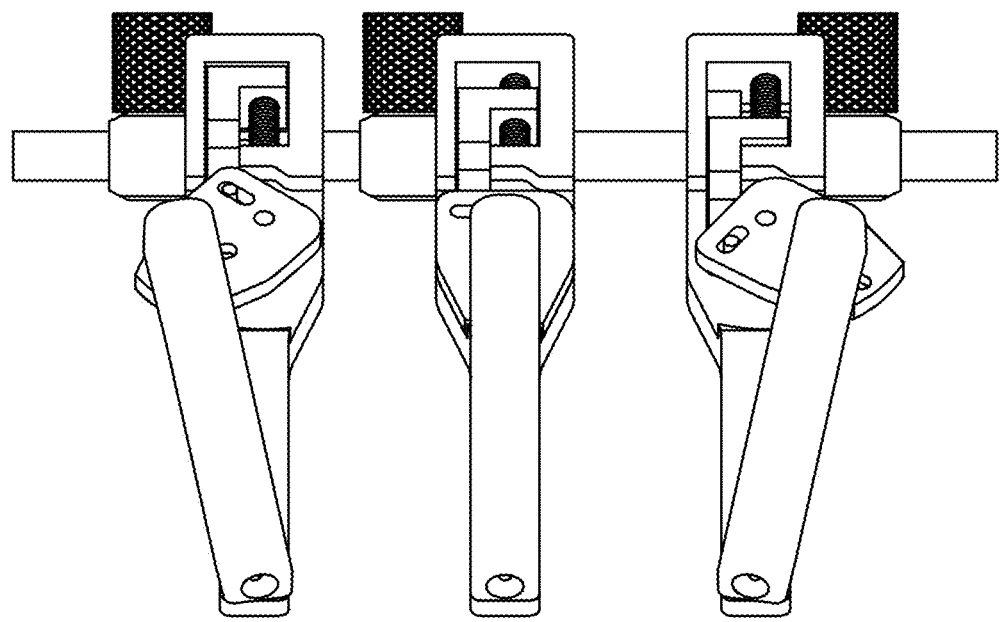
Figure 18C:
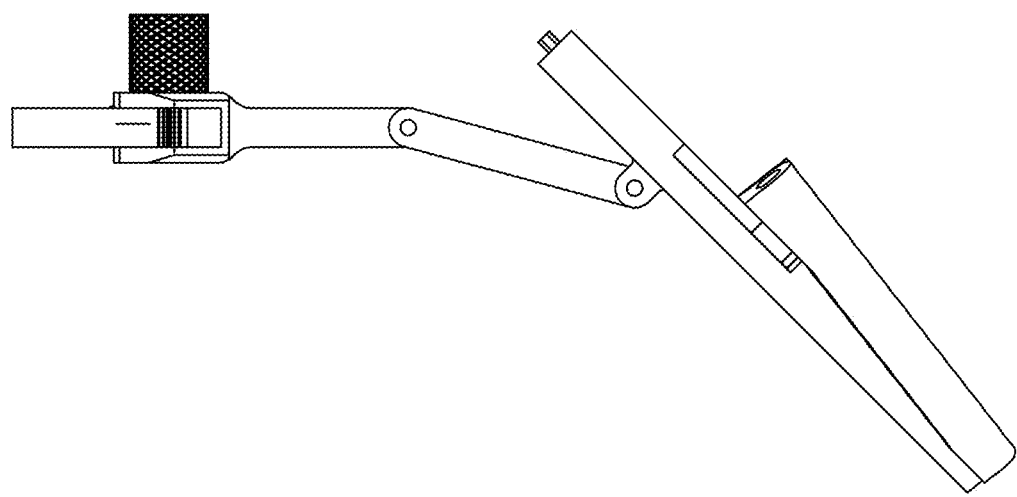
Figure 18D:
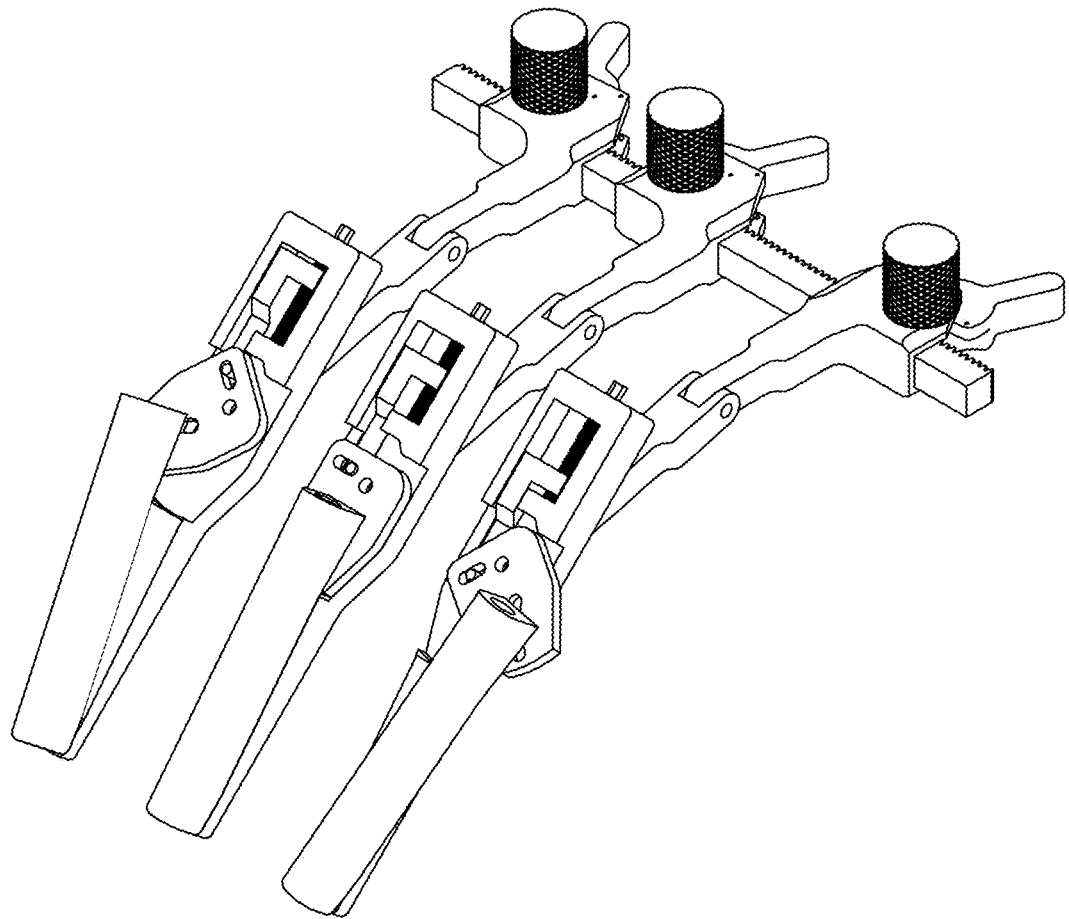
Figure 19A:
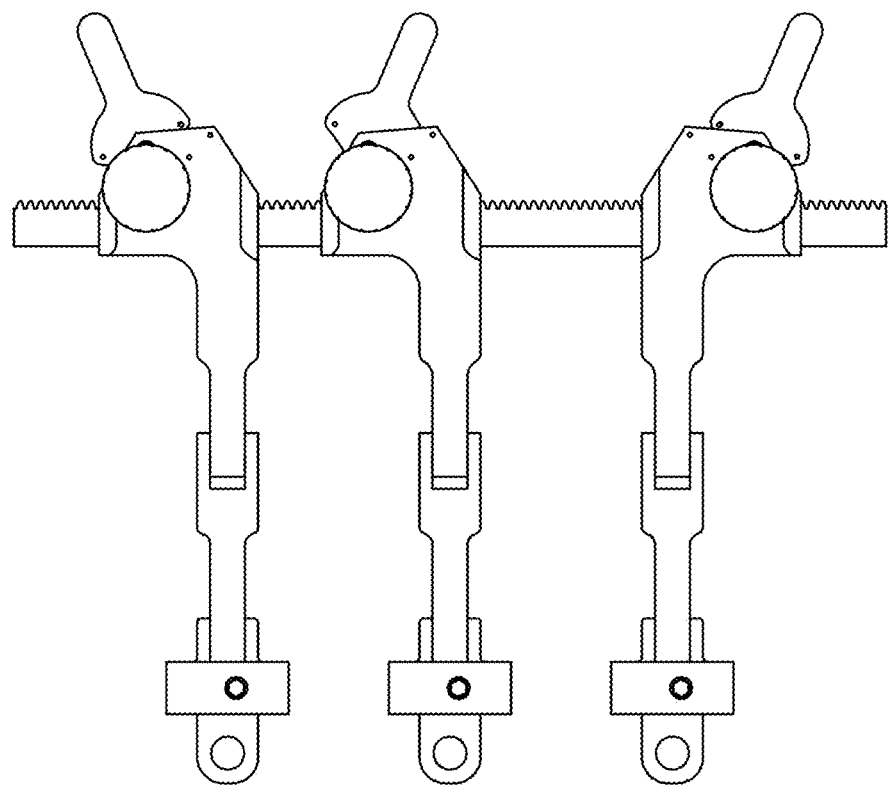
FIGS. 19A, 19B, 19C and 19D show top, front perspective, side, and perspective views of a device having three independent adjustment mechanisms according to the present technology in a neutral inclination, with each arm bent at right angles.
Figure 19B:
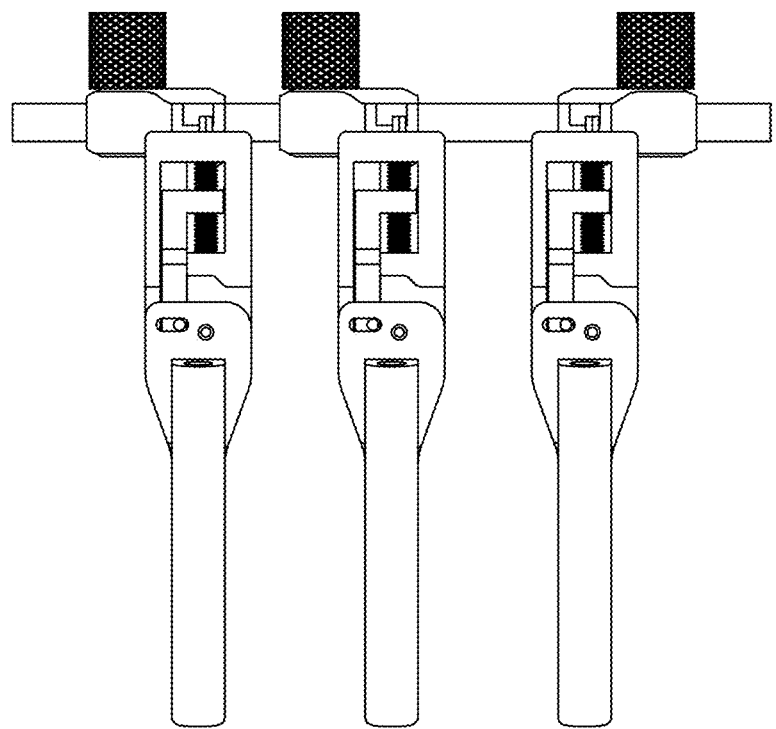
Figure 19C:
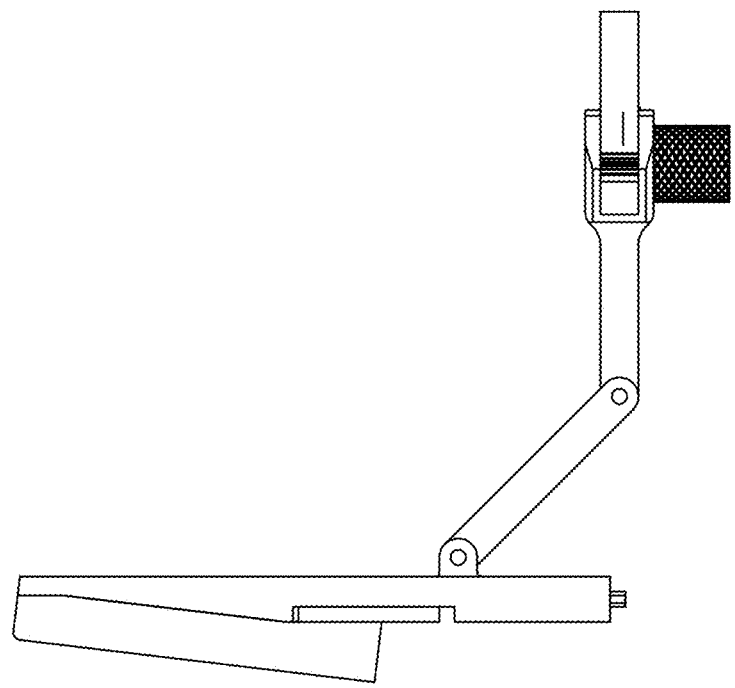
Figure 19D:
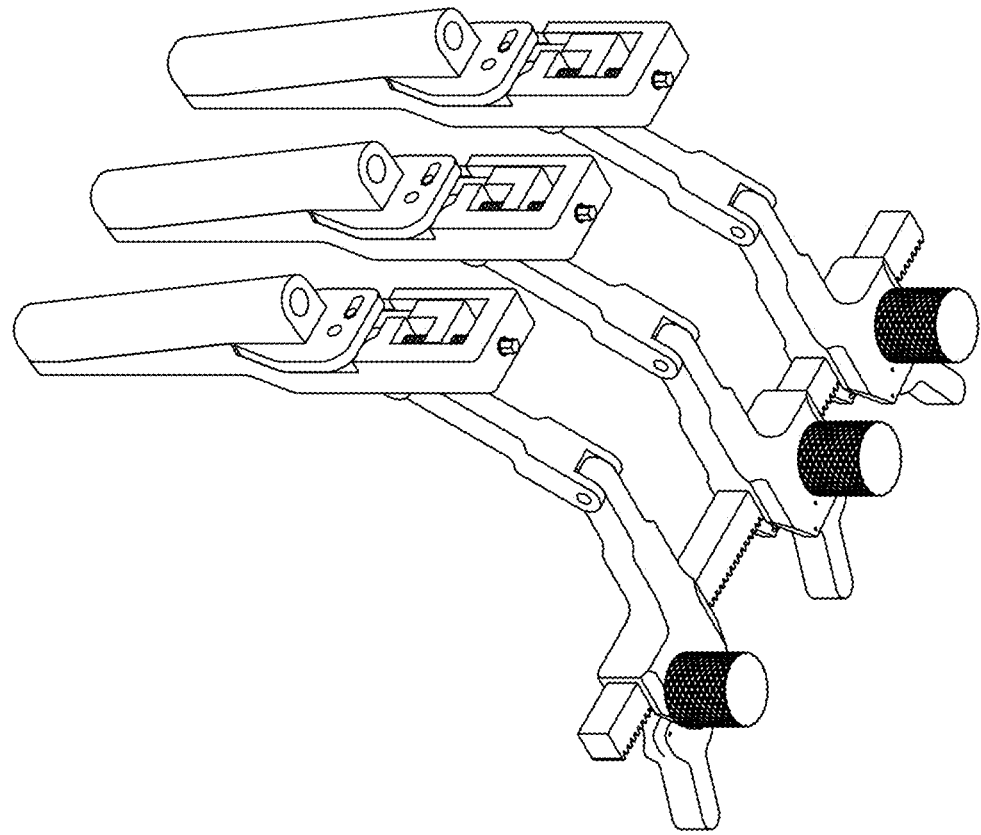
Figure 20A:
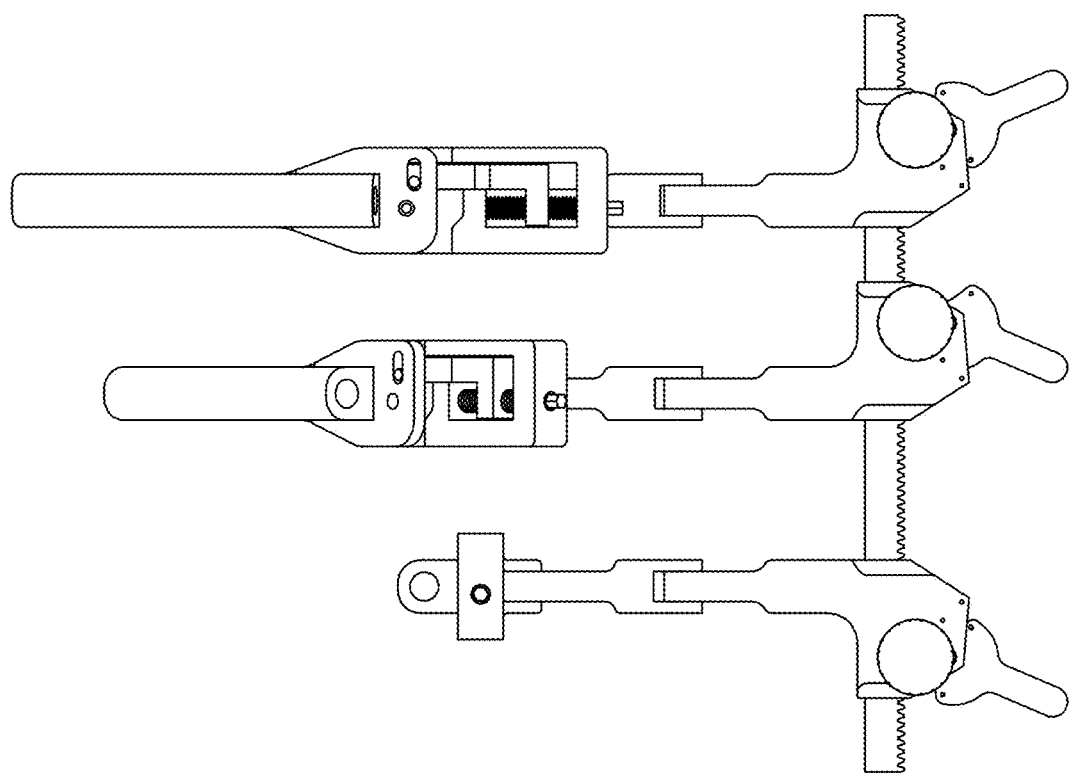
FIGS. 20A, 20B, 20C and 20D show top, front perspective, side, and perspective views of a device having three independent adjustment mechanisms according to the present technology in a neutral inclination, with each arm bent different angles.
Figure 20B:
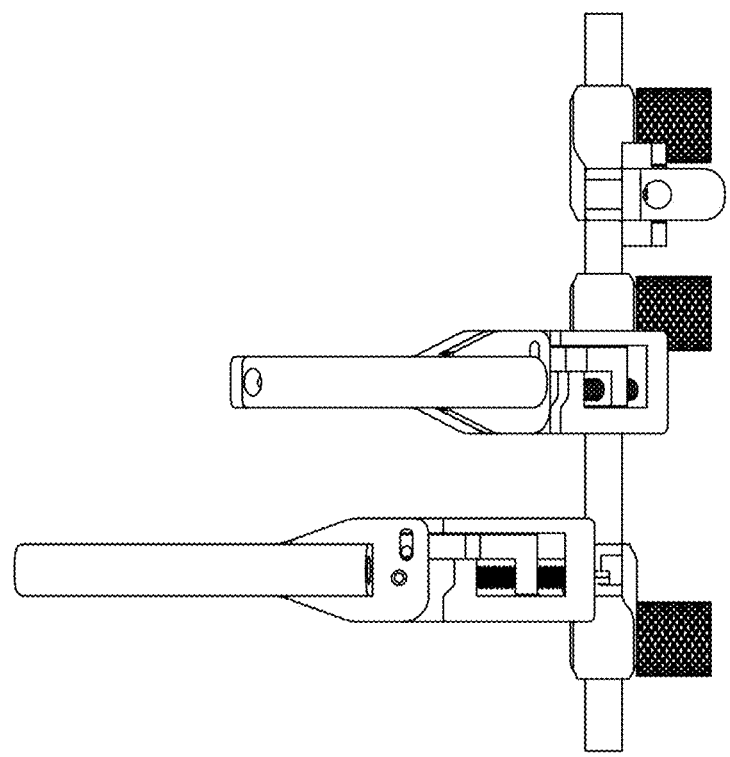
Figure 20C:
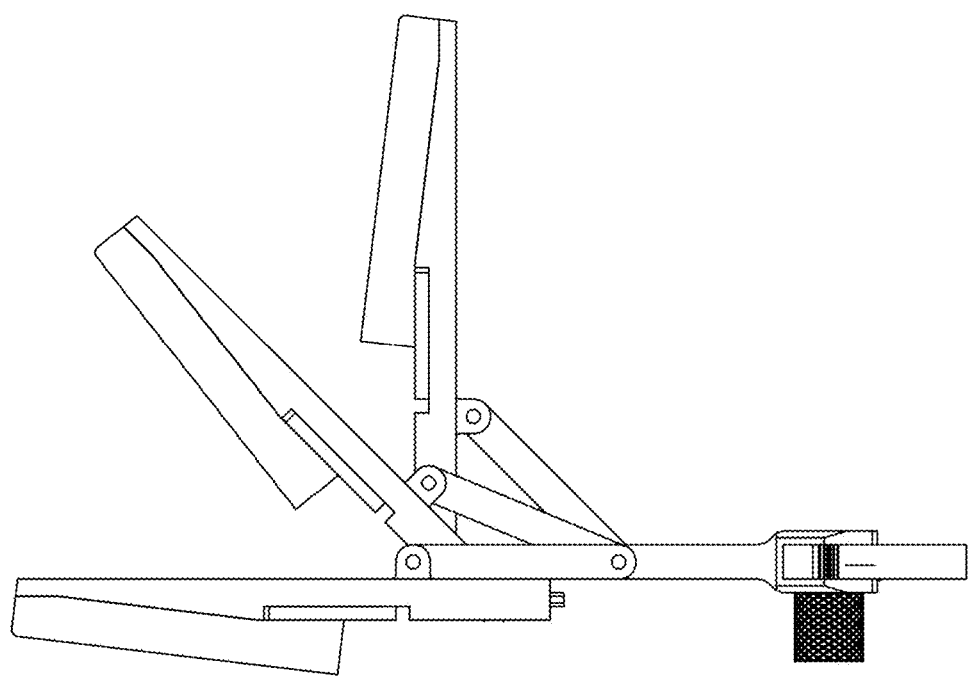
Figure 20D:
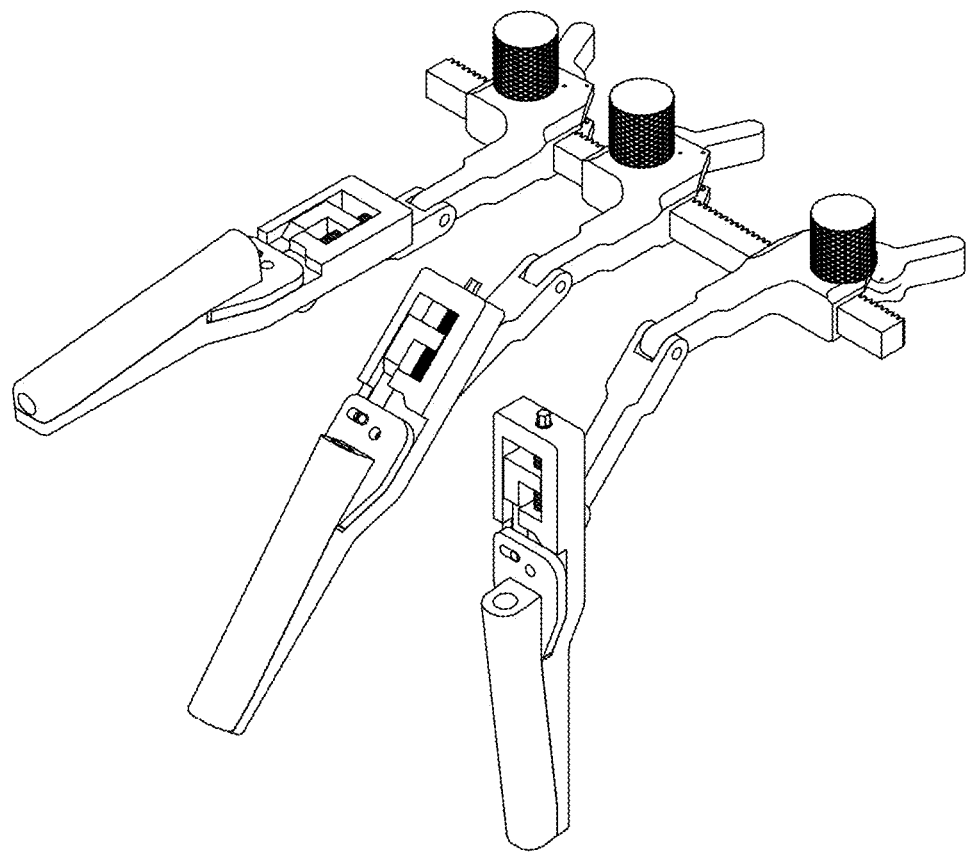
Figure 21A:
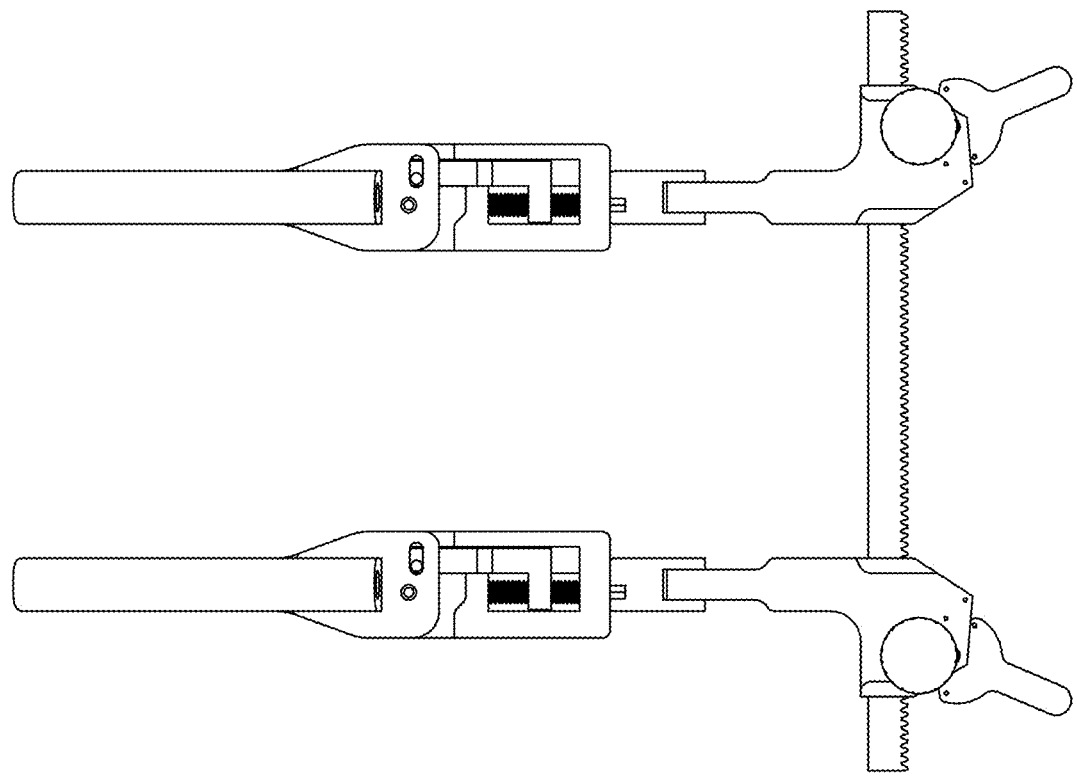
FIGS. 21A, 21B, 21C and 21D show top, front perspective, side, and perspective views of a two-armed adjustment mechanism according to the present technology in a neutral inclination, with each arm straight.
Figure 21B:
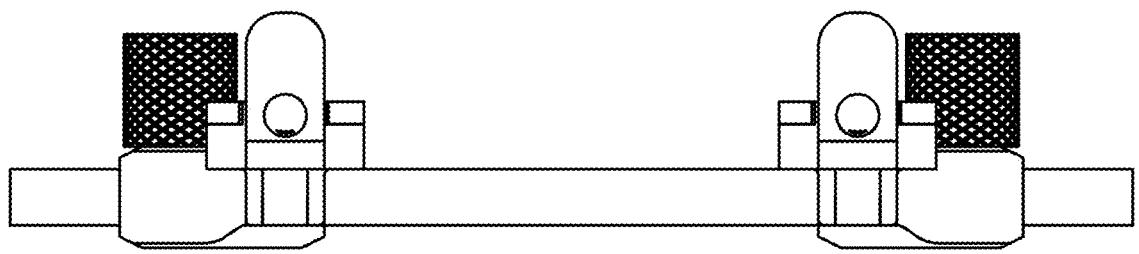
Figure 21C:
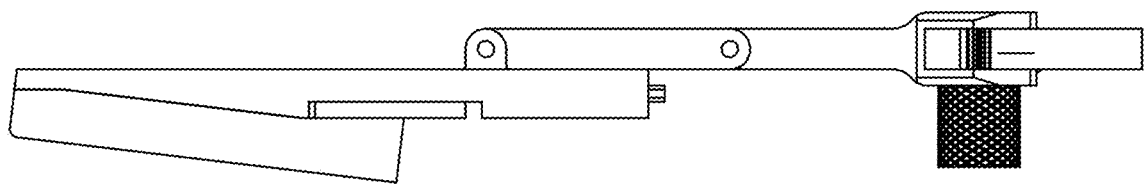
Figure 21D:
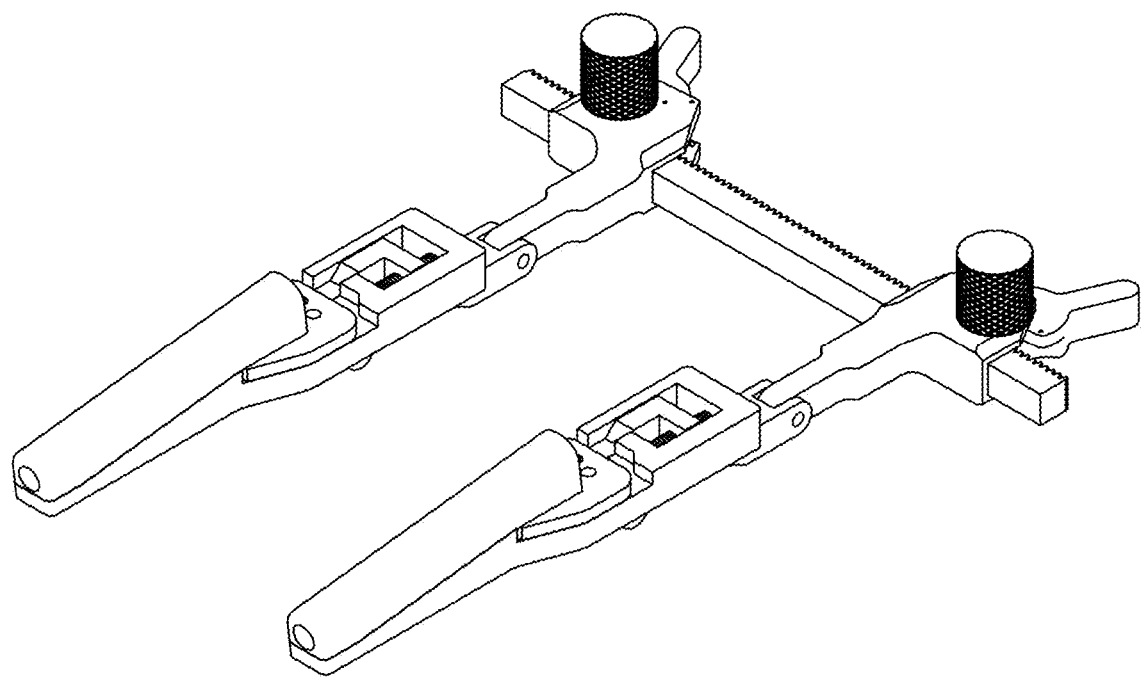
Figure 22A:
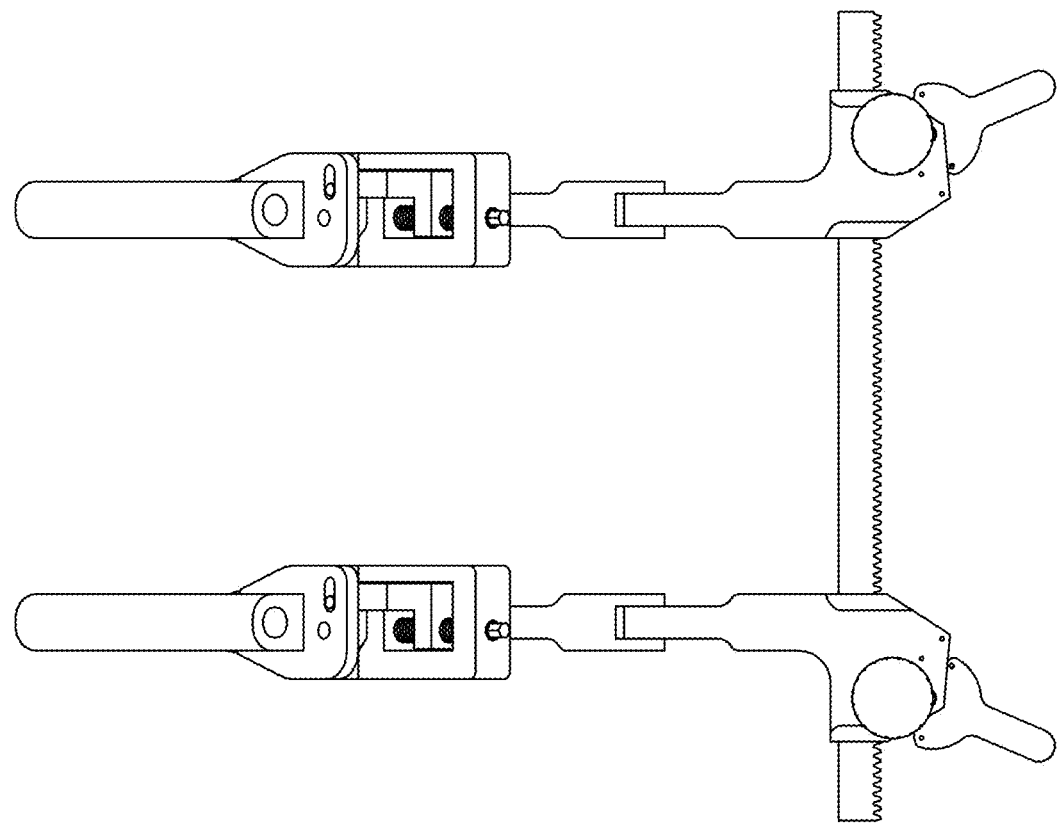
FIGS. 22A, 22B, 22C and 22D show top, front perspective, side, and perspective views of a two-armed adjustment mechanism according to the present technology in a neutral inclination, with each arm bent.
Figure 22B:
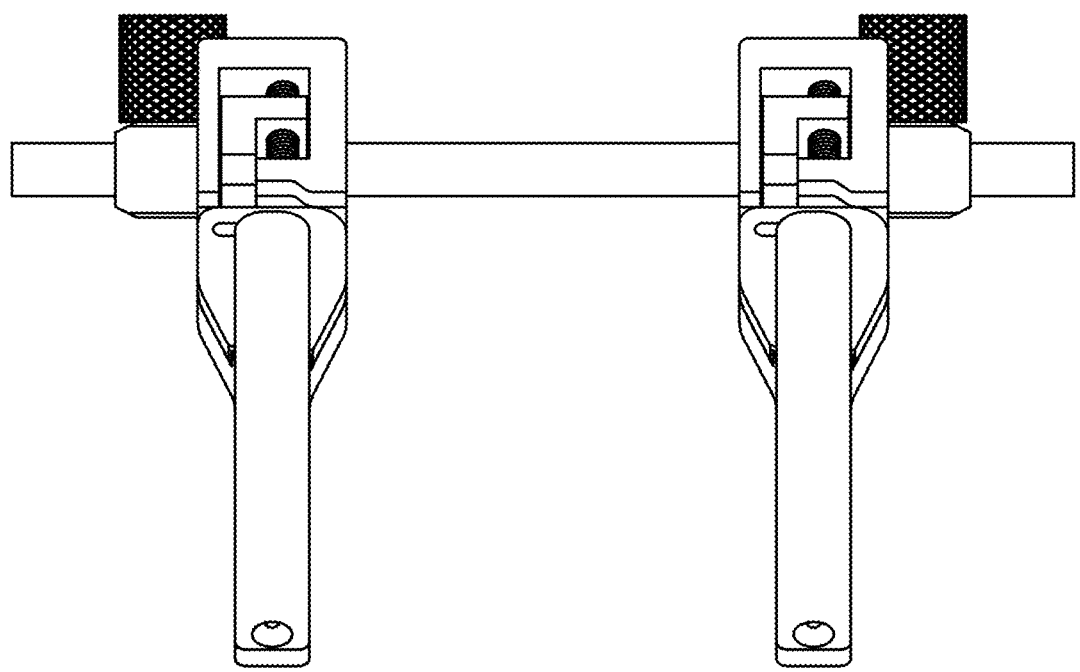
Figure 22C:
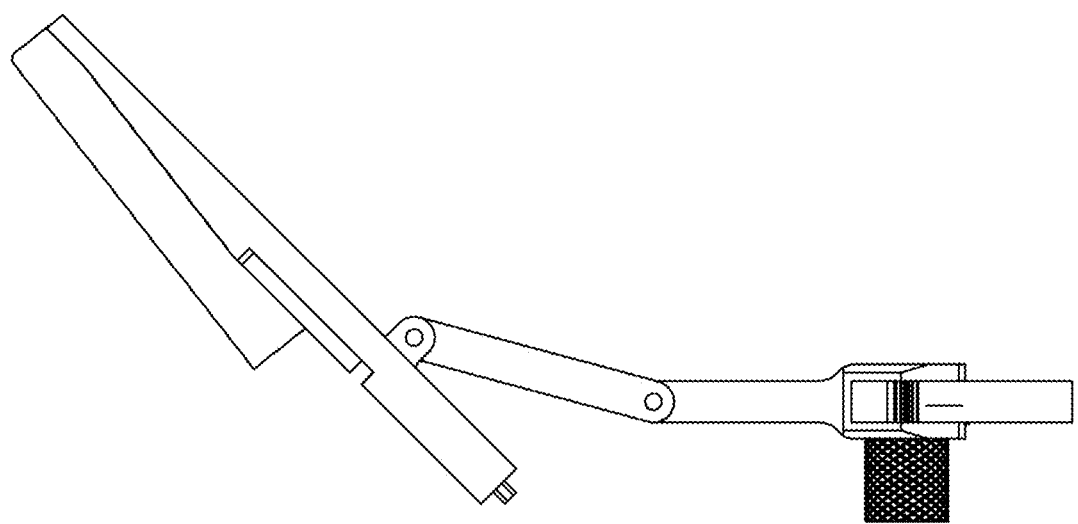
Figure 22D:
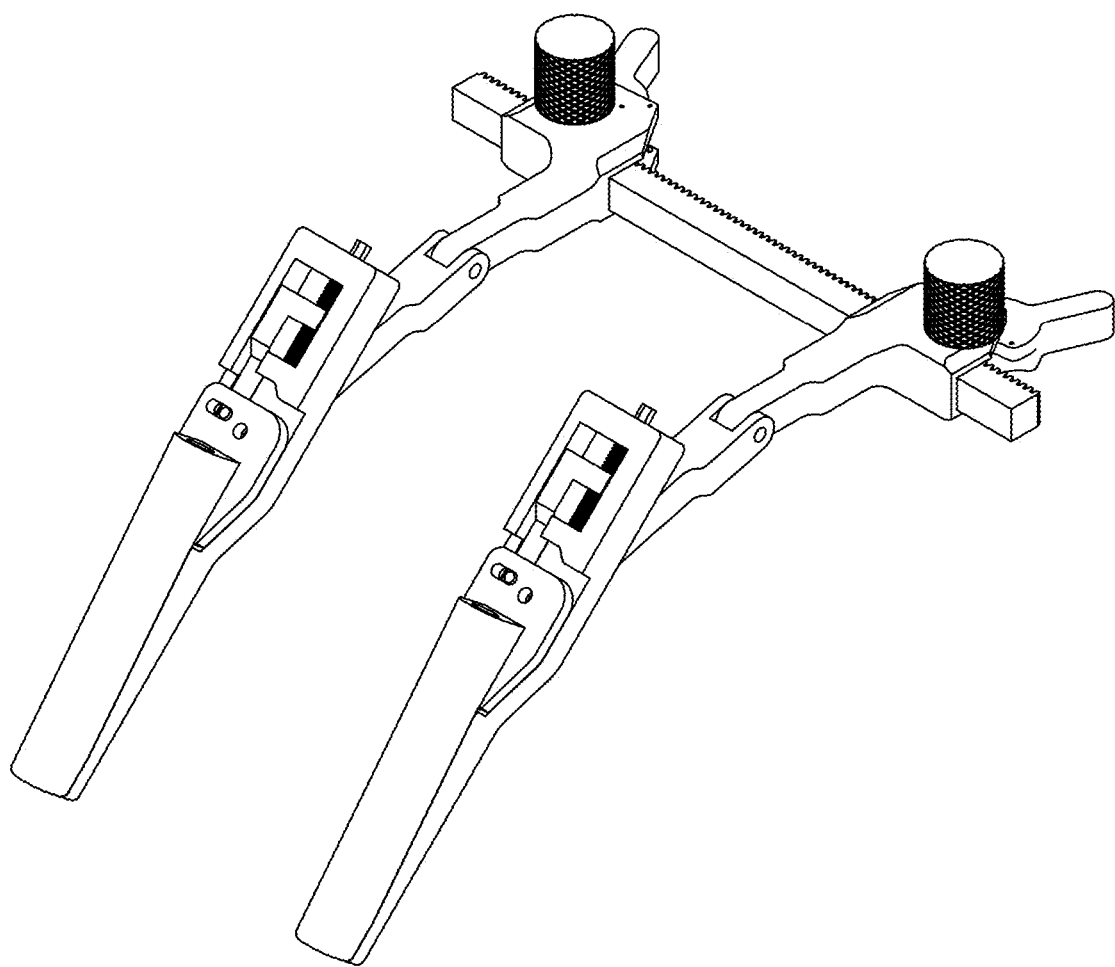
Figure 23A:
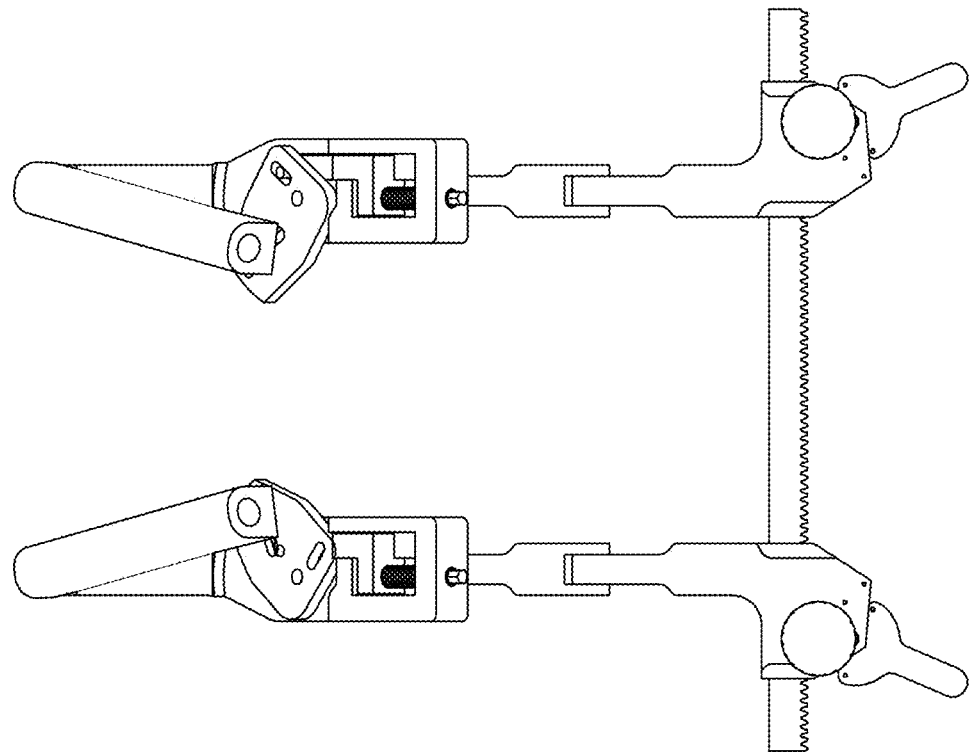
FIGS. 23A, 23B, 23C and 23D show top, front perspective, side, and perspective views of a two-armed adjustment mechanism according to the present technology in an outwardly splayed inclination, with each arm bent.
Figure 23B:
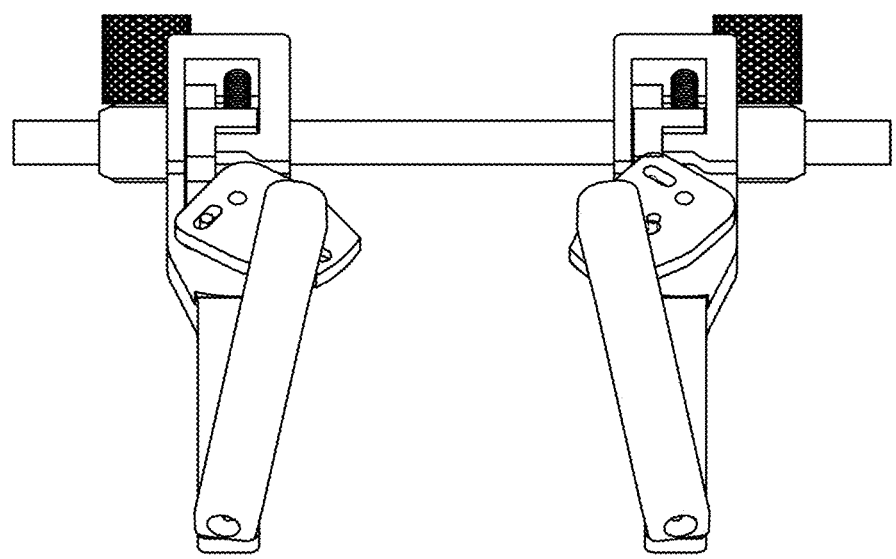
Figure 23C:
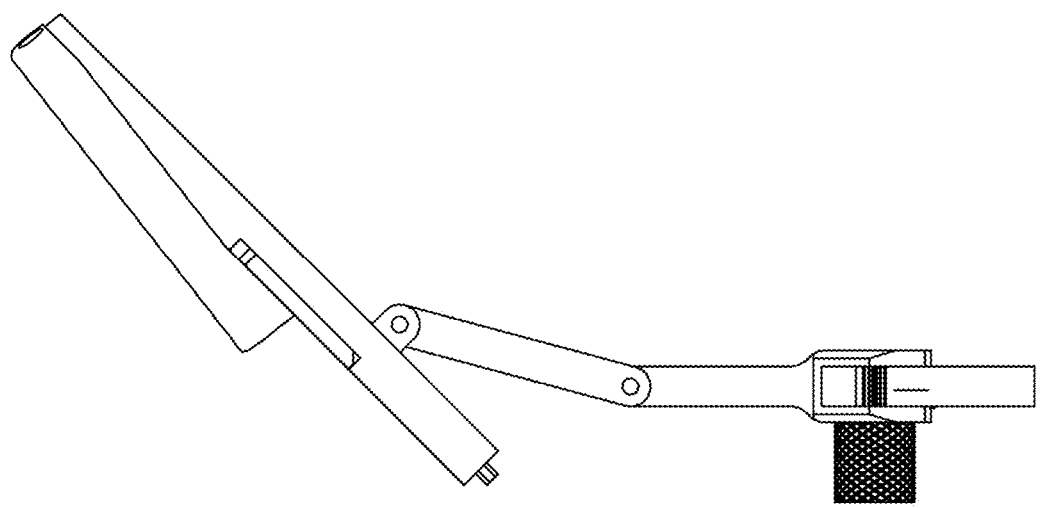
Figure 23D:
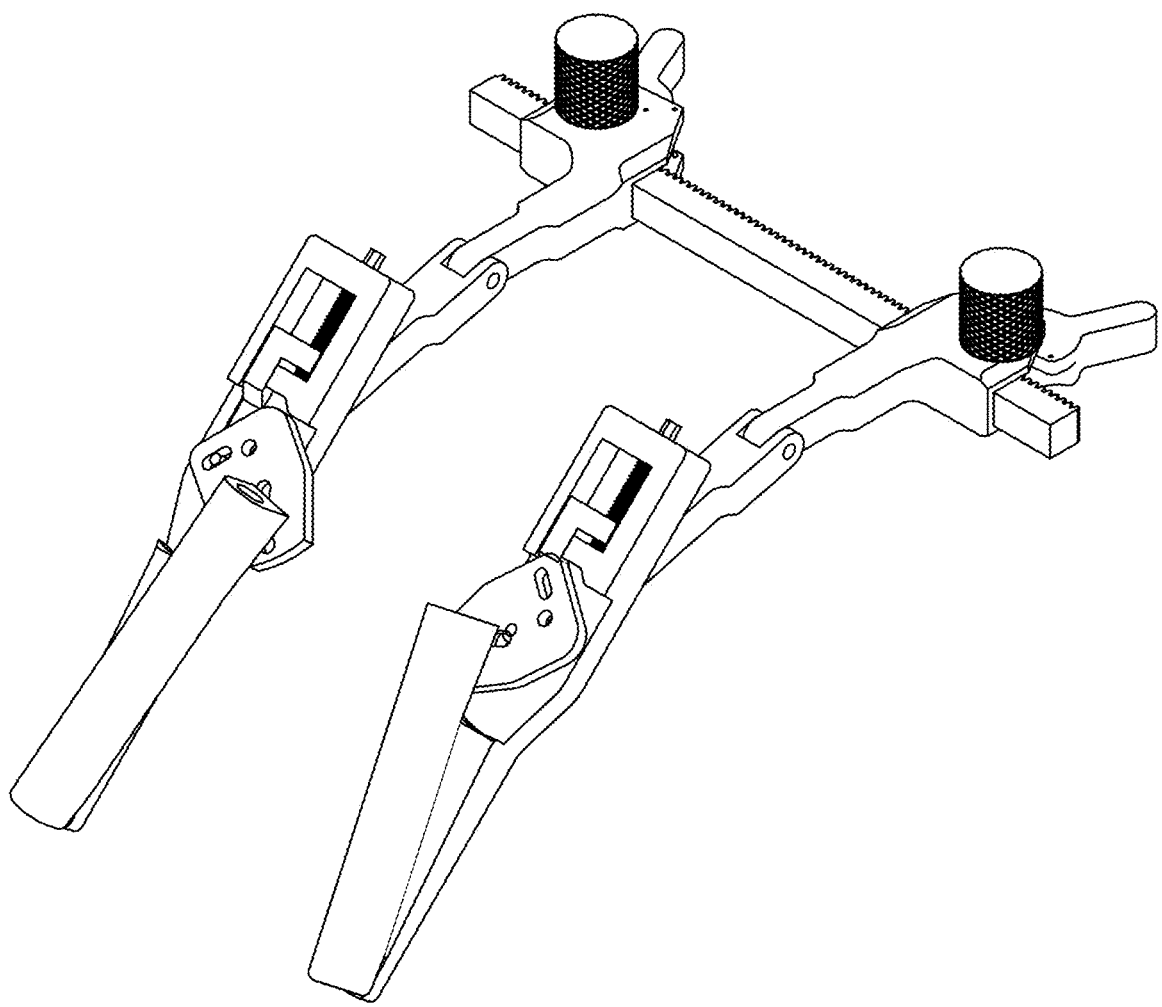
Figure 24A:
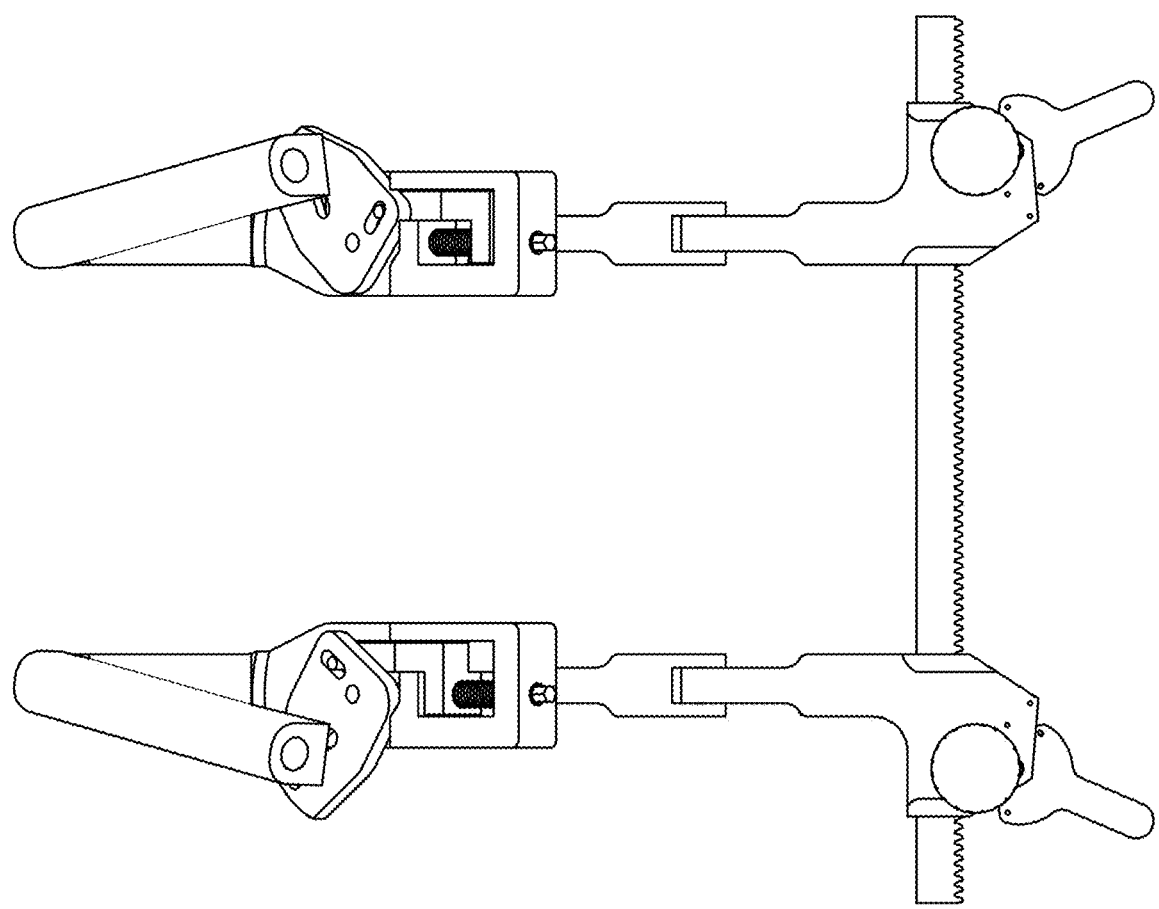
FIGS. 24A, 24B, 24C and 24D show top, front perspective, side, and perspective views of a two-armed adjustment mechanism according to the present technology in an inwardly splayed inclination, with each arm bent.
Figure 24B:
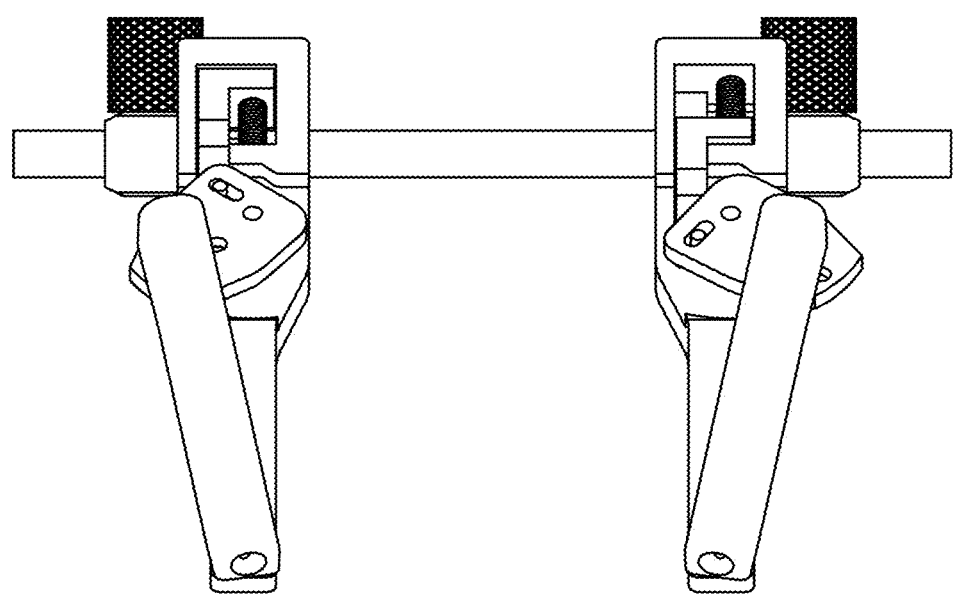
Figure 24C:
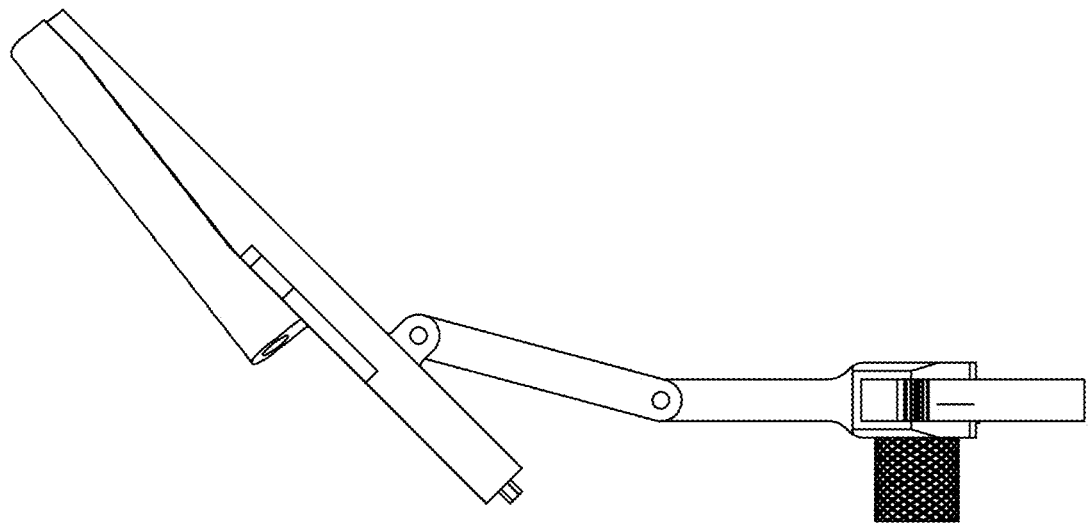
Figure 24D:
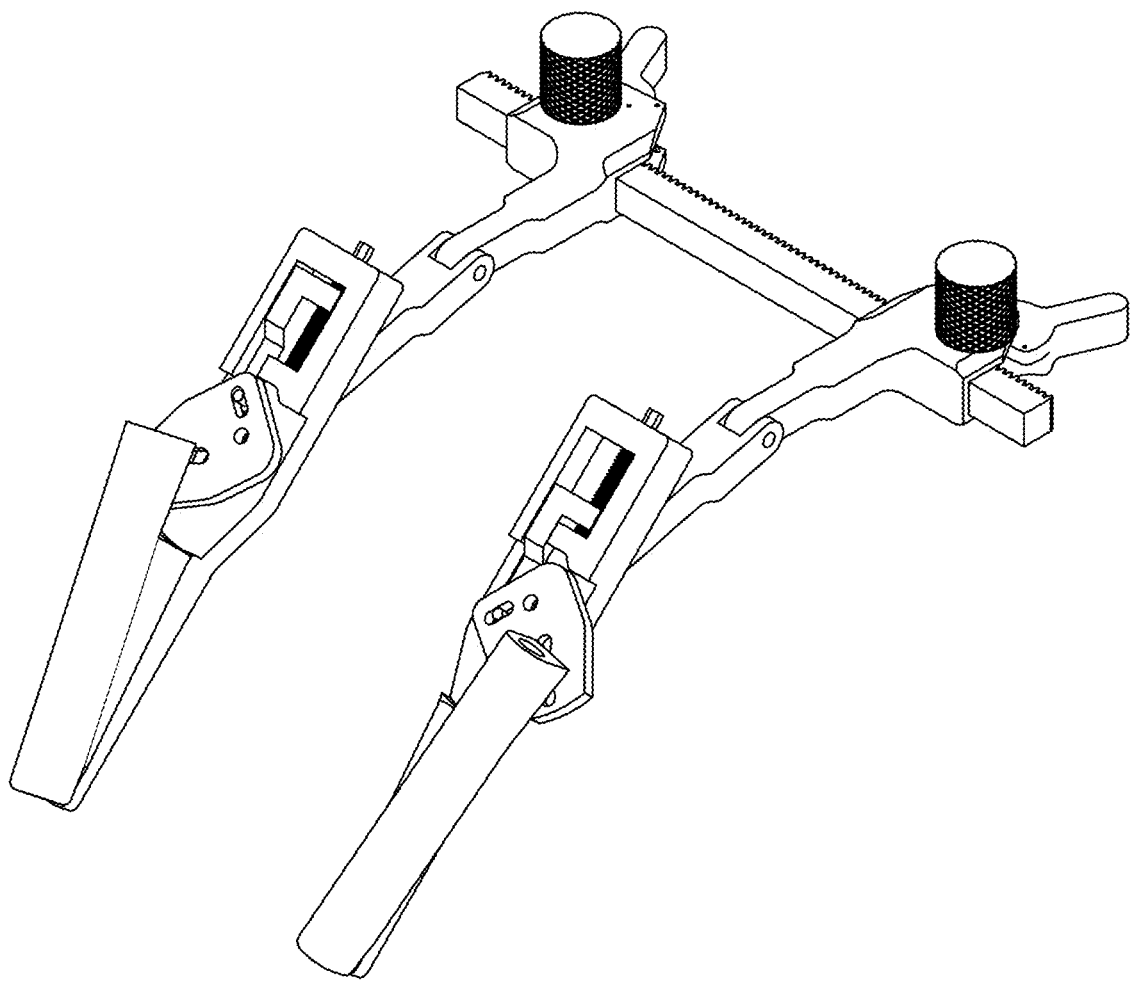
Figure 25A:
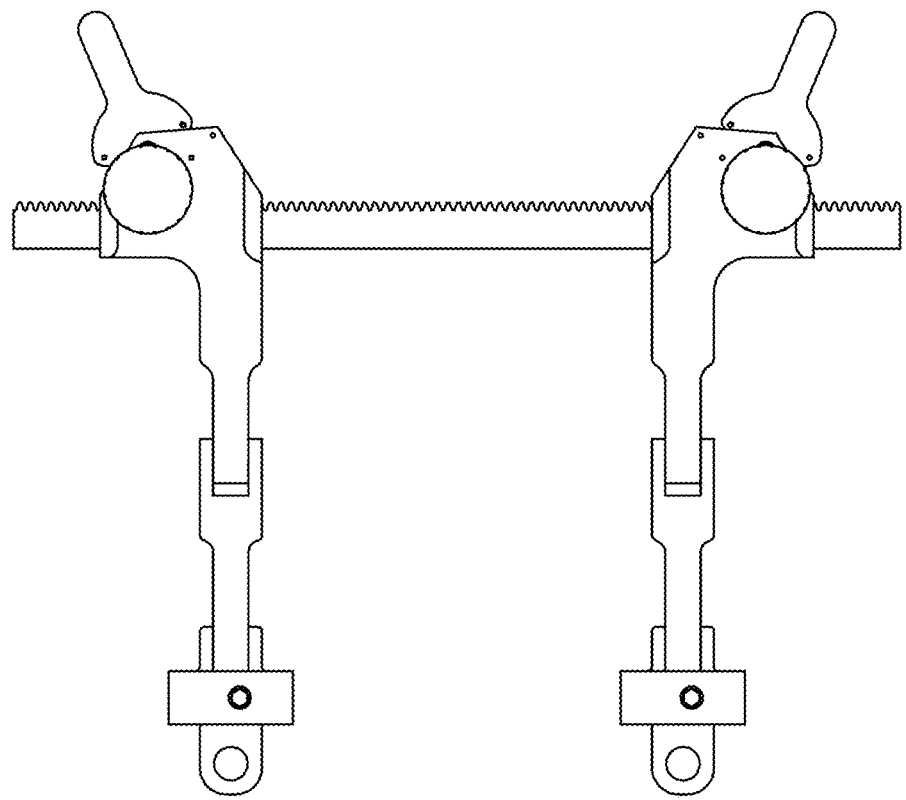
FIGS. 25A, 25B, 25C and 25D show top, front perspective, side, and perspective views of a two-armed adjustment mechanism according to the present technology in a neutral inclination, with each arm bent at right angles.
Figure 25B:
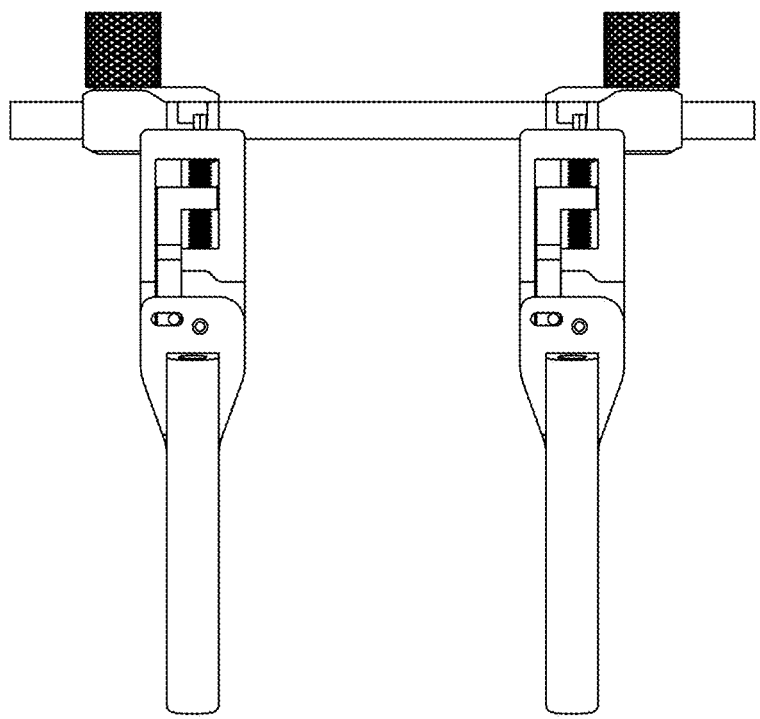
Figure 25C:
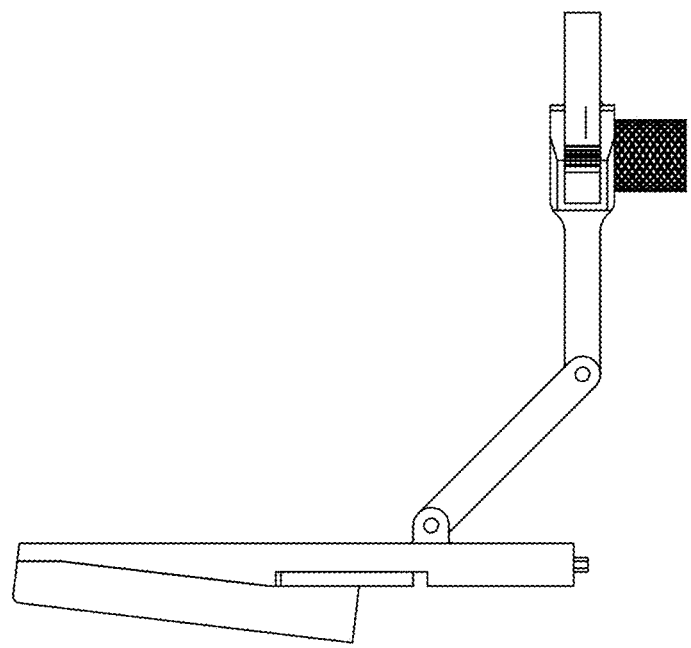
Figure 25D:
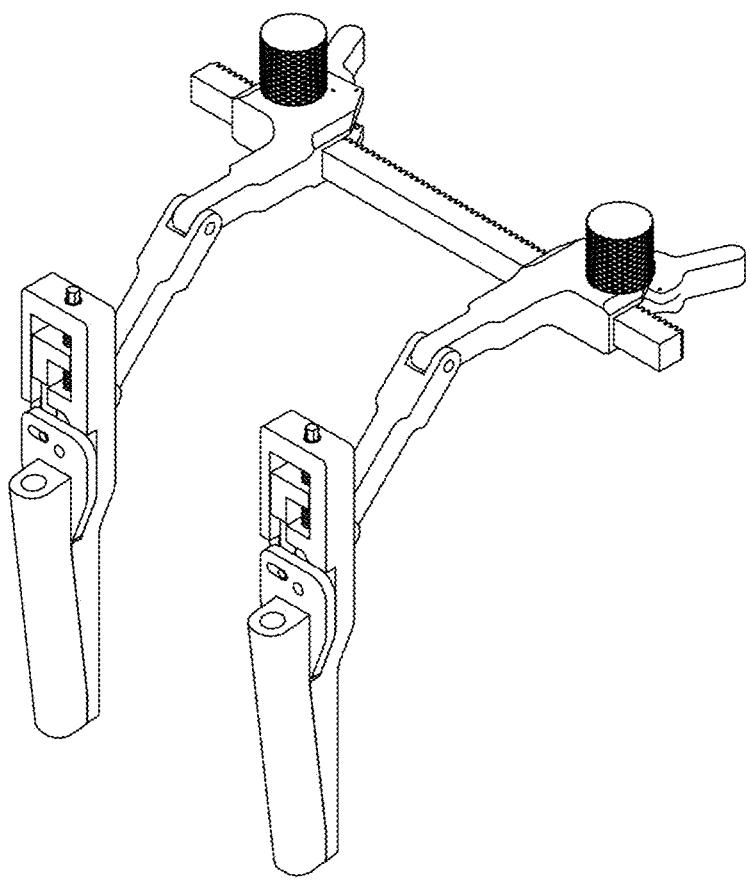
Figure 26A:
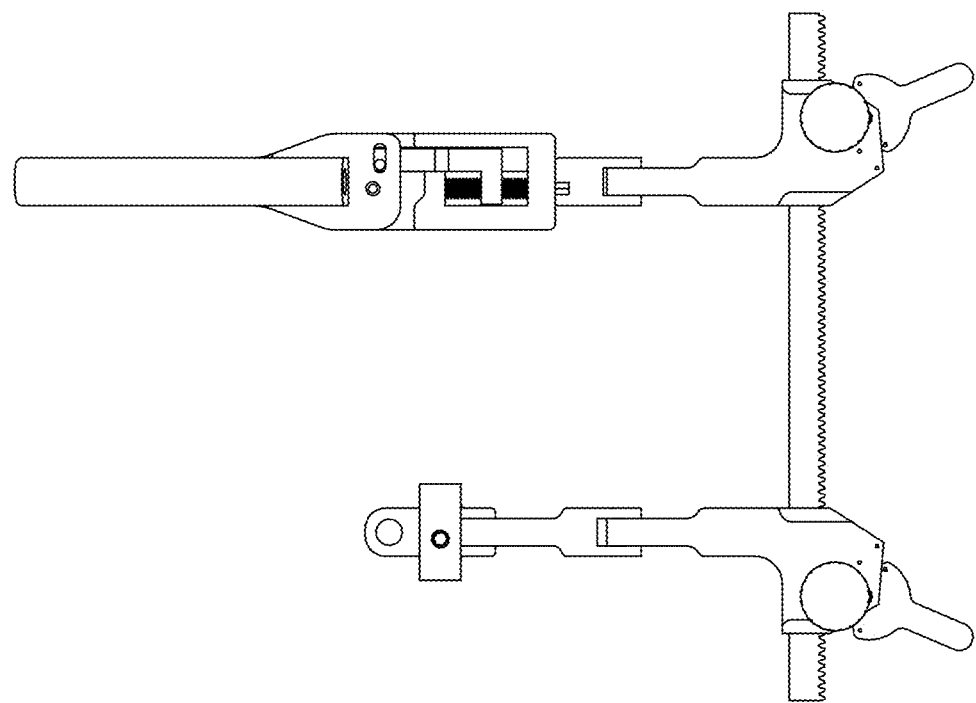
FIGS. 26A, 26B, 26C and 26D show top, front perspective, side, and perspective views of a two-armed adjustment mechanism according to the present technology in a neutral inclination, with each arm bent at different angles.
Figure 26B:
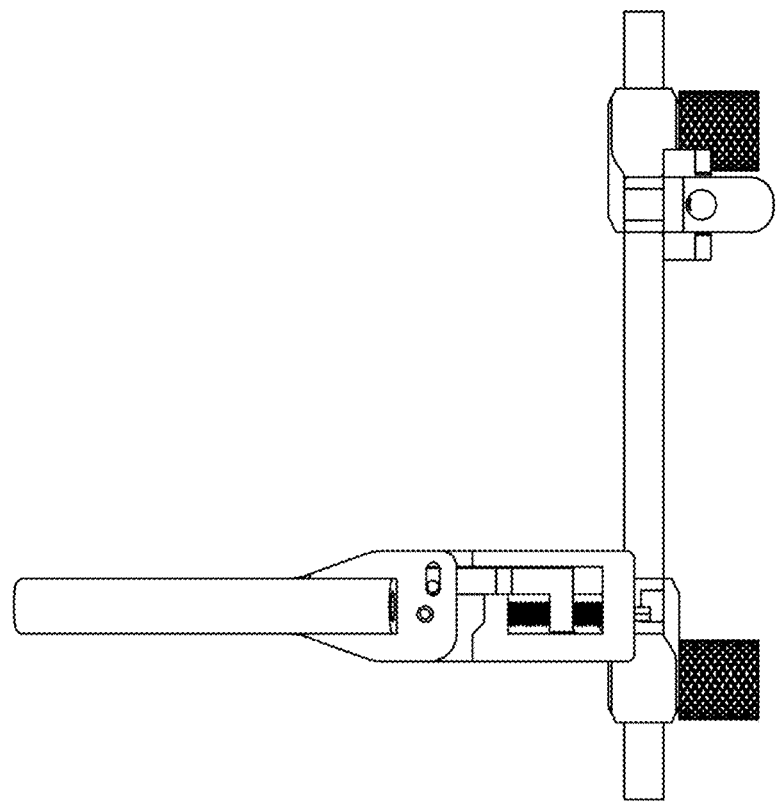
Figure 26C:
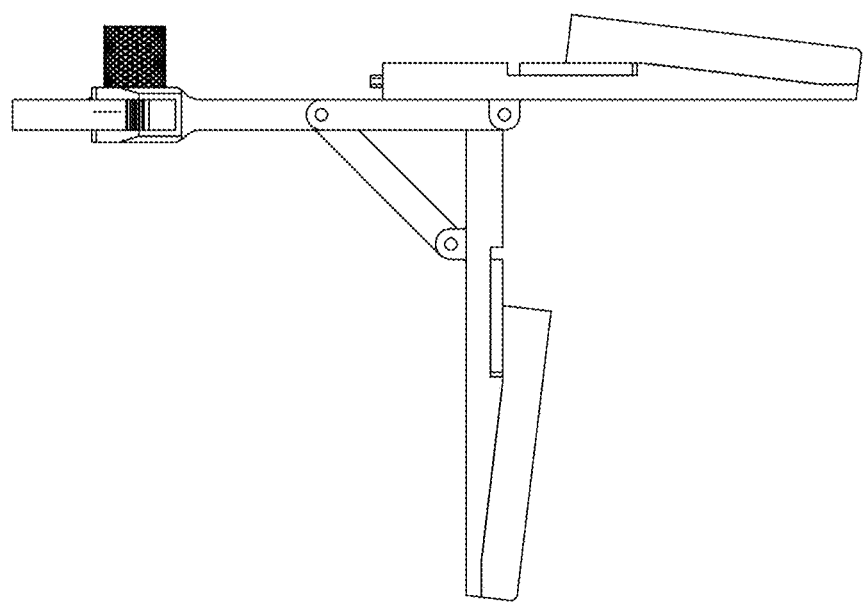
Figure 26D:
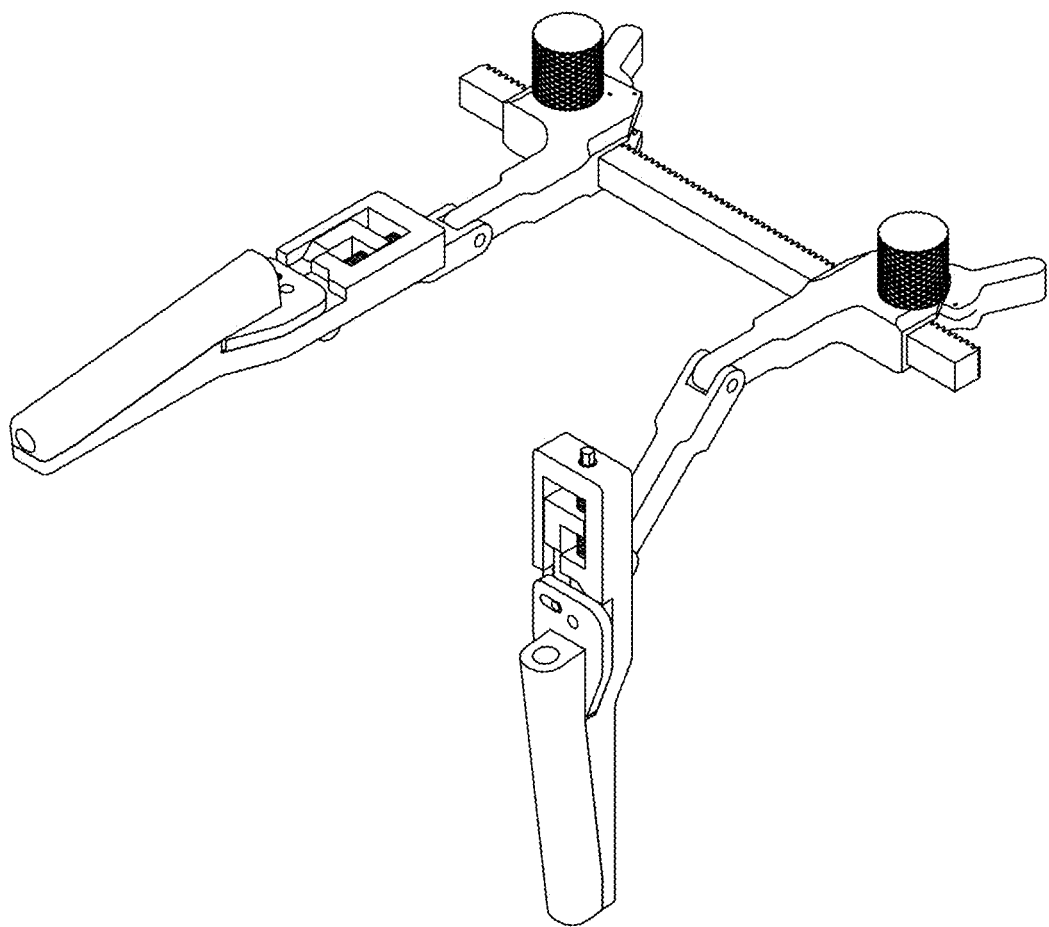

As shown in FIG. 9B, the fixture 110 has a loop 131 extending beneath it, through which a pin 130 is inserted, forming a hinged joint with a link 120. The link 120 is connected to a mount 122 or 123 by a pin 121.

Figure 27A:
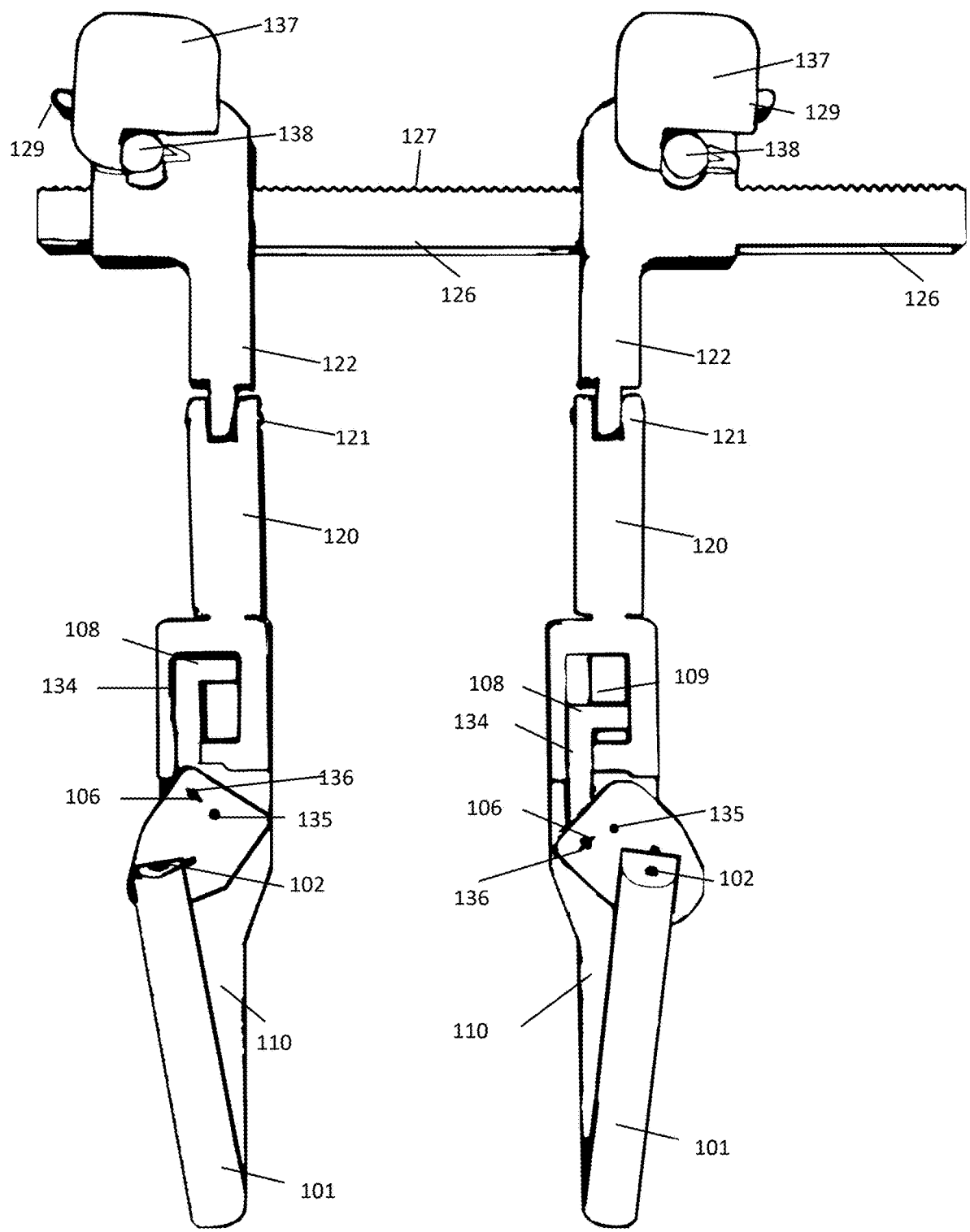
FIGS. 27A, 27B, and 27C show images of an additively manufactured and assembled distractor having two displaceable arms on a toothed rack according to the invention, in three states of inclination of the pin holders.
Figure 27B:
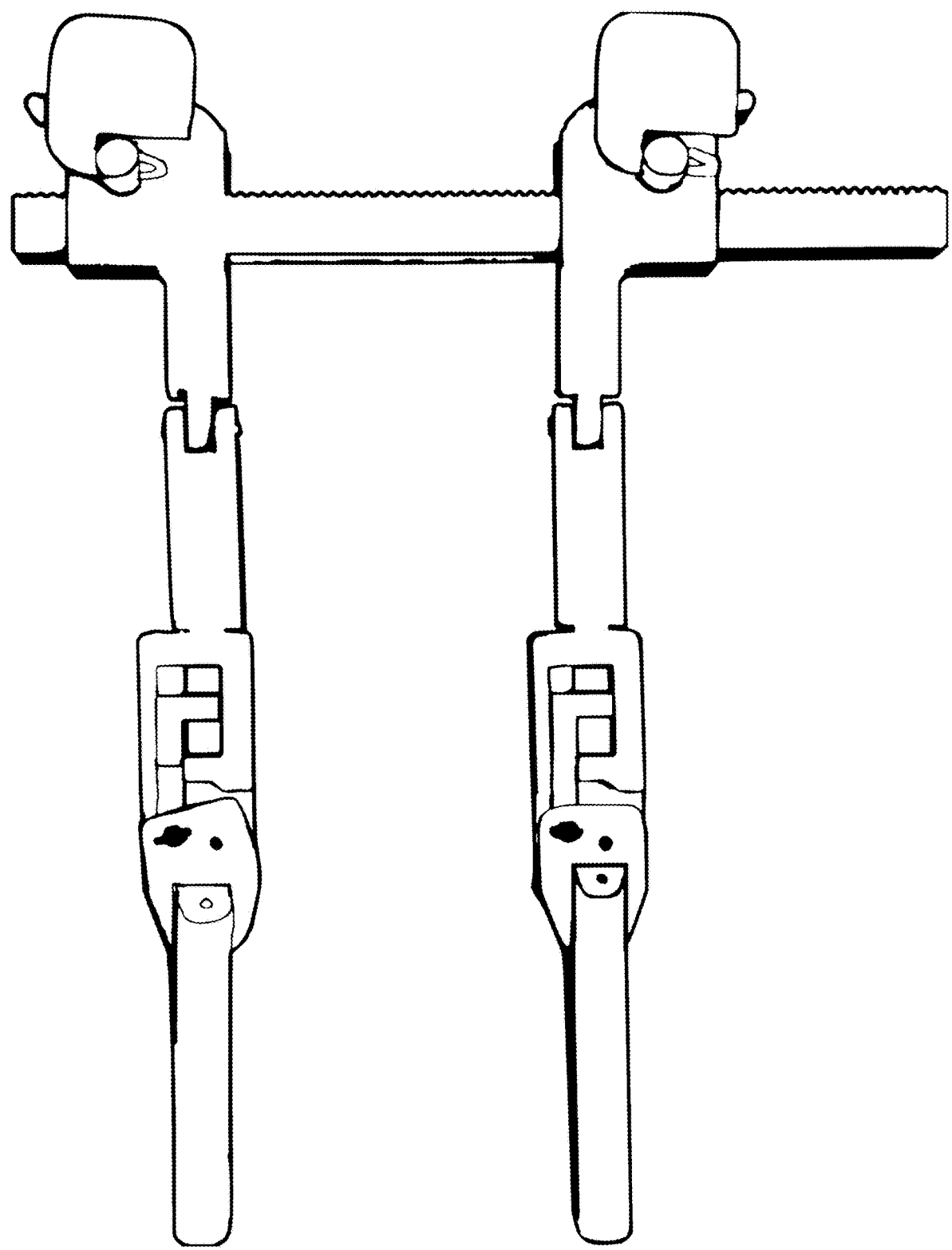
Figure 27C:
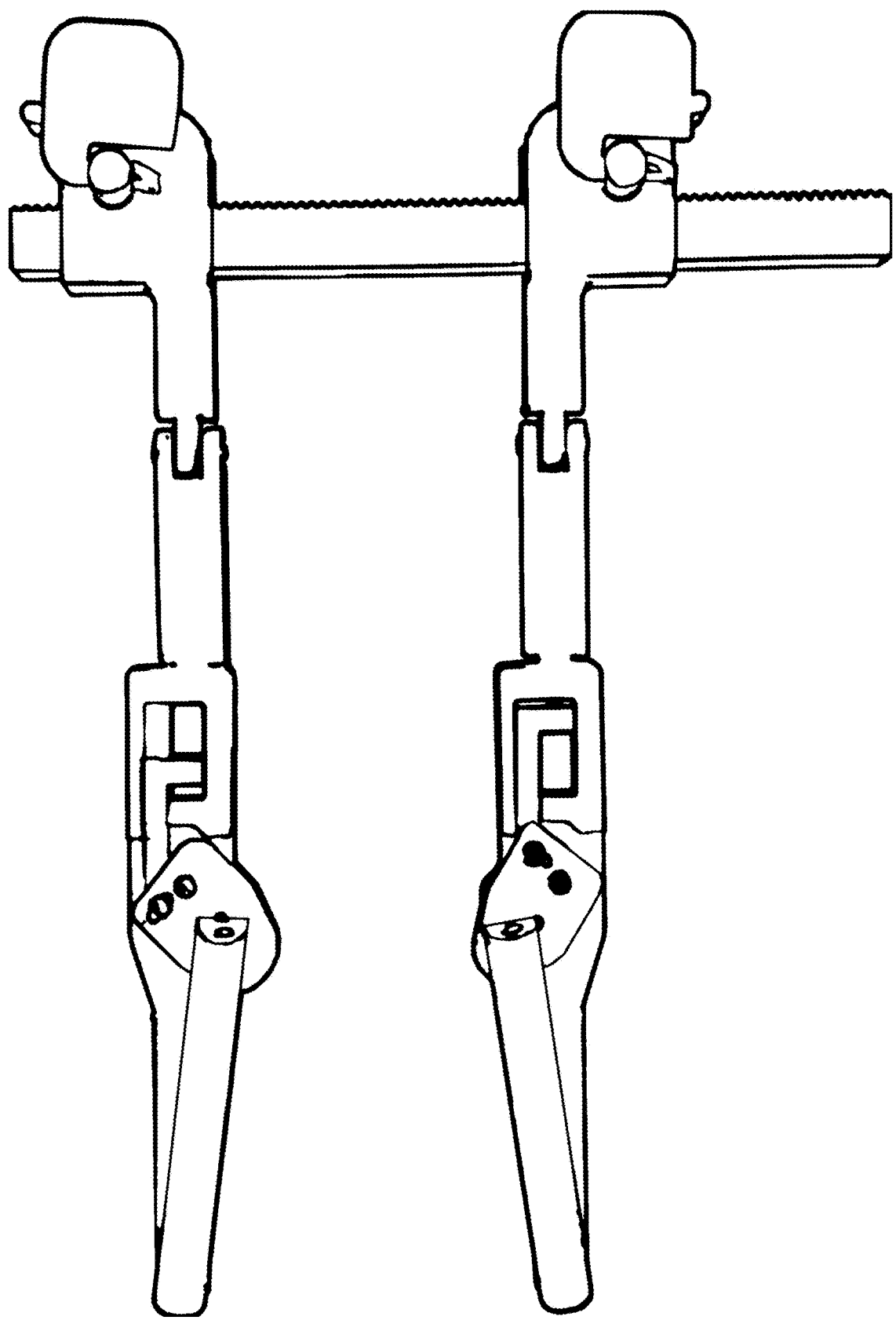

FIGS. 27A, 27B, and 27C show images of an additively manufactured and assembled distractor having two displaceable mounts 122 on a toothed rack 126 according to the invention, in three states of inclination of the Caspar-type pin holders 101. In this embodiment, the knurled adjustment knob 128 of the embodiment shown for example in FIG. 9B is replaced with a tab 137 which has a member that is fitted through a cross hole of a cylinder 138, that drives the pinion gear (not shown) on the rack 126. Further, the pin 118 and cylindrical extension 107 of FIG. 9B are replaced with screws 135, 136, which facilitate assembly and disassembly. The prototype did not have the threaded rod 116 installed. However, the mechanism as shown in FIG. 8 otherwise operated as intended, wherein a displacement of the follower 108 causes arm 134 and the screw 135 to move axially and rotate the plate 104 about the screw 135. The axial movement of the screw rotated the plate 104 about pin 105, and thereby controlled an inclination of the Caspar-type pin holder 101 with respect to the fixture 110.

Although the present system and/or approach has been described with respect to illustrative examples, many variations and modifications will become apparent to those skilled in the art upon reading the specification. It is therefore the intention that the appended claims be interpreted as broadly as possible in view of the related art to include all such variations and modifications. The device is optimized for orthopedic use, but may be used in other cases where alignment and separation are to be separately controlled.

What is claimed is:

1. A cervical distractor, comprising:
   an elongated rigid member having a plane and an axis in the plane;
   a plurality of arms supported by the elongated rigid member, at least one of the arms having an adjustable position along the axis of the elongated rigid member, and being lockable in position with respect to the elongated rigid member; and
   a pin-holder on each arm, the pin holder being continuously deflectable over a range of inclinations comprising a leftward inclination, a rightward inclination, and a neutral inclination about a pivot by a mechanism which is lockable or frictionally engageable in an inclined position, and the mechanism being separated along the arm from the elongated rigid member by at least one hinge configured to angularly displace the pin holder about the at least one hinge from the plane, the at least one hinge being separate and distinct from the pivot.

2. The cervical distractor according to claim 1, wherein the elongated rigid member comprises a rack gear defining a plane, and the at least one arm having a fixed orientation with respect to the plane, is adjustable along the rack gear by manual rotation of a pinion gear.

3. The cervical distractor according to claim 1, wherein the at least one hinge comprises two hinges.

4. The cervical distractor according to claim 2, wherein the manual rotation of the pinion gear is lockable with a manually-operable lever.

5. The cervical distractor according to claim 1, comprising at least three arms.

6. The cervical distractor according to claim 1, wherein at least one arm is fixed in position on the elongated rigid member.

7. The cervical distractor according to claim 1, wherein the pin-holder is configured to align a Caspar-type pin.

8. The cervical distractor according to claim 1, wherein the at least one hinge has a hinge axis parallel to the axis of the elongated rigid member.

9. The cervical distractor according to claim 1, wherein the pin holder has at least one position in which the pin holder is parallel to the arm, and is bidirectionally deflectable by a force caused by a mechanism located at an end of the pin holder opposite to the pivot.

10. The cervical distractor according to claim 9, wherein the mechanism comprises a second pivot having an axis orthogonal to a hinge axis of the hinge.

11. The cervical distractor according to claim 10, wherein a rotation of a helically threaded rod displaces a follower to exert a torque about the pivot on the pin-holder.

12. The cervical distractor according to claim 11, wherein the follower drives inclination of a plate, a first end of the pin-holder has a shaft that sits in a slot in the plate, and a second end of the pin-holder is mounted on the arm by the pivot, such that the torque causes a movement of the shaft in the slot and a rotation of the pivotally mounted second end of the pin-holder with respect to the arm about the pivot.

13. The cervical distractor according to claim 1, wherein the pin-holder has a symmetric range of movement with respect to the arm.

14. A method of operating a cervical distractor, comprising:
    providing a cervical distractor according to claim 1;
    adjusting an angle of the hinge and the inclination of the pin holder about the pivot by the mechanism of each arm;
    inserting a pin from each pin-holder into separate vertebrae; and
    adjusting a space between the separate vertebrae by adjusting the position along the axis of the at least one arm along the elongated rigid member.

15. A cervical distractor, comprising:
    an elongated rigid member having a first axis;
    a lockable control configured to control a position of a base of an arm with respect to the elongated rigid member, the first axis and the base of the arm defining a plane;
    an arm having at least one hinge;
    a pin-holder supported by the arm distal from the lockable control with respect to the at least one hinge, the pin-holder being deflectable over a range of inclinations comprising a leftward inclination, a rightward inclination and a neutral inclination about a second axis by a mechanism comprising a pivot, which is selectively lockable or selectively frictionally-engageable at a fixed angle of inclination within the range, the second axis being different from the first axis; the at least one hinge being separate and distinct from the pivot; and
    the at least one hinge between the pin-holder and the base of the arm being configured to rotate the pin-holder along the first axis of elongated rigid member to displace the pin-holder out of the plane.

16. The cervical distractor according to claim 15, wherein the elongated rigid member comprises a rack gear, and the base of the arm is adjustable in position along the rack gear by manual rotation of a pinion gear, and the manual rotation of the pinion gear is lockable with a manual lever.

17. The cervical distractor according to claim 15, wherein the mechanism comprises a helically-threaded rod and a follower, wherein the mechanism is configured such that a displacement of the follower by rotation of the helically-threaded rod causes a deflection of the pin-holder within the range about the second axis.

18. The cervical distractor according to claim 17, wherein the follower is configured to move with respect to a base and to control a movement of a support on the base, a first end of the pin-holder having a shaft that sits in a slot in the support, and a second end of the pin-holder being mounted to the base by the pivot, such that the follower induces a force and causes a movement of the shaft in the slot and a rotation of the pivotally mounted second end of the pin-holder with respect to the base about the pivot.

19. The cervical distractor according to claim 17, wherein the follower is configured to move along an axis with respect to a base and to control a rotation of a plate about a plate pivot with respect to the base, a first end of the pin-holder having has a shaft that sits in a slot in the plate, and a second end of the pin-holder being mounted on the base by the pivot, such that a torque induced by the follower causes a rotation of the plate about the plate pivot, which in turn causes a movement of the shaft in the slot and a rotation of the pivotally mounted second end of the pin-holder with respect to the arm about the pivot.

20. The cervical distractor according to claim 15, wherein the pin-holder has a symmetric range of angular deflection with respect to the arm.

* * * * *